United States Patent [19]

Morimoto et al.

[11] Patent Number: 5,687,085
[45] Date of Patent: Nov. 11, 1997

[54] SUBSTRATE PROCESSING APPARATUS AND METHOD

[75] Inventors: Toru Morimoto; Kenji Hashinoki; Tetsuya Hamada; Kenji Kamei, all of Kyoto, Japan

[73] Assignee: Dainippon Screen Mfg. Co., Ltd., Japan

[21] Appl. No.: 418,512

[22] Filed: Apr. 7, 1995

[30] Foreign Application Priority Data

Apr. 8, 1994 [JP] Japan ................................ 6-071035
Sep. 30, 1994 [JP] Japan ................................ 6-237652

[51] Int. Cl.$^6$ ........................................ G06F 19/00
[52] U.S. Cl. ........................ 364/468.28; 364/468.06; 364/468.08
[58] Field of Search ................. 364/468.05–468.09, 364/401 R, 194, 468.28, 488; 395/207–209

[56] References Cited

U.S. PATENT DOCUMENTS

| | | | |
|---|---|---|---|
| 4,896,269 | 1/1990 | Tong | 364/468.07 |
| 5,255,181 | 10/1993 | Chapman et al. | 364/468.05 |
| 5,436,848 | 7/1995 | Nishida et al. | 364/468.28 |

FOREIGN PATENT DOCUMENTS 4-113612  4/1992  Japan.

*Primary Examiner*—Reba I. Elmore
*Assistant Examiner*—Steven R. Garland
*Attorney, Agent, or Firm*—Ostrolenk, Faber, Gerb & Soffen, LLP

[57] ABSTRACT

Transport robot circulates in a predetermined order among a plurality of substrate processing parts while holds substrates, thereby to perform circulating transportation of the substrates. Controller calculates a minimum wait cycle which corresponds to the number of circulating transportation during time from first circulating of a first substrate to first circulating of a second substrate under the condition that interference between the first and second substrates is prohibited. When the minimum wait cycle is shorter than a standard wait cycle which corresponds to the number of circulating transportation for processing of the first substrate, starting of the circulating transportation of the second substrate is delayed in the range of the minimum wait cycle to a standard wait cycle. Hence, the processing of the second substrate can be started without waiting for completion of the processing of the first substrate, resulting in that through put is improved.

14 Claims, 44 Drawing Sheets

F I G . 7
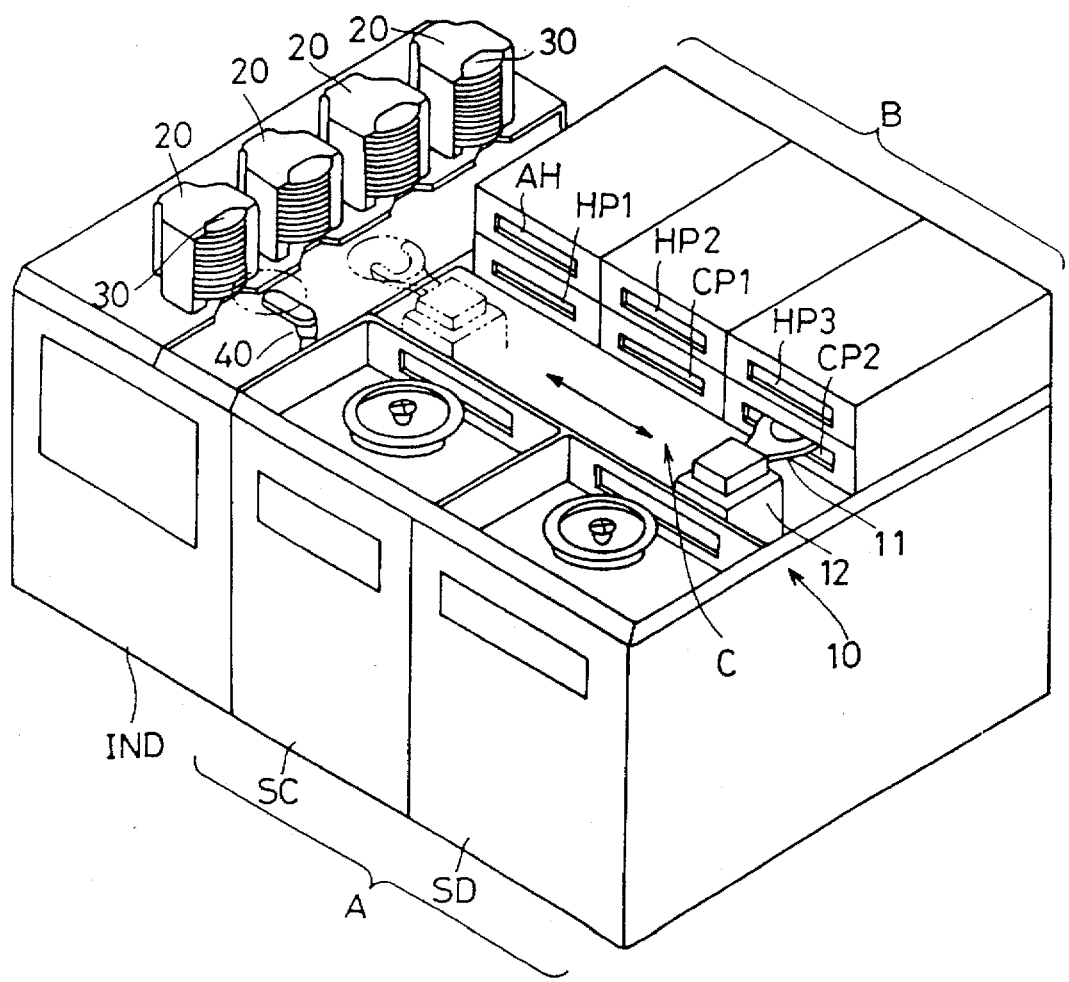

SUBSTRATE PROCESSING APPARATUS AND METHOD

BACKGROUND OF THE INVENTION

1. Field of the Invention

The present invention relates to a substrate processing apparatus and a method in which a plurality of substrates are successively transported among substrate processing pans and efficiently processed. The substrates are classified in different types of lots so as to be transported to the substrate processing parts in different orders and processed with different control parameters, i.e., control conditions of the substrate processing pans, and the like.

2. Description of the Background Art

As well known, in a substrate processing apparatus used to manufacture a precision electronic board such as a liquid crystal display board and a semiconductor substrate (hereinafter simply "substrate"), a substrate held by substrate transport means disposed in an appropriate arrangement such as a substrate transport robot is transported in a predetermined order among substrate processing parts such as a rotary spin coating part (hereinafter "spin coater"), a rotary developing part (hereinafter "spin developer"), an adhesive agent coating unit, a cooling plate, a hot plate and etc., while loaded into and unloaded from these processing pans so that the substrate is processed in a continuous series of treatments. As herein termed, "substrate processing parts" generally refer to a spin coater, a spin developer and etc. When referred to individually, a spin coater, a spin developer and the like are referred to by their respective names.

When the substrate processing apparatus successively processes lots which are to be transported in the same flow (i.e.,, a transportation order to the respective substrate processing parts) but in accordance with different data such as a heating time, the last substrate in a precedent lot and the first substrate in a subsequent lot are loaded into the substrate processing parts successively without any delay. To successively process these substrates without any delay, the first substrate in the subsequent lot which is loaded during a transitional period is transported at delayed timing or a tact time of the subsequent lot is coincided with a tact time of the precedent lot (Japanese Patent Laid-Open Gazette No. 4-113612). As a result, the substrates are processed successively, whereby the through put is improved. Furthermore, the substrates stored in the same lot are prevented from having different heat histories.

Further, when processing of the current lot (interrupted lot) is to be temporarily suspended to process other lot (interrupting lot) first which is to be processed in accordance with different data such as a heating time in this type of substrate processing apparatus, as in the case of successive processing of different lots above, the transportation timing of the first substrate in the interrupting lot which is loaded during a transitional period is delayed or a tact time of the interrupting lot is coincided with a tact time of the interrupted lot.

However, in this type of substrate processing apparatus, in successively processing lots which are to be transported in substantially different flows from each other (e.g., some flows include heating process and some other flows do not), to prevent substrates of a precedent lot and substrates of a subsequent lot from being in contention and interference with each other at a substrate processing part, processing of the substrates of the subsequent lot is started after all of the processed substrates of the precedent lot are returned into a cassette. Hence, many substrate processing parts stay idle during a transition between lots having different flows. The loss time created at this stage substantially deteriorates the through put.

This problem is created also when processing of a currently processed interrupted lot is temporarily suspended to process an interrupting lot first.

Single substrate processing for serially processing a plurality of substrates one by one which have different flows from each other is also susceptible to this problem.

SUMMARY OF THE INVENTION

The present invention is directed to a substrate processing apparatus for processing first and second substrates. The apparatus comprises: a plurality of processing parts each of which processes at least one of the first and second substrates; transport means for circulating among the processing parts while holding the first and second substrates; and transporting control means for transporting the first and second substrates among the processing parts in different first and second orders by the transport means to process the first and second substrates by first and second processing, respectively, such that the transportation of the second substrate is started after starting of the transportation of the first substrate before the completion of the first processing under the condition that interference between the first and second processing is prohibited.

The present invention is also directed to a method of processing substrates. The method comprises the steps of: preparing a plurality of processing parts each of which processes at least one of the first and second substrates; transporting the first substrate among the processing parts in a first order while processing the first substrate by the processing part which receives the first substrate, thereby to process the first substrate by first processing; and transporting the second substrate among the processing parts in a second order while processing the second substrate by the processing part which receives the second substrate, thereby to process the second substrate by second processing, the transportation of the second substrate being started after starting of the transportation of the first substrate before the completion of the first processing under the condition that interference between the first and second processing is prohibited, the second order being different from the first order.

Accordingly, it is an object of the present invention to offer a substrate processing apparatus and a method in which substrate processing parts are effectively used so that the through put in substrate processing is improved even when a plurality of substrates which, individually or lot by lot, have different flows are successively processed.

It is a further object of the present invention to offer a substrate processing apparatus and a method in which substrate processing parts are effectively used so that the through put in substrate processing is improved even when operations for lots having different flows from each other are linked to each other and substrates stored in the lots are successively processed.

It is other object of the present invention to offer a substrate processing apparatus and a method in which substrate processing parts are effectively used so that the through put in substrate processing is improved even when processing of a currently processed interrupted lot is temporarily suspended to process an interrupting lot having a different flow first.

It is still other object of the present invention to offer a substrate processing apparatus and a method in which substrate processing parts are effectively used so that the through put in substrate processing is improved even when a plurality of substrates having different flows from each other are processed by single substrate processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a perspective view of a substrate processing apparatus according to a first preferred embodiment of the present invention;

DESCRIPTION OF THE PREFERRED EMBODIMENTS

Before describing preferred embodiments of the present invention, an operation of a substrate processing apparatus of the present invention will be described in comparison with that of a conventional transportation apparatus.

Figure 1:
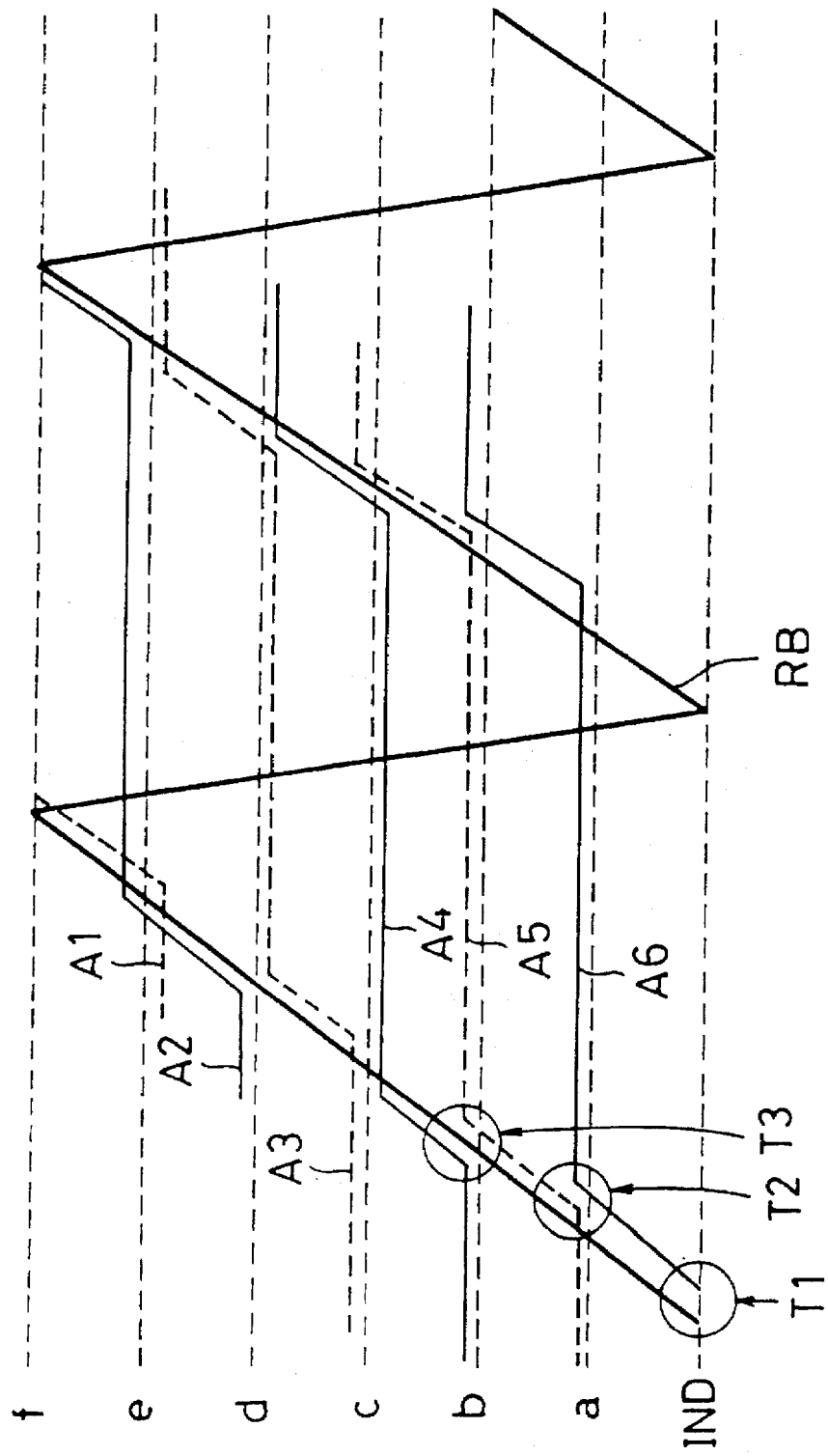
FIGS. 1 to 6 are views for describing an operation of a substrate processing apparatus according to the present invention.

FIG. 1 is a diagram showing an operation for transporting a precedent lot. In FIG. 1, the left side, the symbol IND denotes an indexer for loading and unloading substrates into and from a cassette, and the other symbols a, b, c, d, e and f express substrate processing parts such as a heating part, a cooling part, a coating part, a developing part. Time is measured from the left side to the right side in FIG. 1. The thick solid line RB expresses movement of a transport robot which serves as transportation means in the substrate processing apparatus. The transport robot RB repeatedly and periodically transport a substrate between the respective substrate processing parts a, b, c, d, e and f and the indexer IND, whereby substrates A1 to A6 are retrieved from the indexer IND, processed at the substrate processing parts a, b, c, d, e and f in predetermined flows and returned to the indexer IND. More specifically, at a time $T_1$ for example, the transport robot RB moves to the indexer IND and retrieves a substrate A6 from the cassette. At a time $T_2$, the transport robot RB moves to the substrate processing part a, unloads a substrate A5 from the substrate processing part a and then loads the substrate A6 into the substrate processing part a. Thus, the substrates A5 and A6 are exchanged at the substrate processing part a. Next, at a time $T_3$, the transport robot RB moves to the substrate processing part b and exchanges the substrates A4 and A5. One cycle of circulating transportation completes when the transport robot RB returns to the indexer IND after repeating this set of operations. The substrates A1 to A6 are processed at the substrate processing parts a, b, c, d, e and f in the predetermined flows by repeating the transportation cycle.

Figure 2:
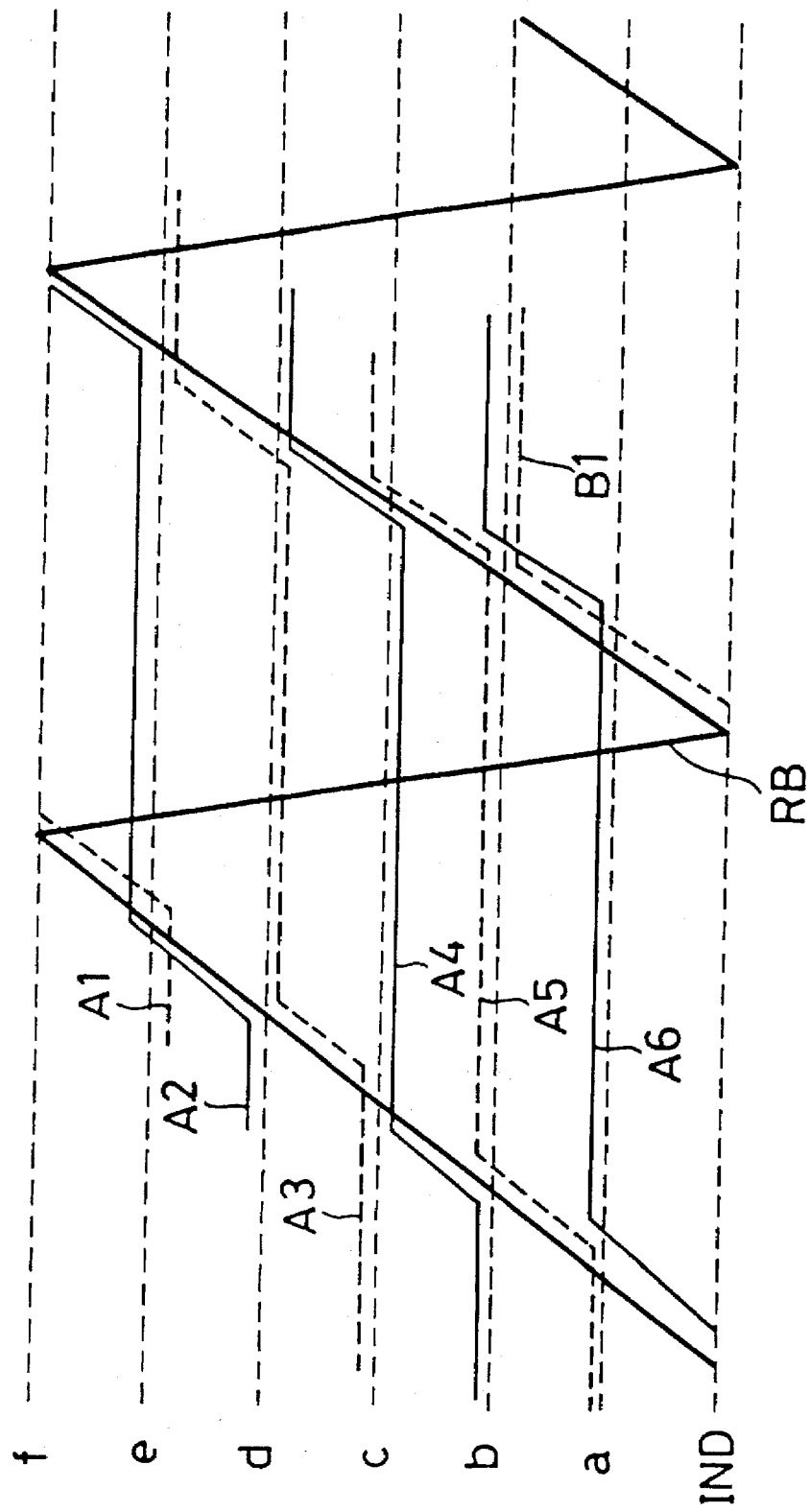
Figure 3:
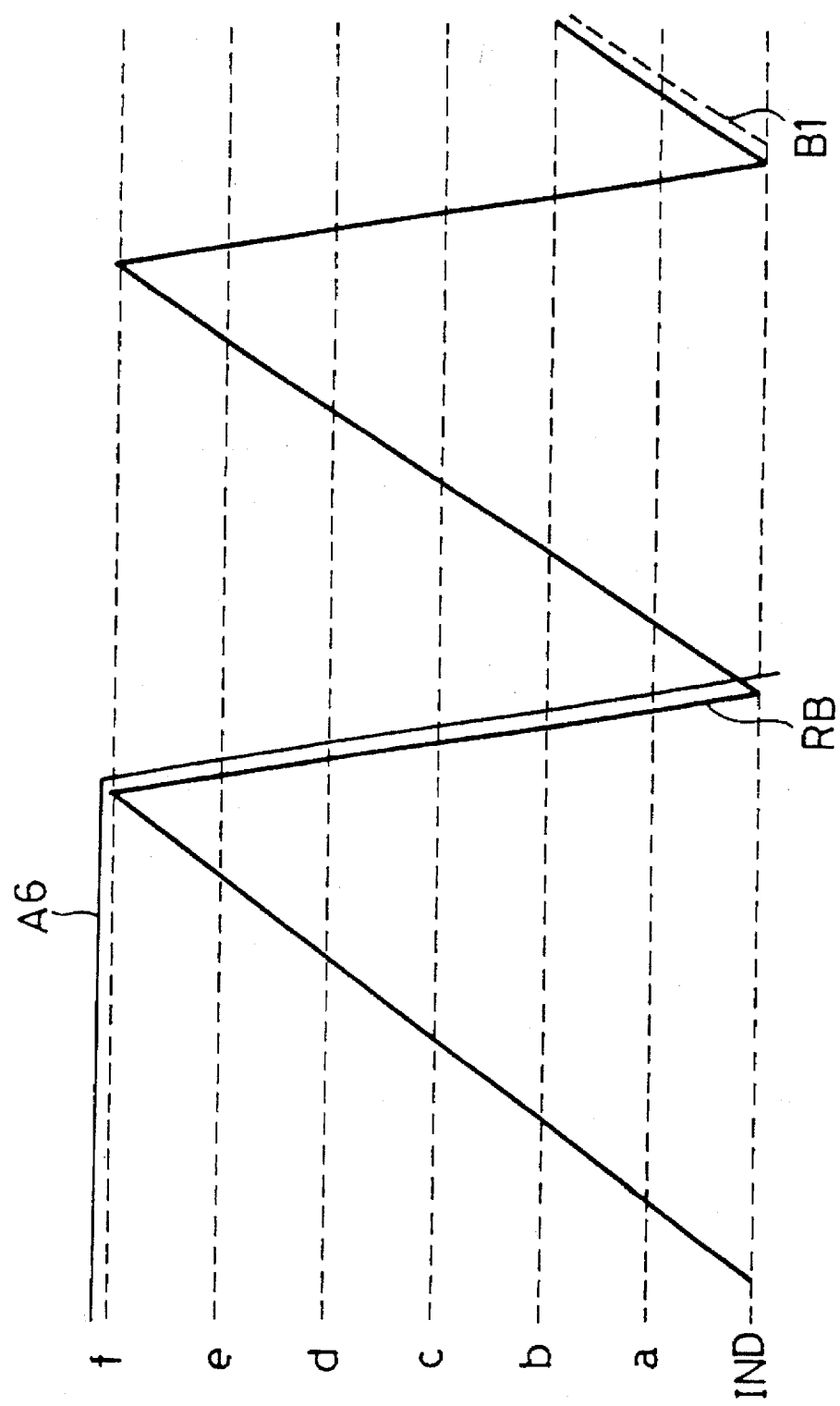

FIGS. 2 and 3 are views for describing a problem which occurs when operations for lots which have different flows from each other are linked to each other and substrates contained in the lots are processed successively while circulating the lots as shown in FIG. 1 in a conventional transportation method. FIG. 2 represents an example wherein the first substrate B1 of a subsequent lot is loaded into the substrate processing part a upon unloading of the last substrate A6 of a precedent lot from the substrate processing part a. In this example, assuming that the substrate processing flow of the subsequent lot starts at the substrate processing part b, the substrates A5, A6 and B1 meet at the substrate processing part b. Thus, contention between the substrates of the precedent and the subsequent lots is created at the substrate processing part b. To avoid this, in the conventional transportation method, the first substrate B1 of the subsequent lot is not loaded until processing of the last substrate A6 of the precedent lot completes as shown in FIG. 3. In FIG. 3, retrieving of the first substrate B1 of the subsequent lot is started after processing of the last substrate A6 of the precedent lot finished and the last substrate A6 was returned to the indexer IND. Although this always prevents contention between the substrates of the precedent and the subsequent lots, substrate processing must wait for as long as seven cycles when operations for the lots are linked to each other. That is, the substrate processing parts a to f are left idle during this waiting time of seven cycles, which deteriorates the through put.

Figure 4:
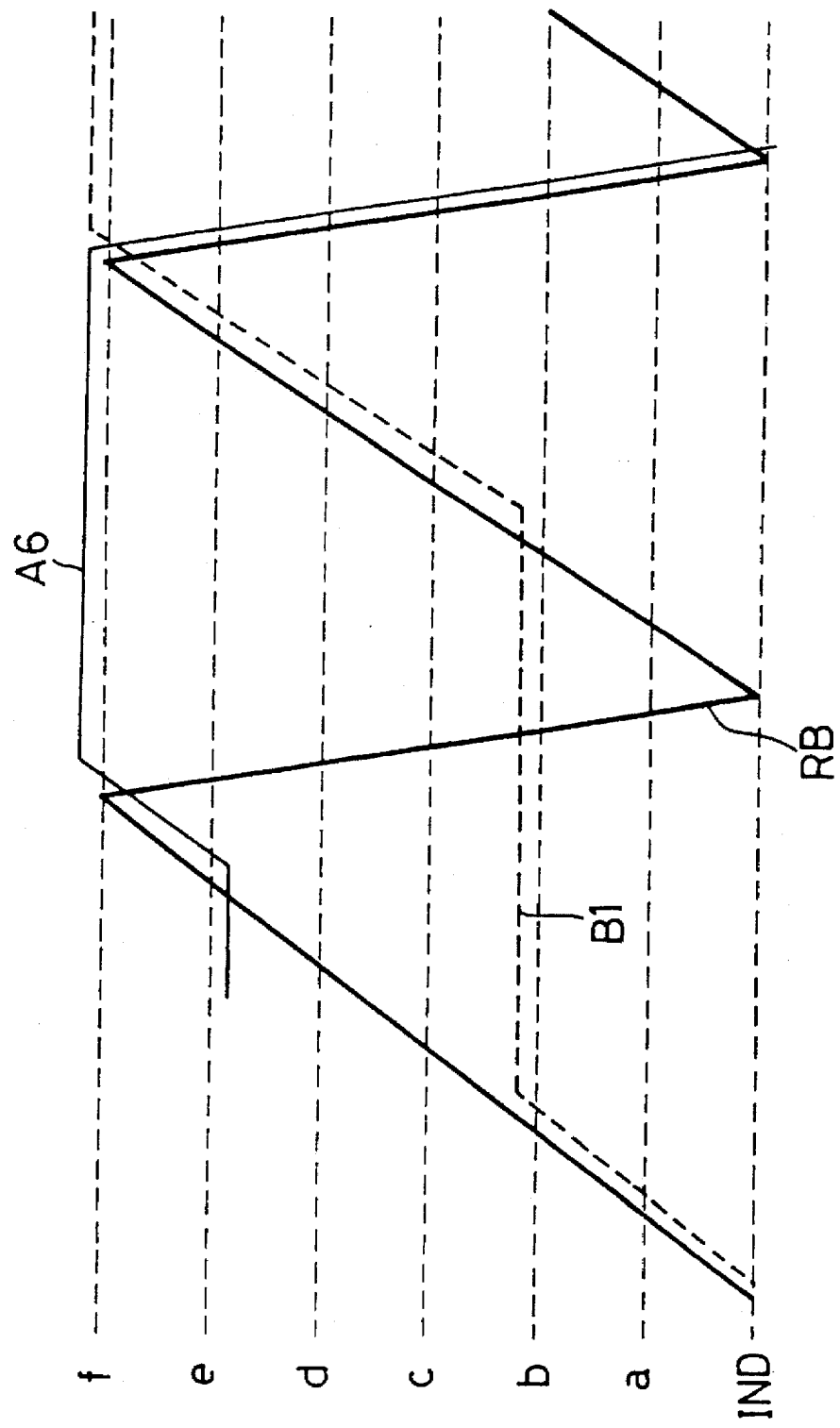

FIG. 4 is a view for describing transportation performed by a substrate processing apparatus of the present invention which solves such a problem as that typically illustrated in FIG. 3. In substrate processing apparatus of the present invention, retrieving timing of the first substrate B1 of the subsequent lot is advanced under the condition that interference of processing of the last substrate A6 of the precedent lot and processing of the first substrate B1 of the subsequent lot (i.e., contention between the substrates at the substrate processing parts a to f) is prohibited. Assume that the substrate processing flow of the subsequent lot starts at the substrate processing part b and completes at the substrate processing part f, for example. In this case, contention between the substrates A6 and B1 at the substrate processing part f is prevented by starting a first cycle of circulating transportation (i.e., circulation) of the substrate B1 four cycles after a first cycle of circulating transportation of the substrate A6. As a result, the through put of substrate processing is enhanced while preventing interference of processing of the substrates A6 and B1. Theoretically, the first cycle of circulating transportation of the substrate B1 can wait for minimum four cycles up to maximum six cycles while ensuring faster circulating transportation than in the conventional method (in which a waiting time of seven cycles is typically created) and a sufficiently improved through put of substrate processing.

This is also true with interrupting processing where processing of a substrate of a current lot is temporarily suspended and processing of other lot having a different flow is performed. That is, a first cycle of circulating transportation of the substrate B1 is started after four cycles from the first cycle of circulating transportation of the substrate A6 of the interrupted lot which is not processed yet as in the case of FIG. 4. As a result, contention between the substrates A6 and B1 at the substrate processing part f is prevented at the start of the interrupting processing. Thus, the through put of substrate processing is improved while preventing interference of processing of the substrates A6 and B1. Theoretically, the first cycle of circulating transportation of the first substrate B1 of the interrupting lot can wait for minimum four cycles up to maximum six cycles while ensuring faster transportation than in the conventional method (in which a waiting time of seven cycles is typically created) and a sufficiently improved through put of substrate processing.

Figure 5:
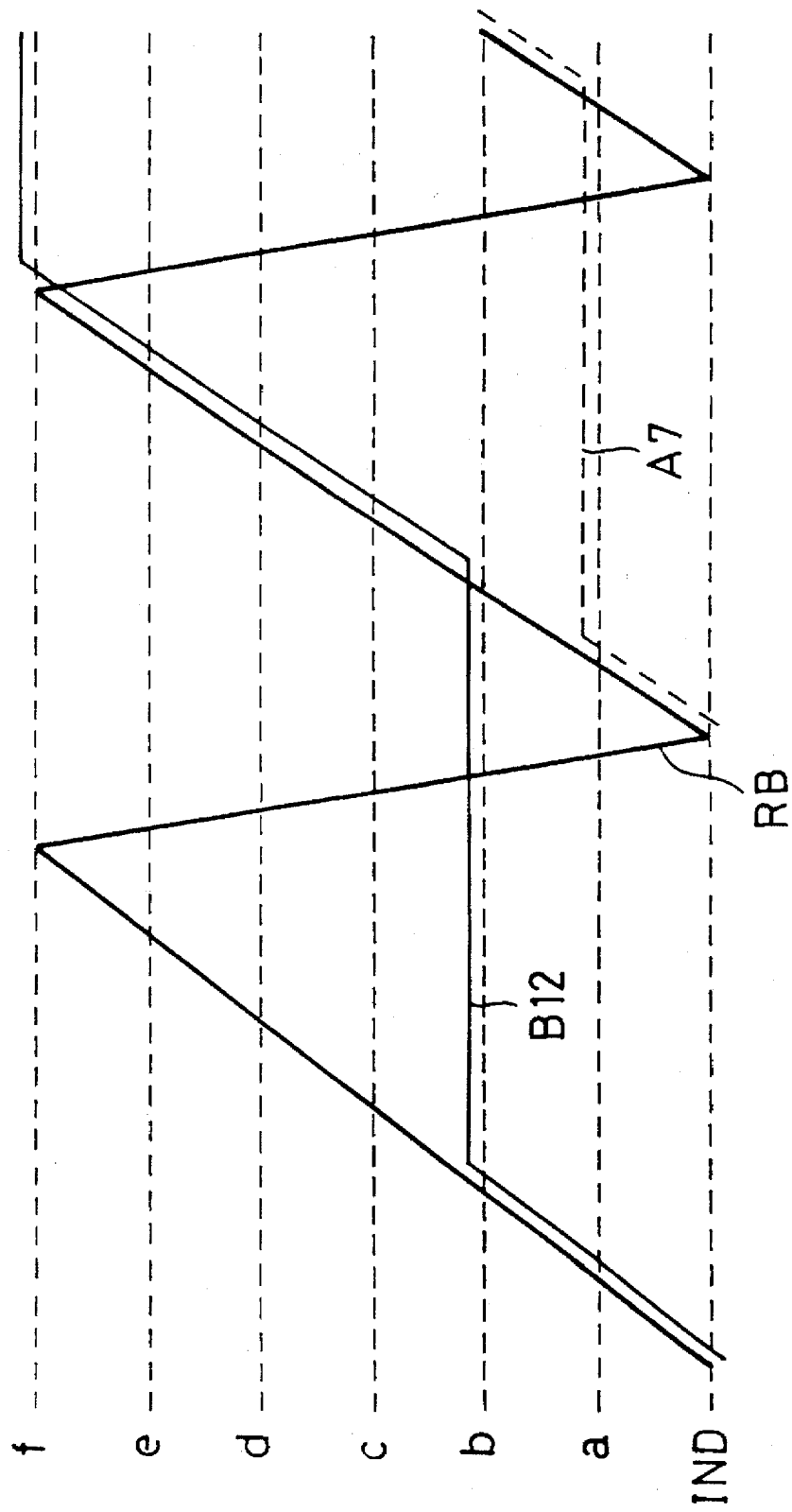

This is generally the same with the end of the interrupting processing as shown in FIG. 5. In FIG. 5, a first cycle of circulating transportation of the first substrate A7 of the interrupted lot is started soon after a first cycle of circulating transportation of the last substrate B12 of the interrupting lot, thereby improving the through put of substrate processing while preventing interference of processing of the substrates B12 and A7. Theoretically, the first cycle of circulating transportation of the first substrate A7 of the interrupting lot can wait for minimum no cycle up to maximum two cycles while ensuring faster transportation than in the conventional method (in which a waiting time of three cycles is typically created) and a sufficiently improved through put of substrate processing.

Figure 6:
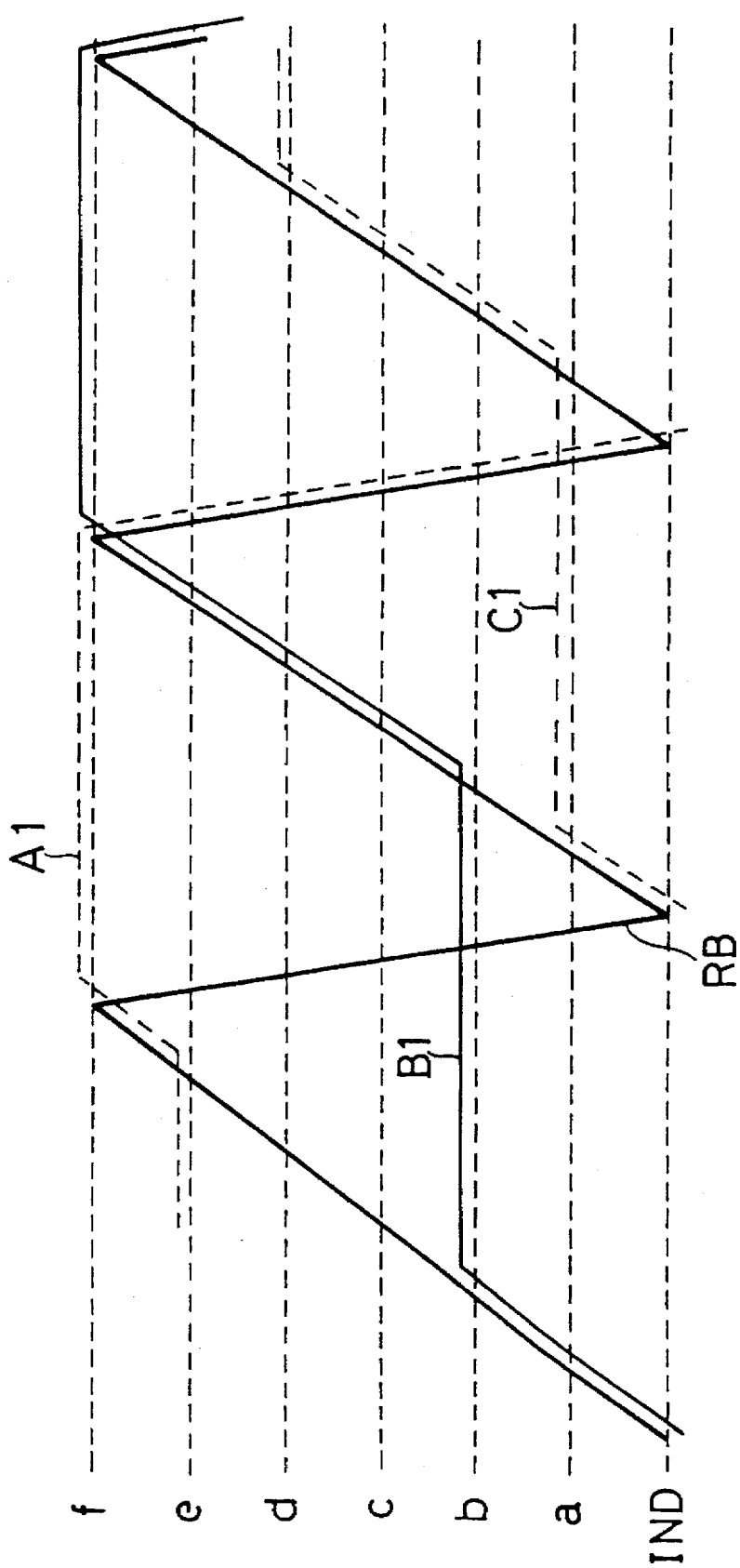

The above is also true with single substrate processing where a plurality of substrates having different flows from each other are serially processed. Assume that there is another substrate C1 having a different flow in addition to the substrates A1 and B1 for example, as shown in FIG. 6. The flow of the substrate C1 starts at the substrate processing part a and end at substrate processing part d. In this example, by starting a first cycle of circulating transportation of the substrate B1 four cycles after a first cycle of circulating transportation of the substrate A1, contention between the substrates A1 and B1 at the substrate processing part f is prevented. As a result, the through put of substrate processing is enhanced while preventing interference of processing of the substrates A1 and B1. Theoretically, the first cycle of circulating transportation of the substrate B1 can wait for minimum four cycles up to maximum six cycles while ensuring faster transportation than in the conventional method (in which a waiting time of seven cycles is typically created) and a sufficiently improved through put of substrate processing. Further, by starting the first cycle of circulating transportation of the first substrate C1 soon after the first cycle of circulating transportation of the substrate B1, the through put of substrate processing is sufficiently improved while preventing interference of processing of the substrates B1 and C1. Theoretically, the first cycle of circulating transportation of the first substrate C1 can wait for minimum no cycle up to maximum two cycles while ensuring faster transportation than in the conventional method (in which a waiting time of three cycles is typically created) and a sufficiently improved through put of substrate processing. An overall waiting cycle in continuous transportation of the substrates A1, B1 and C1 can be reduced to minimum 0 in the present invention, whereas an overall waiting cycle is always ten cycles in the conventional standard transportation (i.e., seven cycles for the substrate A1 and three cycles for the substrate B1). Thus, it is possible to drastically improve the through put of substrate processing as more and more substrates are processed by single substrate processing.

A. Structure of Substrate Processing Apparatus of First Preferred Embodiment

Figure 8:
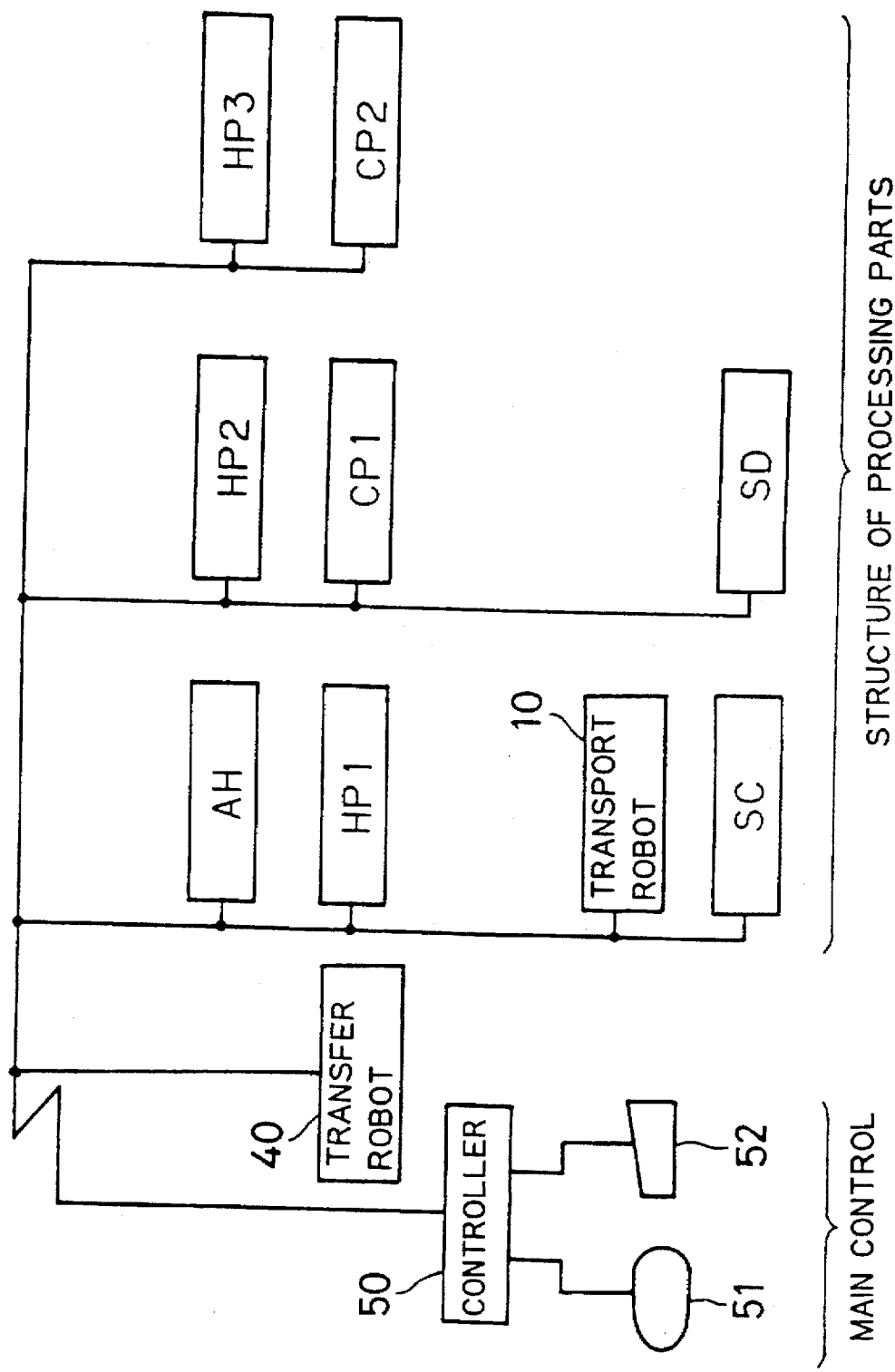
FIG. 8 is a block diagram of the substrate processing apparatus according to the first preferred embodiment.

FIG. 7 is a perspective view of a substrate processing apparatus according to a first preferred embodiment of the present invention. FIG. 8 is a block diagram of the substrate processing apparatus of FIG. 7.

The substrate processing apparatus is for performing a series of treatments on substrates 30 (The treatments are coating, developing, coating of an adhesive agent, heating and cooling in the first preferred embodiment.). A spin coater SC, or a substrate processing part for coating a substrate, and a spin developer SD, or a substrate processing part for developing, are installed on the front side to form a substrate processing row A.

On the back side facing the substrate processing row A, an adhesive agent coating unit AH for performing various types of heating, hot plates HP1 to HP3 and cooling plates CP1 to CP2 are disposed in a two-dimensional arrangement to form a substrate processing zone B.

The substrate processing apparatus further includes a transportation zone C which extends along the substrate processing row A between the substrate processing row A and the substrate processing zone B. A transport robot 10 is disposed freely movable in the transportation zone C. The transport robot 10 comprises a movable element 12 which includes a holding member 11. The holding member 11 consists of a pair of arms which supports the substrates 30 (Only one arm is shown in FIG. 7.). The upper and lower arms of the arm pair which constitute the holding member 11, when driven by an arm mechanism (not shown), independently move toward and retract from the substrate processing row A side and the substrate processing zone B side, respectively. One arm receives a processed substrate from one of the processing parts of the substrate processing row A and the substrate processing zone B, while the other arm loads other substrate from a previous substrate processing part or the like, whereby the substrates 30 are exchanged at the processing part above.

Although not shown in FIG. 7, a three-dimensional drive mechanism is linked to the movable element 12 of the transport robot 10. The movable element 12 is moved to the respective substrate processing parts by controlling the drive mechanism, and the substrates 30 are loaded and unloaded.

The indexer IND is installed on one end side where the substrate processing row A, the substrate processing zone B and the transportation zone C terminate (i.e., left-hand side in FIG. 7) to retrieve an unprocessed substrate 30 from a cassette 20 and return a processed substrate 30 to the cassette 20. A transfer robot 40 disposed to the indexer IND retrieves the substrates 30 from the cassette 20 and transfers the retrieved substrates 30 to the transport robot 10, or conversely receives the already processed substrates 30 from the transport robot 10 and gives the substrates 30 back into the cassette 20. Although not shown in FIG. 7, an interface unit is disposed where the substrate processing row A, the substrate processing zone B and the transportation zone C terminate at the opposite end (i.e., right-hand side in FIG. 7) to unload and load the substrates 30 from and into other substrate processing apparatus. Loading and unloading of the substrates 30 is realized by a concerted operation of a transfer robot (not shown) of the interface unit and the transport robot 10.

In FIG. 8, a controller 50 is a computation processing device including a computation part and a memory. The controller 50 is linked to a display 51 and a keyboard 52 and communicable with the respective substrate processing parts and the transport robot 10. In accordance with data entered via the keyboard 52, the controller 50 performs various operations including computation as described later to control operations of the transport robot 10, the spin coater SC, the hot plates HP1 to HP3 and etc.

B. Operation of Substrate Processing Apparatus of First Preferred Embodiment

Figure 9:
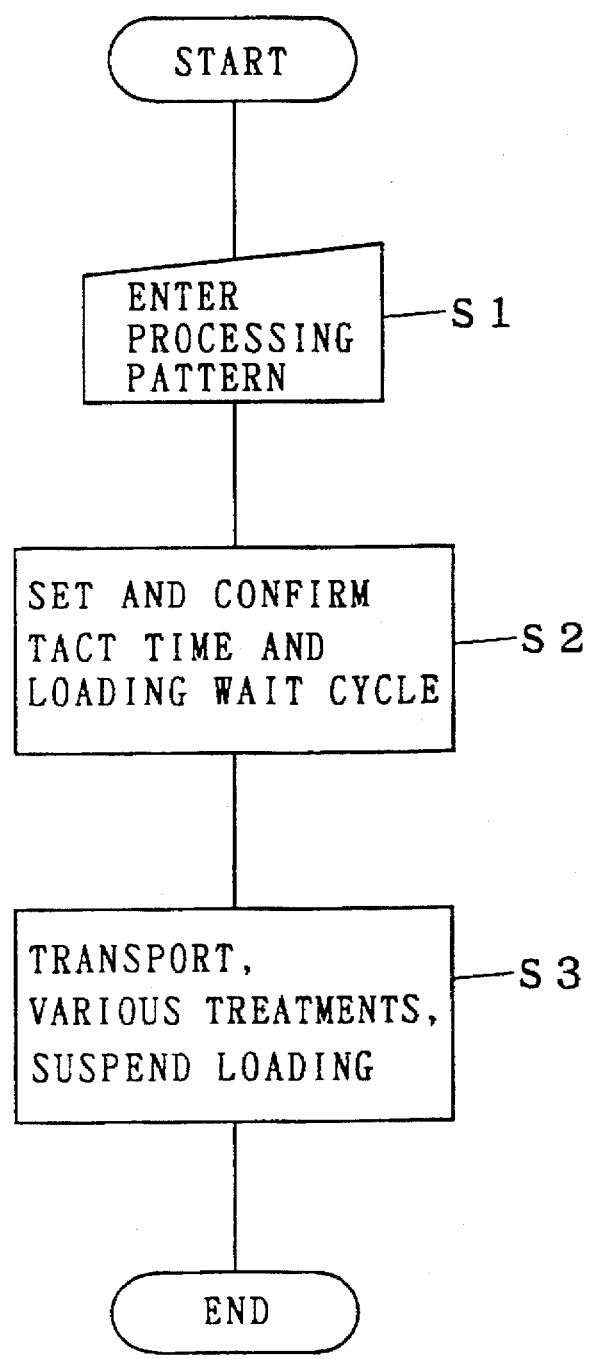
FIG. 9 is a flow chart of an operation of a substrate processing apparatus according to the first preferred embodiment.

FIG. 9 is a flow chart of an operation of the substrate processing apparatus according to the first preferred embodiment. The substrate processing apparatus of the first preferred embodiment successively processes lots which have different flows from each other while performing tact management. In the following, an operation of the substrate processing apparatus, and particularly procedures of transporting the substrates 30 will be described with reference to the flow chart in FIG. 9.

As herein termed, "tact management" is to control the transport robot 10 to move among the substrate processing parts at a constant time. More precisely, under the tact management the transport robot 10 starts circulating transportation at a certain substrate processing part and then moves among the substrate processing parts while performing intended operations until the transport robot 10 starts the next circulating transportation at the same substrate processing part where the previous circulating transportation was started. The tact management keeps heat histories of the substrates constant. On the other hand, "different flow" is processing in which a transportation order of one substrate 30, that is, processing procedures (hereinafter "wafer flow") of that substrate 30 is different from that of other substrate. For example, the wafer flow is different when the substrate processing parts used to process the substrate 30 of the first cassette retrieved first are partly different from those to process the substrate 30 of the second cassette retrieved next or when the order of using the substrate processing parts is different between the first and the second cassettes.

An operator enters the types of lots which are to be successively processed, the number of the cassettes 20, the number of the substrates 30 in the cassettes 20, the wafer flows of the respective lots, processing conditions and etc. (Step S1). If necessary, the operator inputs information regarding the arrangement of the substrate processing parts in the apparatus and information regarding the transport robot 10 on the keyboard 52. Although a wafer flow is an order of transporting the substrates 30 (transportation order) in principle as described above, other factors such as a processing time at each substrate processing part (processing time) are also included in the wafer flow. Processing conditions include a processing temperature, a rotation speed, the type of a processing liquid and etc.

Next, in response to an instruction from the operator to start processing, based on the information entered at Step S1, values are calculated which are needed to successively process the substrates 30 which are contained in the pair of the cassettes 20 which corresponds to the lots which are to be processed in different flows (Step S2). The values calculated here include a tact time $T_n$ for processing the substrates which are contained in each cassette (n), a processing position difference $A_n$ between the wafer flow of a cassette (n) and that of the next cassette (n+1), a maximum flow step difference $B_n$ between the cassette (n) and the next cassette (n+1) (The definitions of the values $A_n$ and $B_n$ will be given later.), and a loading wait cycle $W_n$ which is the larger one of the processing position difference $A_n$ and the maximum flow step difference $B_n$. If necessary, in accordance with the transportation orders of the substrates 30, the processing times and the other parameters, a detailed operation routine of the transport robot 10 and a detailed processing pattern at each substrate processing part (or unit) are determined. Lastly, based on the wafer flows, the processing conditions and other information entered at Step S1, the substrates 30 of each cassette 20 are processed by predetermined treatments while each transported in a predetermined order (Step S3). At Step S3, retrieving of the substrate from a subsequent cassette 20 is temporarily stopped during a transition from the precedent cassette 20 to the subsequent cassette 20 to prevent interference of processing of the substrates 30 of the two cassettes 20 if needed.

Figure 10:
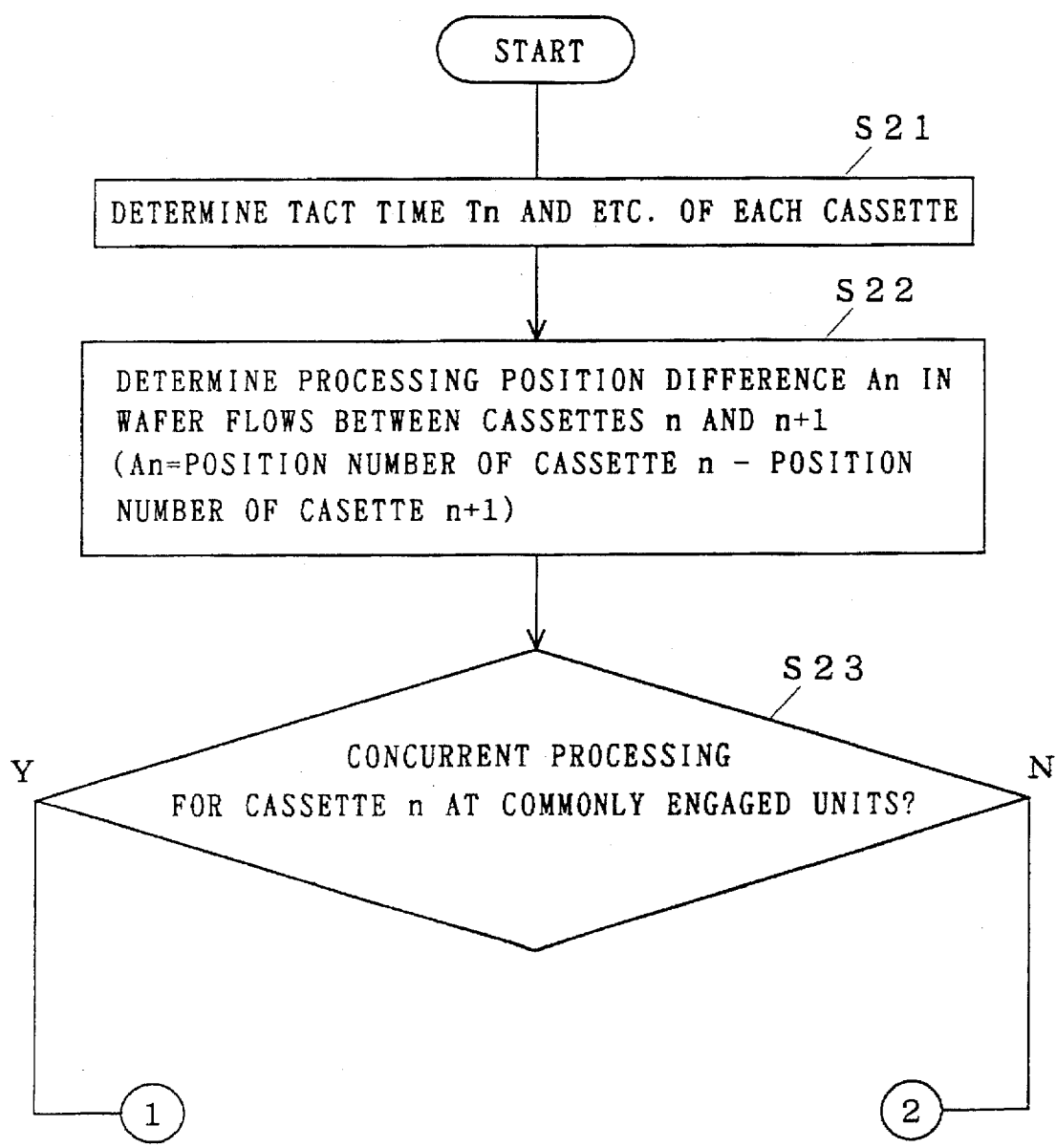
FIGS. 10 and 11 are flow charts showing calculation of a loading wait cycle in the substrate processing apparatus according to the first preferred embodiment.
Figure 11:
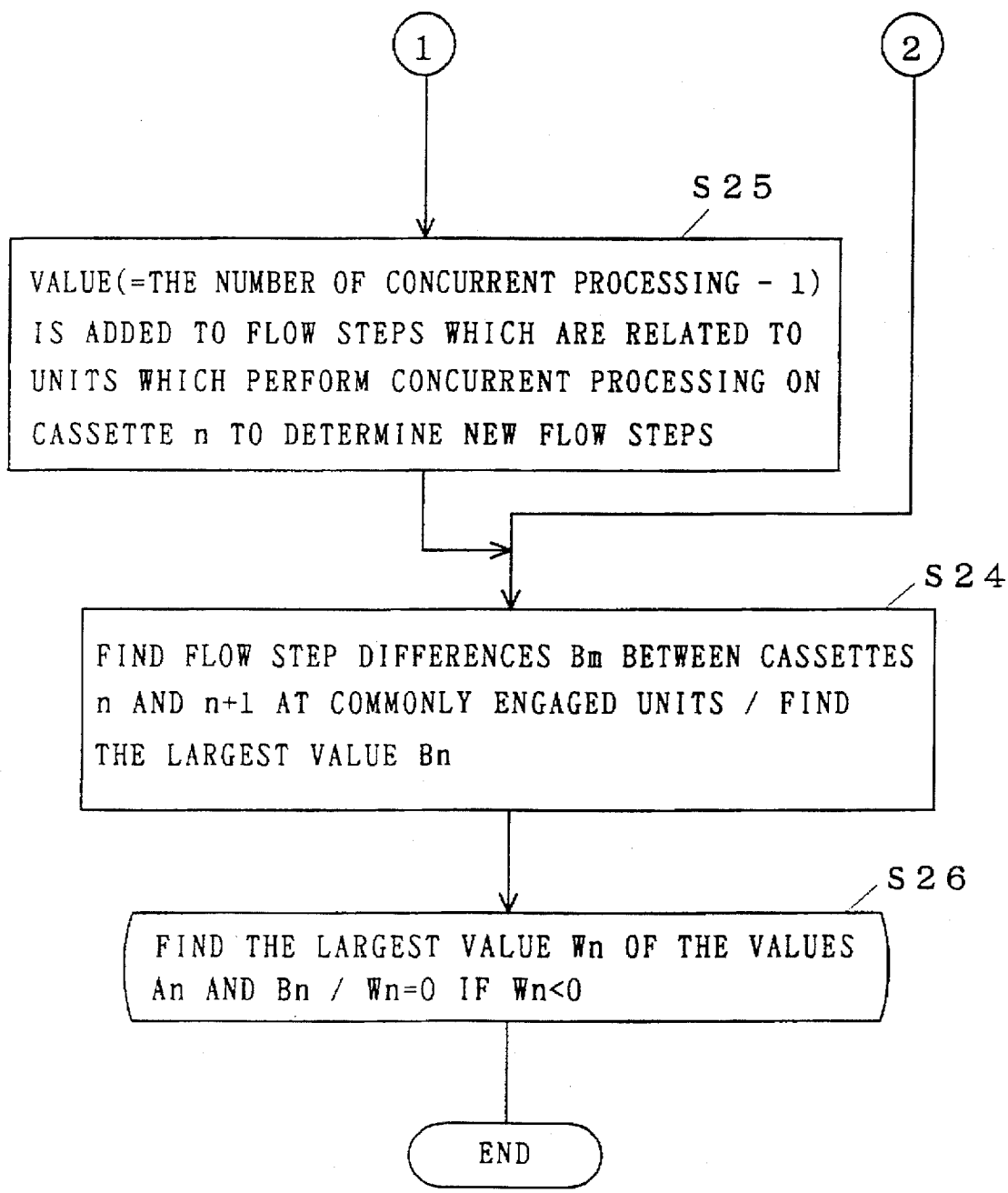

FIGS. 10 and 11 are flow charts showing details of Step S2. First, based on the transportation order of the substrates 30 of each cassette (n), the processing time and the other parameters entered at Step S1, a tact time $T_n$ for processing the substrates which are contained in each cassette (n) is determined (Step S21). As herein termed, "tact time" is a cycle of a series of repeated operations (circulating transportation) for transporting the substrate 30, which is currently in a cycle of treatments starting at the indexer IND and ending back at the indexer IND according to the wafer flow, from one treatment to the next by the transport robot 10. In other words, the tact tine $T_n$ is a time from the start of one cycle of circulating transportation by the transport robot 10 at a certain substrate processing part until the start of another cycle of circulating transportation by the transport robot 10 at the same substrate processing part where the previous cycle of circulating transportation was started. The tact time $T_n$ equals to a through put time of where the substrates 30 having the same wafer flow are successively loaded and the substrate processing apparatus successively and infinitely to processes the substrates. In determining the tact time $T_n$, it is first determined from the transportation order, a processing time and etc. whether the rate of wafer flow is to be restricted by a transportation time or by a processing time at each substrate processing part. In accordance with the result, a total processing time of the wafer flow is then reduced minimum (The tact time is the same as the through put time in tact management of this type.). The manner in which the tact time $T_n$ is determined is the same as in the conventional technique, and therefore, will not be described in detail here.

Next, the processing position difference $A_n$ between a pair of adjacent cassettes (n, n+1) which corresponds to a pair of successive different wafer flows is determined (Step S22). The processing position difference $A_n$ is defined by a difference in the number (i.e., position number) of the substrate processing parts (or units) to be engaged with between the cassettes (n, n+1). If this difference has a negative value, the processing position difference $A_n$ is determined as 0. Instead of including an operation of the indexer IND in the position number as in the first preferred embodiment, an operation of the indexer IND may not be included in the position number. The processing position difference $A_n$ is calculated to prevent a substrate of the subsequent cassette (n+1) from passing a substrate of the precedent cassette (n). More precisely, where the position number of the subsequent cassette (n+1) is less than the position number of the precedent cassette (n), a substrate of the subsequent cassette (n+1) interferes with a substrate of the precedent cassette (n) when passing, whereby tact management becomes impossible or the wafer flows of the two cassettes (n, n+1) get confused, unless the start of the processing of the subsequent cassette (n+1) does not wait for a time which is expressed by the difference in the number of the cycles.

Tables 1 and 2 below shows examples of calculation of the processing position difference $A_n$. The wafer flow of Table 1 corresponds to where not all of the hot plates are engaged with and therefore different hot plates are used between the successive two lots, or cassettes (n, n+1) to change the temperature condition between the two cassettes (n, n+1). The wafer flow of Table 2 corresponds to where a specific treatment is not needed for the subsequent cassette (n+1).

TABLE 1

| Flow of Cassette n | (1) IND — (L) | (2) HP1 — | (3) CP — | (4) SC — | (5) HP2 — | (6) IND (UL) |
|---|---|---|---|---|---|---|
| Flow of Cassette n + 1 | (1) IND — (L) | (2) HP1 — | (3) CP — | (4) SC — | (5) HP3 — | (6) IND (UL) |

TABLE 2

| Flow of Cassette n | (1) IND — (L) | (2) HP1 — | (3) CP — | (4) SC — | (5) HP2 — | (6) IND (UL) |
|---|---|---|---|---|---|---|
| Flow of Cassette n + 1 | (1) IND (L) |  |  | (4) SC — | (5) HP3 — | (6) IND (UL) |

The symbol IND(L) indicates retrieving of a substrate from the indexer, the symbols HP1, HP2 and HP3 indicate treatments by the hot plates, the symbol CP indicates a treatment by the cooling plates, the symbol SC indicates a treatment by the spin coater, and the symbol IND(UL) indicates returning of a substrate to the indexer. The underlined portion is where the cassettes (n, n+1) undergo different treatments from each other.

In the case of the pair of the cassettes (n, n+1) shown in Table 1, the total position numbers in the wafer flows are 6 for the both cassettes so that Processing Position Difference $A_n=0$. In the case of the pair of the cassettes (n, n+1) shown in Table 2, the total position numbers in the wafer flows are 6 and 4 for the respective cassettes so that Processing Position Difference $A_n=2$.

Next, as shown in FIG. 10, Step S23 is executed to judge whether the substrates of the precedent cassette (n) are processed parallel at the substrate processing parts (or units) which are engaged with in the wafer flows by the pair of the adjacent cassettes (n, n+1) which corresponds to the pair of the successive different flows. As described in detail below, this is to prevent contention between the substrates of the cassettes (n, n+1) at the substrate processing parts (or units) where concurrent processing is performed. Concurrent processing aims at preventing deterioration in the through put due to a rate-limiting factor such as a long processing time, e.g., a long heating time, during the wafer flow. In concurrent processing, a plurality of the substrates 30 are processed parallel at a plurality of the same type of substrate processing parts (or units) while shifting the timing, thereby eliminating a waiting time, or a time loss at other processing parts and improving the overall through put.

When there is no concurrent processing, Step S24 is executed to find the maximum flow step difference $B_n$ in the wafer flow between the adjacent cassettes (n, n+1) which correspond to the pair of the successive different flows, as shown in FIG. 11. The maximum flow step difference $B_n$ is defined as a maximum difference (a flow step difference $B_m$) in the placing (i.e., flow steps) of the substrate processing parts (or units) which are engaged with by the cassettes (n, n+1) in accordance with the respective wafer flows (where m is a subscript for distinguishing the engaged with substrate processing parts). Here, it is assumed that $B_m=0$ when the flow step difference $B_m$ has a negative value. Instead of including retrieving the substrate from the indexer IND in the flow steps, unlike herein described, retrieving from the indexer IND may not be included in the flow steps. The maximum flow step difference $B_n$ is calculated principally to prevent processing of a substrate of the subsequent cassette (n+1) from interfering with, or passing processing of a substrate of the precedent cassette (n). That is, when there is a substrate processing part where the flow steps for the subsequent cassette (n+1) are less than that of the precedent cassette (n), a substrate of the subsequent cassette (n+1) interferes with a substrate of the precedent cassette (n) to make tact management impossible, unless processing of the subsequent cassette (n+1) does not wait for a time which is expressed by the maximum difference or longer.

Tables 3 and 4 below show a manner in which the flow step difference $B_m$ and the maximum flow step difference $B_n$ are calculated.

TABLE 3

| Flow of Cassette n | (L) | IND — a — b — d — e — f — (UL) | IND |
|---|---|---|---|
| Flow of Cassette n + 1 | IND (L) | — a — b — d — e —— g — (UL) | IND |

Table 3 shows the wafer flows of the pair of the cassettes (n, n+1). The symbols a to g represent treatments at the respective substrate processing parts (or units), the symbol IND(L) indicates retrieving of the substrates from the indexer, and the symbol IND(UL) indicates returning of the substrates to the indexer.

TABLE 4

| | Processing unit | | | | | | | |
|---|---|---|---|---|---|---|---|---|
| | IND (L) | a | b | c | d | e | f | g | IND (UL) |
| Flow Step of Cassette n | 1 | a1 | b1 | c1 | d1 | e1 | f1 | — | (x) |
| Flow Step of Cassette n + 1 | 1 | a2 | b2 | c2 | d2 | e2 | — | g2 | (y) |
| Flow Step Difference $B_m$ | 0 | a1–a2 | b1–b2 | c1–c2 | d1–d2 | e1–e2 | 0 | 0 | (x–y) |

Table 4 shows the flow steps of the pair of the cassettes (n, n+1). The symbols a1 to f1 represent the flow steps of the precedent cassette (n) while the symbols a2 to g2 represent the flow steps of the subsequent cassette (n+1). The symbols x and y denote the position numbers. The hyphen denotes that there is not treatment to be performed at the substrate processing parts (or units).

In the case of the pair of the cassettes (n, n+1) shown in Tables 3 and 4, the flow step difference $B_m$ is calculated as 0, (a1–a2), (b1–b2), ... Hence, the largest one of the values 0, (a1–a2), (b1–b2), ... is the maximum flow step difference $B_n$. For convenience, the flow step difference $B_m$ is determined as 0 if the processing is not concurrent processing. The symbol (x–y) defines the processing position difference $A_n$.

Tables 5 and 6 below show examples of calculation of the flow step difference $B_m$ and the maximum flow step difference $B_n$.

TABLE 5

| Flow of Cassette n | IND (L) | - a - | b - | c - | d------ | IND (UL) |
|---|---|---|---|---|---|---|
| Flow of Cassette n + 1 | IND (L) | ------------ | | c - | d------ | IND (UL) |

Table 5 shows an example of the wafer flow of the pair of the cassettes (n, n+1). The symbols are the same as those in Table 3, and therefore, will not be described again.

TABLE 6

| | Processing unit | | | | | | | |
|---|---|---|---|---|---|---|---|---|
| | IND (L) | a | b | c | d | e | f | g | IND (UL) |
| Flow Step of Cassette n | 1 | 2 | 3 | 4 | 5 | — | — | — | (6) |
| Flow Step of Cassette n + 1 | 1 | — | — | 2 | 3 | — | — | — | (4) |
| Flow Step Difference $B_m$ | 0 | 0 | 0 | 2 | 2 | — | — | — | (2) |

Table 6 shows an example of calculation of the flow steps and the like of the pair of the cassettes (n, n+1). As clearly seen in Table 6, the flow step difference $B_m$ is 0 or 2 and hence the maximum flow step difference $B_n$ is 2.

As shown in FIG. 11, where concurrent processing is performed, of the flow steps which are found in the same manner as in the case of where concurrent processing is not performed, a value (the number of concurrent processing–1) is added to those which are related to the substrate processing parts (or units) in which concurrent processing is performed, to thereby determine new flow steps (Step S25).

Following this, the flow step differences $B_m$ are calculated as differences in the flow steps, and the flow step difference $B_m$ which has the largest value is determined as the maximum flow step difference $B_n$ (Step S24). As described above, the maximum flow step difference $B_n$ is found using the new flow steps which are defined by adding the value (the number of concurrent processing –1) with respect to the substrate processing parts (or units) in which concurrent processing is performed. This is to prevent contention between the substrates of the cassettes (n, n+1) at the substrate processing parts (or units) in which concurrent processing is performed. The term "–1" aims at preventing possible interference between the substrates of the two cassettes (n, n+1) even when it is unknown which substrate processing part (or unit) performing concurrent processing still contains the last substrate of the cassette (n).

Tables 7, 8 and 9 below show examples of calculation of the flow step differences $B_m$ and the maximum flow step difference $B_n$.

TABLE 7

| Flow of Cassette n | IND (L) | ⌈a⌉<br>- b -- d -- e -- f -- g --<br>⌊c⌋ | IND (UL) |
|---|---|---|---|
| Flow of Cassette n + 1 | IND (L) | - f -- g -- e -- a ------ | IND (UL) |

Table 7 shows an example of the wafer flows of the pair of the cassettes (n, n+1). The symbols are the same as those in Table 3, and therefore, will not be described again. Concurrent processing is performed at the beginning for the substrate of the cassette (n) as denoted as a, b and c. This concurrent processing might interfere with the last treatment a for the cassette (n+1).

TABLE 8

| | Processing unit | | | | | | | |
|---|---|---|---|---|---|---|---|---|
| | IND (L) | a | b | c | d | e | f | g | IND (UL) |
| Flow Step of Cassette n | | 1 | 2 | 2 | 2 | 5 | 6 | 7 | 8 |
| | | | (4) | (4) | (4) | | | | |
| (After, adding (the number of concurrent processing – 1)) | | | | | | | | | |
| Flow Step of Cassette n | | 1 | 5 | — | — | — | 4 | 2 | 3 |

TABLE 8-continued

| | Processing unit | | | | | | | |
|---|---|---|---|---|---|---|---|---|
| | IND (L) | a | b | c | d | e | f | g | IND (UL) |
| Flow Step | 0 | 0 | 0 | 0 | — | 2 | 5 | 5 |
| Difference $B_m$ | | | | | | | | |

Table 8 shows an example of calculation of the flow steps and the like of the pair of the cassettes (n, n+1). As clearly seen in Table 8, the flow step differences $B_m$ are 0, 2 and 5 and hence the maximum flow step difference $B_n$ is 5. The figures in parentheses regarding the flow steps of the cassette (n) correspond to the new flow steps which are obtained by adding the value (the number of concurrent processing−1) to the flow steps which are related to the substrate processing parts (or units) performing concurrent processing.

TABLE 9

| | Processing unit | | | | | | | |
|---|---|---|---|---|---|---|---|---|
| | IND (L) | a | b | c | d | e | f | g | IND (UL) |
| Flow Step of Cassette n | 1 | 5 | — | — | — | 4 | 2 | 3 |
| Flow Step of Cassette n' + 1 | 1 | 2 | 2 | 2 | 5 | 6 | 7 | 8 |
| Flow Step Difference $B_m$ | 0 | 3 | — | — | — | 0 | 0 | 0 |

Table 9 shows an example of calculation of the flow steps and the like of a pair of cassettes (n', n+1'). The pair of the cassettes (n', n'+1) is the same as the pair of the cassettes (n, n+1) as it is modified to replace the flow step of one of the cassettes with that of the other. In this case, it is not necessary to add the value (the number of concurrent processing−1) to the flow steps which are related to the substrate processing parts (or units) performing concurrent processing. As clearly seen in Table 9, the flow step differences $B_m$ are 0 and 3 and hence the maximum flow step difference $B_n$ is 3.

Lastly, as shown in FIG. 11, the larger one of the processing position difference $A_n$ and the maximum flow step difference $B_n$ is determined as the maximum value $W_n$ (Step S26). The maximum value $W_n$ expresses the number of circulating transportation during which retrieving of a substrate from the subsequent cassette (n+1) must be restricted to prevent interference between substrates of the two cassettes (n, n+1). That is, the maximum value $W_n$ expresses a loading wait cycle.

Figure 12:
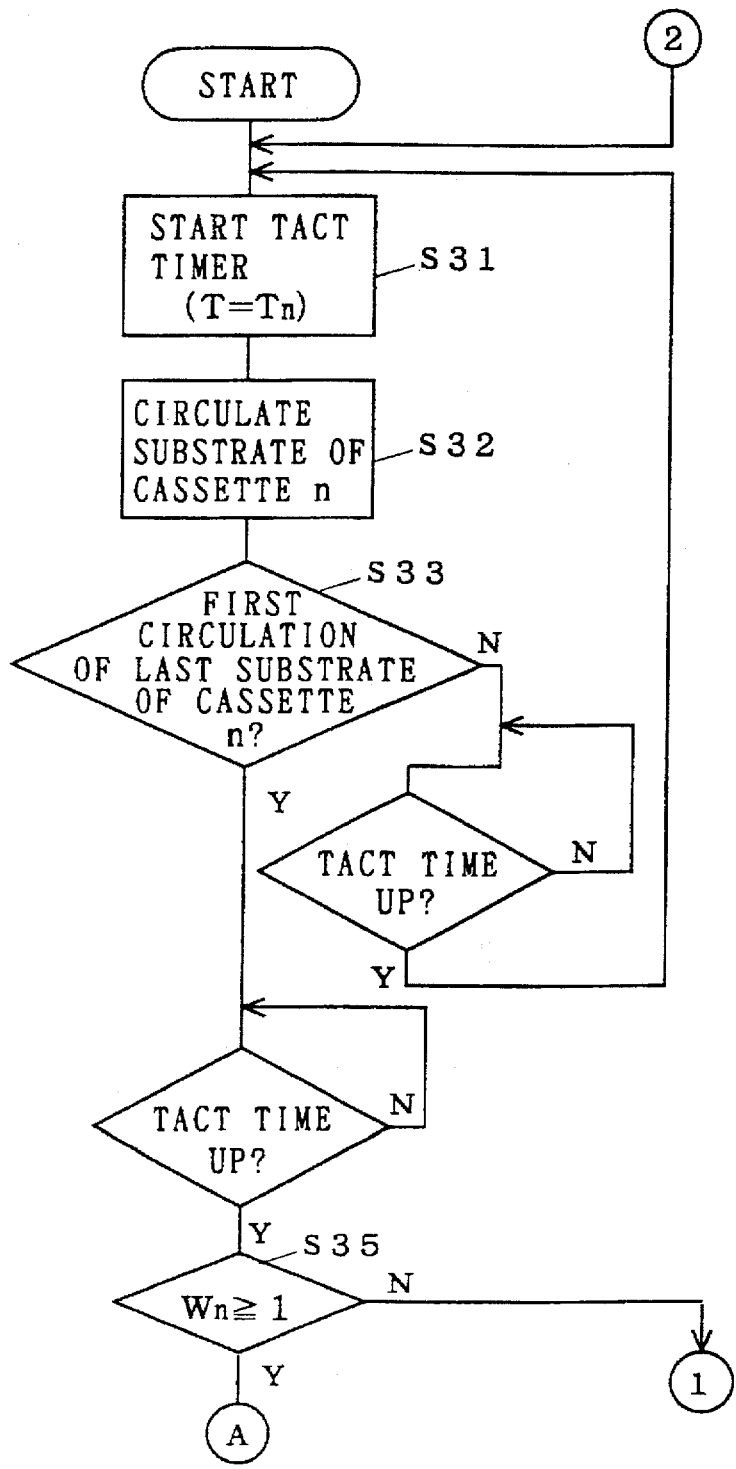
FIGS. 12 to 14 are flow charts showing transportation, suspension of loading and the like of substrates in the substrate processing apparatus according to the first preferred embodiment.
Figure 13:
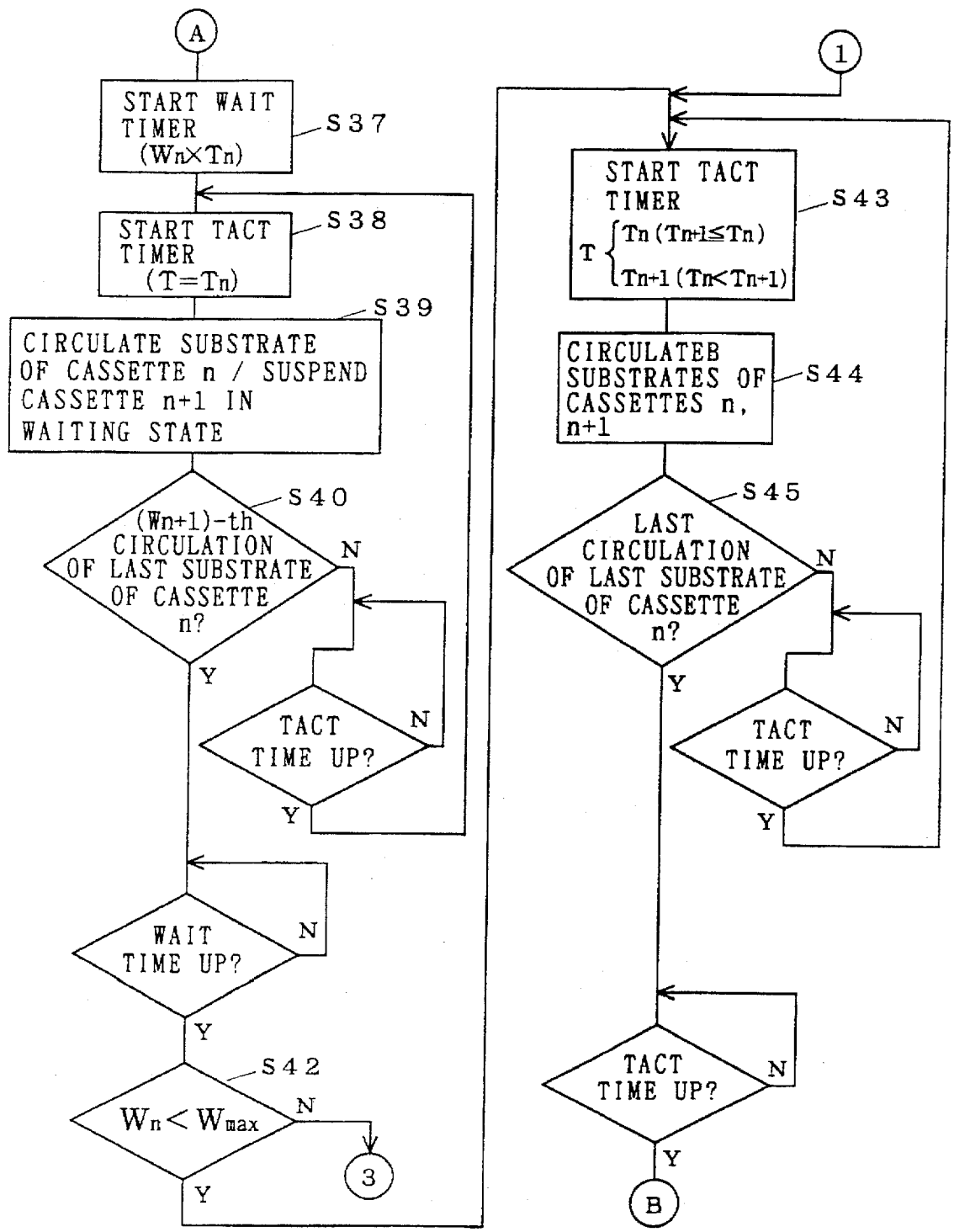
Figure 14:
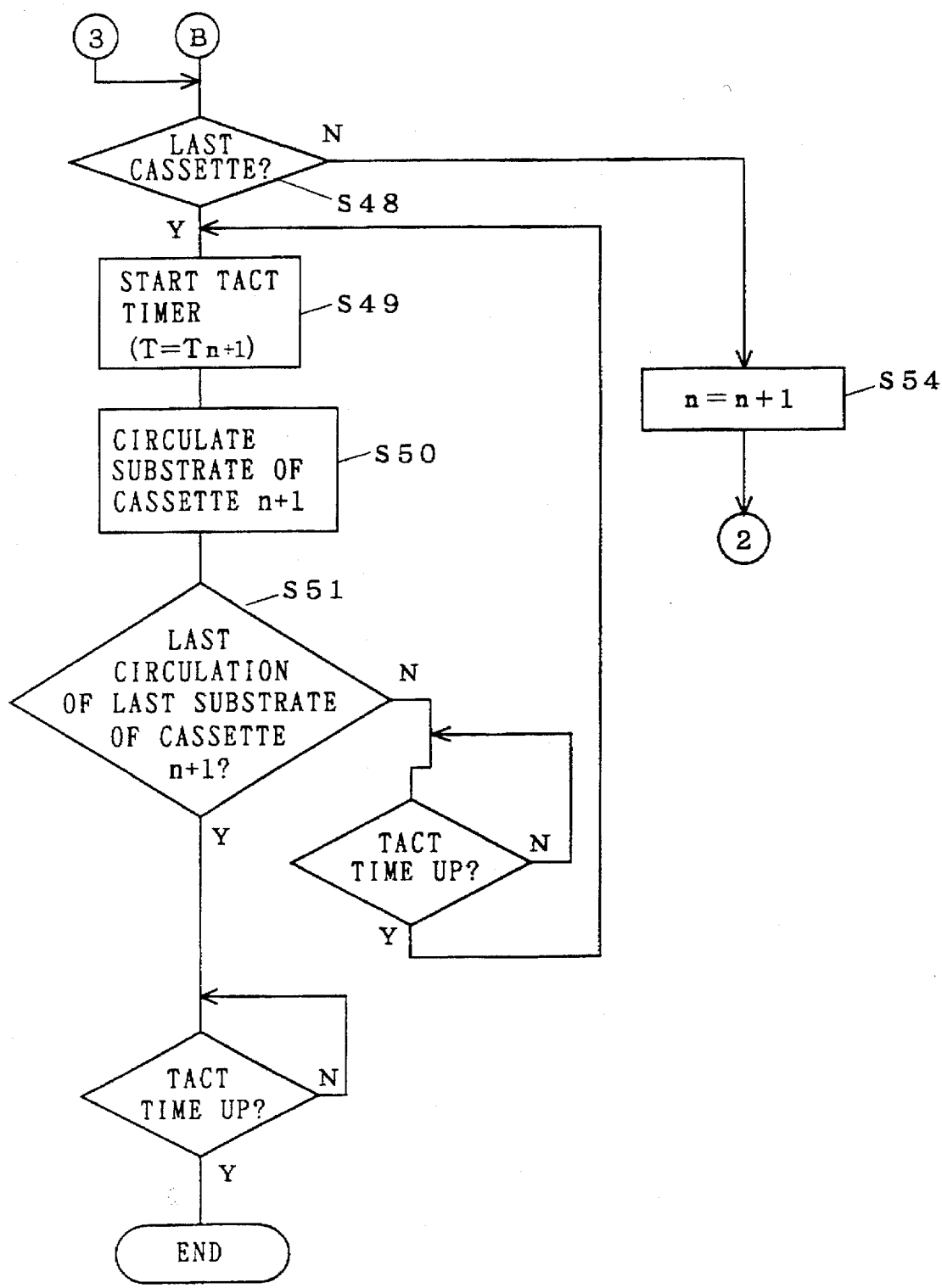

FIGS. 12 to 14 are flow charts showing procedures at Step S3 of FIG. 9 in detail. Under tact management and in accordance of wafer flows determined in advance and various processing conditions, the substrates 30 of each cassette are transported and processed in predetermined orders.

First, a tact timer is started (Step S31), and the transport robot 10 starts one cycle of circulating transportation of the substrates 30 of the first cassette 20 (where n=1) (Step S32), whereby the first substrate 30 is unloaded from the first cassette 20 to be ready in the indexer IND for transportation toward the substrate processing parts. Next, it is judged whether the current circulating transportation is the first cycle of circulating transportation of the last substrate 30 of the first cassette 20 (Step S33). Since NO, the sequence waits for a tact time $T_1$ and returns to Step S31. This is repeated to serially process the substrates 30 of the first cassette 20. When the first cycle of circulating transportation of the last substrate 30 is detected at Step S33, the sequence for the tact time $T_1$ and Step S35 is executed to judge whether a loading wait cycle $W_1$ is equal to or larger than 1.

A wait timer is started if it is judged at Step S35 that the loading wait cycle $W_1$ is equal to or larger than 1 so that retrieving of a substrate from the second cassette is to be restricted (Step S37). The tact timer is then started (Step S38). Next, one cycle of circulating transportation of the substrates 30 of the first cassette 20 is started (Step S39), suspending the second cassette 20 in a waiting state. Following this, it is judged whether the current circulating transportation is a (W+1)-th cycle of circulating transportation of the last substrate 30 of the first cassette 20 (Step S40). If NO, the sequence waits for the tact time $T_1$ and returns to Step S38. This is repeated to process the last substrate 30 of the first cassette 20.

If the (W+1)-th cycle of circulating transportation of the last substrate 30 is detected at Step S40, the sequence waits for a wait time $W_1 \times T_1$ so that the substrates 30 of the second cassette 20 are released from the waiting state. Next, it is judged whether the loading wait cycle $W_1$ is shorter than a standard wait cycle Wmax (Step S42). The standard wait cycle Wmax expresses the number of cycles during which processing of the substrate of the subsequent cassette must wait until processing of the substrate of the precedent cassette completes. In this example, the standard wait cycle Wmax is equal to 1 subtracted from the total position number of the wafer flows of the first cassette 20 (including the indexer IND).

The tact timer is started if it is judged that the loading wait cycle $W_1$ is shorter than the standard wait cycle Wmax (Step S43). As a tact time T, a longer one of the tact time $T_1$ and a tact time $T_2$ which is used for processing of the substrates of the second cassette. Next, one cycle of circulating transportation of the substrates 30 of the first and the second cassettes 20 is started (Step S44). At this stage, the transport robot 10 moves to circulate each substrate 30 of the first and the second cassettes 20. In other words, the transport robot 10 moves around, accessing all of the substrate processing parts (or units) which are to be engaged with in the wafer flows of the two cassettes 20. It is then judged whether the current circulating transportation is the last cycle of circulating transportation of the last substrate 30 of the first cassette 20 (Step S45). If NO, the sequence waits for the tact time T and returns to Step S43. This is repeated to serially and concurrently process the substrates 30 of the first and the second cassettes 20.

If the last cycle of circulating transportation of the last substrate 30 of the first cassette 20 is detected at Step S45, the sequence waits for the tact time T, and it is then judged whether the second cassette 20 containing the substrate 30 which is to be processed next is the last cassette (Step S48). The tact timer is started if the second cassette 20 is the last cassette so that processing of the substrates 30 of the second cassette 20 completes the sequence (Step S49). Next, the transport robot 10 performs one cycle of circulating transportation of the remaining substrates 30 of the second cassette 20 (Step S50), and it is then judged whether the current circulating transportation is the last cycle of circulating transportation of the last substrate 30 of the second cassette 20 (Step S51). Since NO, the sequence waits for the tact time $T_2$ and returns to Step S49. This is repeated to serially process the remaining substrates 30 of the second cassette 20. When the last cycle of circulating transportation of the last substrate 30 of the second cassette 20 is detected at Step S51, the sequence waits for the tact time $T_2$ and completes.

If it is judged that the cassette is not the last cassette at Step S48, the cassette number n and the maximum value $W_n$ are updated (Step S54), followed by successive processing of the second cassette 20 and a third cassette 20 at Steps S31 to S48. If it is judged that the cassette is not the last cassette again at Step S48, the cassette number is incremented or otherwise changed (Step S54) and the third cassette 20 and a fourth cassette 20 are successively processed (Steps S31 to S48). This is repeated until the last cassette is detected.

If it is judged at Step S35 that the loading wait cycle $W_1$ is shorter than 1 (that is, equal to 0) so that retrieving of a substrate from the second cassette is not to be restricted, the sequence proceeds to Step S43 to start the tact timer. Following this, Step S44 is executed to start one cycle of circulating transportation of the remaining substrates 30 of the first cassette 20 and the first substrate 30 of the second cassette 20. Next, Step S45 is executed to judge whether the current circulating transportation is the last cycle of circulating transportation of the last substrate 30 of the first cassette 20. If NO, the sequence waits for the tact time T and returns to Step S43. This is repeated until the last cycle of circulating transportation of the last substrate 30 of the first cassette 20 is detected. Upon detection, the sequence waits for the tact time T and returns to Step S48. Operations at subsequent Steps S48 to S54, similar to those where retrieving of a substrate from the second cassette is to be restricted, will not be described here.

If it is judged at Step S42 that the loading wait cycle $W_1$ is equal to Wmax, determining that retrieving of a substrate from the second cassette is to be restricted until processing for the substrates of the first cassette 20 completes, the sequence proceeds to Step S48 to judge whether the second cassette 20 containing the substrate 30 which is to be processed next is the last cassette. If NO, the cassette number is incremented (Step S54) and the sequence returns to the first step S31. If YES conversely, the sequence proceeds to Step S49 to start processing the second cassette.

Now, a specific example of an operation of the substrate processing apparatus according to the first preferred embodiment will be described.

Table 10 shows wafer processing cycles during a transition from one flow to another different flow in the apparatus of the first preferred embodiment where the apparatus successively processes the substrates which are contained in the pair of the cassettes (n, n+1) of Table 1 having different flows. Table 10 shows whether the substrates 30 are present in the substrate processing parts (or units) after one unprocessed substrate 30 retrieved from a wafer transfer position of the indexer IND and circulated by the transport robot 10 returns to the indexer IND as a processed substrate.

TABLE 10

| Wafer Processing Cycle in First Embodiment (Flex Flow) | | | | | | |
|---|---|---|---|---|---|---|
| Cassette n | (1) IND | (2) HP1 | (3) CP | (4) SC | (5) HP2 | HP3 | (6) IND |
| Cassette n + 1 Processing Cycle | (1) | (2) | (3) | (4) | | (5) | (6) |
| 1 | B | [A] | A | A | A | X | A |
| | * Cassette n + 1 is started immediately after the cassette end wafer [A] of cassette n is started. | | | | | | |
| 2 | B | B | [A] | A | A | X | A |
| 3 | B | B | B | [A] | A | X | A |
| 4 | B | B | B | B | [A] | X | A |
| 5 | B | B | B | B | X | B | [A] |
| | * Cassette end wafer [A] is transferred to IND. | | | | | | |
| 6 | B | B | B | B | X | B | B |
| | * Wafer of cassette n + 1 is transferred to IND without a break between cycles. | | | | | | |

In Table 10, the letter A expresses that the substrate 30 of the precedent cassette (n) is present, the letter B expresses that the substrate 30 of the subsequent cassette (n+1) is present, and the letter X expresses that the substrate 30 is not present. The symbol [A] expresses that the last substrate 30 of the cassette (n) is present.

As clearly seen in Table 10, the substrates of the cassettes (n, n+1) having different flows are processed successively without a break. Hence, a time loss is eliminated which is created where retrieving of a substrate from the subsequent cassette (n+1) is temporarily suspended.

Table 11 below shows wafer processing cycles in the conventional apparatus during successive processing of the substrates which are contained in the pair of the cassettes (n, n+1) of Table 1 having different flows.

TABLE 11

| Conventional Wafer Processing Cycle | | | | | | |
|---|---|---|---|---|---|---|
| Cassette n | (1) IND | (2) HP1 | (3) CP | (4) SC | (5) HP2 | HP3 | (6) IND |
| Cassette n + 1 Processing Cycle | (1) | (2) | (3) | (4) | | (5) | (6) |
| 1 | [A] | A | A | A | A | X | A |
| 2 | X | [A] | A | A | A | X | A |
| 3 | X | X | [A] | A | A | X | A |
| 4 | X | X | X | [A] | A | X | A |
| 5 | X | X | X | X | [A] | X | A |
| 6 | X | X | X | X | X | X | [A] |
| | * Cassette end wafer [A] is transferred to IND. | | | | | | |
| 7 | B | X | X | X | X | X | X |
| | * Cassette n + 1 is started after the cassette end wafer is returned to the cassette. | | | | | | |
| 8 | B | B | X | X | X | X | X |
| 9 | B | B | B | X | X | X | X |
| 10 | B | B | B | B | X | X | X |
| 11 | B | B | B | B | X | B | X |
| 12 | B | B | B | B | X | B | B |
| | * Wafer returning to IND waits for five cycles. | | | | | | |

As clearly seen in Table 11, retrieving of a substrate from the subsequent cassette (n+1) is suspended for five cycles after retrieving of the last substrate from the precedent cassette (n), and therefore, a wait time is five cycles longer than in the first preferred embodiment shown in Table 10.

Table 12 shows the through puts between the wafer cycle of Table 10 and that of Table 11.

TABLE 12

Improvement in Through Put

| | The number of cycles during which retrieving must be restricted | Time loss | Through put in repeated successive processing |
|---|---|---|---|
| Coventional | 5 | 300 sec | 50 substrates/hour |
| First Embodiment Flex Flow | 0 | 0 | 60 substrates/hour |

As clearly seen in Table 12, the through put of the first preferred embodiment in which 60 substrates are processed per hour is 1.2 times as large as the through put of the conventional processing in which 50 substrates are processed per hour. The figures listed in Table 12 are calculated on a premise that 25 substrates 30 are contained in each one of the cassettes (n, n+1), the tact time is equally 60 seconds, and that the cassettes (n, n+1) are infinitely retrieved one after another.

Figure 15:
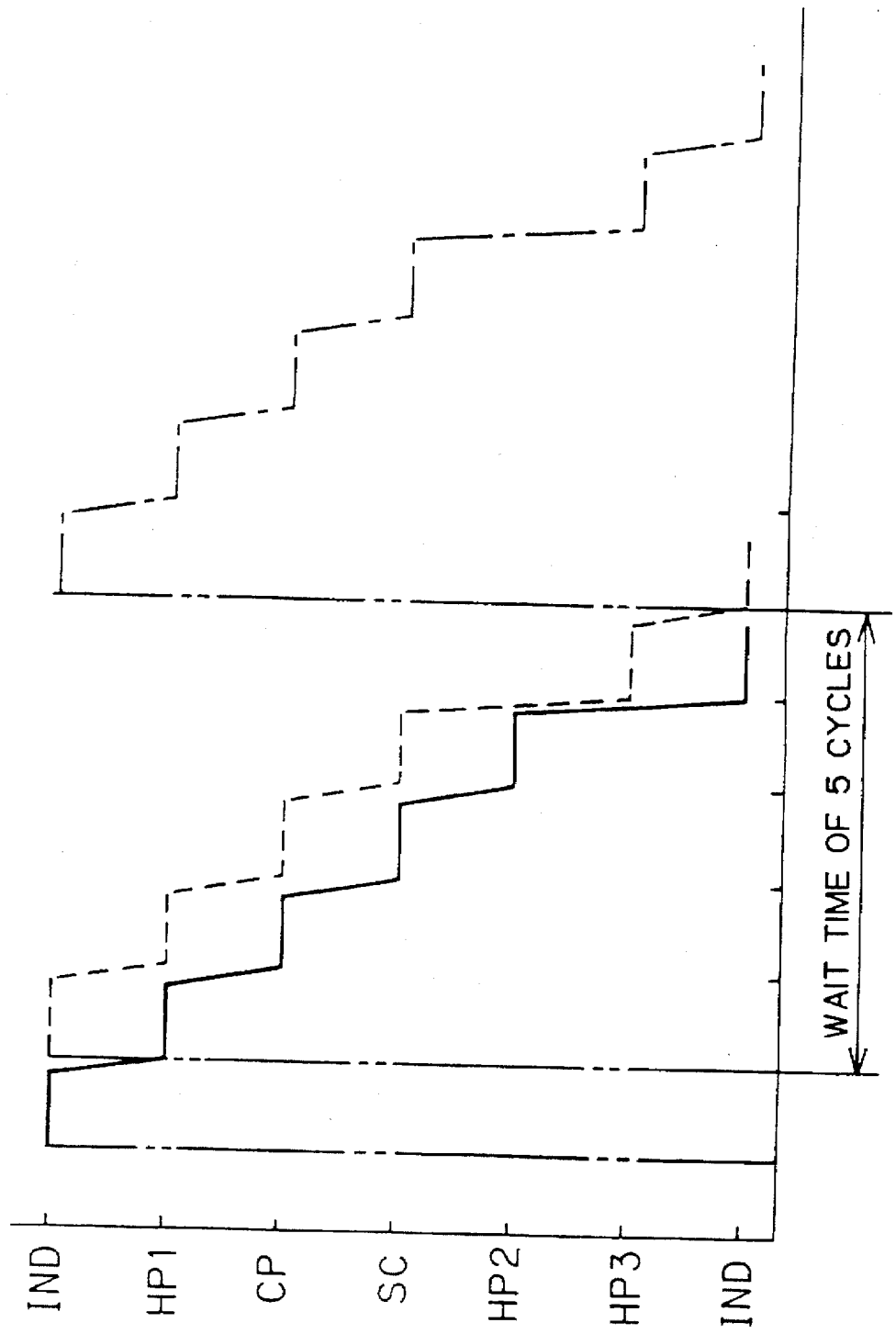
FIG. 15 is a graph of flows and timing of wafer processing in the substrate processing apparatus according to the first preferred embodiment.

FIG. 15 shows a specific example of the wafer processing flows and timing of Tables 10 and 11. The horizontal axis expresses time, i.e., cycles, while the vertical axis denotes the substrate processing parts (or units). The processing timing of the last substrate 30 of the precedent cassette (n) is indicated by the solid line, the processing timing of the first substrate 30 of the subsequent cassette (n+1) in the apparatus of the first preferred embodiment is indicated by the dotted line, and the processing timing of the first substrate 30 of the subsequent cassette (n+1) in the conventional apparatus is indicated by the dotted-and-dashed line. FIG. 15 clearly shows that five wait cycles are created in the conventional processing indicated by the dotted-and-dashed line, whereas there is no wait cycle created in the first preferred embodiment.

Table 13 below shows wafer processing cycles during a transition from one flow to another different flow of the apparatus of the first preferred embodiment where the apparatus successively processes the substrates which are contained in the pair of the cassettes (n, n+1) of Table 2 having different flows.

TABLE 13

Wafer Processing Cycle in First Embodiment (Flex Flow)

| Cassette n | (1) IND | (2) HP1 | (3) CP | (4) SC | (5) HP2 | (6) IND |
|---|---|---|---|---|---|---|
| Cassette n + 1 Processing Cycle | (1) | | | (2) | (3) | (4) |
| 1 | X | [A] | A | A | A | A |
| 2 | X | X | [A] | A | A | A |
| 3 | B | X | X | [A] | A | A |

\* Cassette n + 1 is started after two wafers.

| 4 | B | X | X | B | [A] | A |
| 5 | B | X | X | B | B | [A] |

\* Cassette end wafer [A] is transferred to IND.

| 6 | B | X | X | B | B | B |

\* Wafer of cassette n + 1 is transferred to IND without a break between cycles.

As clearly seen in Table 13, the substrates of the cassettes (n, n+1) having different flows are processed successively without a break and a time loss is eliminated. However, loading from the subsequent cassette (n+1) must wait for two cycles because of a difference in the processing position and a difference in the flow steps.

Table 14 below shows wafer processing cycles of the conventional apparatus during successive processing of the substrates which are contained in the pair of the cassettes (n, n+1) of Table 2 having different flows.

TABLE 14

Conventional Wafer Processing Cycle

| Cassette n | (1) IND | (2) HP1 | (3) CP | (4) SC | (5) HP2 | (6) IND |
|---|---|---|---|---|---|---|
| Cassette n + 1 Processing Cycle | (1) | | | (2) | (3) | (4) |
| 1 | X | [A] | A | A | A | A |
| 2 | X | X | [A] | A | A | A |
| 3 | X | X | X | [A] | A | A |
| 4 | X | X | X | X | [A] | A |
| 5 | X | X | X | X | X | [A] |

\* Cassette end wafer [A] is transferred to IND.

| 6 | B | X | X | X | X | X |

\* Cassette n + 1 is started after the cassette end wafer is returned to the cassette.

| 7 | B | X | X | B | X | X |

\* Wafer skips HP1/CP1 and is loaded into SC.

| 8 | B | X | X | B | B | X |
| 9 | B | X | X | B | B | B |

\* Wafer returning to IND waits for three cycles.

As clearly seen in Table 14, a wait time is three cycles longer than in the first preferred embodiment as it is shown in Table 13 since retrieving of the first substrate from the subsequent cassette (n+1) must wait for five cycles. If the order of the cassettes is reverse, no wait time is created in the first preferred embodiment whereas a wait time of three cycles is created in the conventional apparatus.

Table 15 below shows the through puts between the wafer cycle of Table 10 and that of Table 11.

TABLE 15

| | The number of cycles during which retrieving must be restricted | Time loss (per cassette) | Through put in repeated successive processing |
|---|---|---|---|
| Coventional | 5 | 300 sec | 50.8 substrates/hour |
| Flex Flow | 2 | 120 sec | 57.7 substrates/hour |

Table 15 clearly shows that the through put of the first preferred embodiment in which 57.7 substrates are processed per hour is 1.14 times as large as the through put of the conventional processing in which 50.8 substrates are processed per hour. The figures listed in Table 15 are calculated on a premise that 25 substrates 30 are contained in each one of the cassettes (n, n+1), the tact time is equally 60 seconds, and that the cassettes (n, n+1) are infinitely retrieved one after another.

Table 16 below shows a wafer processing cycle during a transition from one flow to another different flow of the apparatus of the first preferred embodiment where the apparatus successively processes the substrates which are contained in the pair of the cassettes (n, n+1) of Table 8 having different flows. The wafer flow of the cassette (n) includes concurrent processing.

TABLE 16

Wafer Processing Cycle Including Concurrent Processing

|  |  |  |  |  |  |  |  |  | $W_n = 5$ |
|---|---|---|---|---|---|---|---|---|---|
| Cassette n | (1) | (2)<br>((4)) | (2)<br>((4)) | (2)<br>((4)) | (3) | (4) | (5) | (6) | (7) |
|  | IND |  | a  b  c |  | d | e | f | g | IND |
|  | (L) |  |  |  |  |  |  |  | (UL) |
| Cassette n + 1 | (1) | (5) |  |  |  | (4) | (2) | (3) | (6) |
| Processing Cycle |  |  |  |  |  |  |  |  |  |
| 1 | X | A | A | [A] | A | A | A | A | A |
| *2 | X | X | A | [A] | A | A | A | A | A |
| 3 | X | X | X | [A] | A | A | A | A | A |
| 4 | X | X | X | X | [A] | A | A | A | A |
| 5 | X | X | X | X | X | [A] | A | A | A |
| 6 | B | X | X | X | X | X | [A] | A | A |
| *7 | B | X | X | X | X | X | X | [A] | A |
| 8 | B | X | X | X | X | X | B | B | [A] |
| 9 | B | X | X | X | X | B | B | B | X |
| 10 | B | B | X | X | X | B | B | B | X |
| 11 | B | B | X | X | X | B | B | B | B |
| 12 | B | B | X | X | X | B | B | B | B |

As clearly seen in Table 16, retrieving of a substrate from the subsequent cassette (n+1) is suspended for five cycles during successive processing of the cassettes (n, n+1). Thus, a wait time is three cycles shorter in the first preferred embodiment than in the conventional apparatus in which a wait time lasts for eight cycles.

Table 17 below shows a wafer processing cycle of the conventional apparatus during successive processing of the substrates which are contained in the pair of the cassettes (n, n+1) of Table 9 having different flows. In Table 17, the processing order of one of the cassettes (n, n+1) is replaced with that of the other. Hence, the wafer flow of the cassette (n+1) includes concurrent processing. The symbol [B] expresses that the last substrate 30 of the cassette (n) is present.

embodiment than in the conventional apparatus in which a wait time lasts for five cycles.

The first preferred embodiment is related to where the substrate processing parts (or units) do not include an interface buffer, a device which serves as an interface with an external device such as a stepper which is externally connected to the substrate processing apparatus. In general, an external device such as a stepper operates with its own special cycle time which is different from the tact time of the substrate processing apparatus of the first preferred embodiment, and therefore, tact management is impossible. Hence, when a wafer flow which includes an interface buffer is to be followed by another wafer flow, tact management of the subsequent wafer flow is impossible. To deal with this, the loading wait cycle $W_n$ is calculated as in the first

TABLE 17

Wafer Processing Cycle Including Concurrent Processing

|  |  |  |  |  |  |  |  |  | $W_n = 3$ |
|---|---|---|---|---|---|---|---|---|---|
| Cassette n | (1) | (5) |  |  |  | (4) | (2) | (3) | (6) |
|  | IND |  | a  b  c | | d | e | f | g | IND |
|  | (L) |  |  |  |  |  |  |  | (UL) |
| Cassette n + 1 | (1) | (2) | (2) | (2) | (3) | (4) | (5) | (6) | (7) |
| Processing Cycle |  |  |  |  |  |  |  |  |  |
| 1 | X | B | X | X | X | B | [B] | A | B |
| *2 | X | B | X | X | X | B | X | [B] | B |
| 3 | X | B | X | X | X | [B] | X | X | B |
| 4 | A | [B] | X | X | X | X | X | X | B |
| *5 | A | A | X | X | X | X | X | X | [B] |
| 6 | A | A | X | X | X | X | X | X | X |
| 7 | A | A | A | A | X | X | X | X | X |
| 8 | A | A | A | A | A | X | X | X | X |

Table 17 clearly shows that retrieving of a substrate from the subsequent cassette (n+1) is suspended for three cycles during the successive processing of the cassettes (n, n+1). Thus, a wait time is two cycles shorter in the first preferred preferred embodiment with respect to both the wafer flow of the precedent cassette and that of the subsequent cassette after the interface buffer (See FIGS. 10 and 11) to make it possible to perform tact management of the wafer flow of the subsequent cassette. Calculation of the loading wait cycle $W_n$ is performed with the interface buffer replaced with retrieving of the substrate 30 from the indexer IND. In this case, tact management is started when processing in the wafer flow of the precedent cassette up to the interface buffer completely ends and retrieving of the last substrate of the precedent cassette 20 from the interface buffer completes. The loading wait cycle $W_n$ is then calculated and the subsequent cassette 20 is processed after suspended. Alternatively, the subsequent cassette 20 is processed after suspended in accordance with a preliminarily calculated loading wait cycle $W_n$.

In accordance with the calculation method as that of FIGS. 10 and 11, Loading Wait Cycle $W_n=2$ when the substrates of the pair of the cassettes (n, n+1) are processed successively. On the other hand, when the last substrate 30 of the cassette (n) is to be processed in the substrate processing parts (or units) which are to be engaged with the treatment c, the loading wait cycle $W_n$ is shortened since possible contention for the treatment $\alpha$ is caused by the second last or the previous substrate 30.

Figure 16:
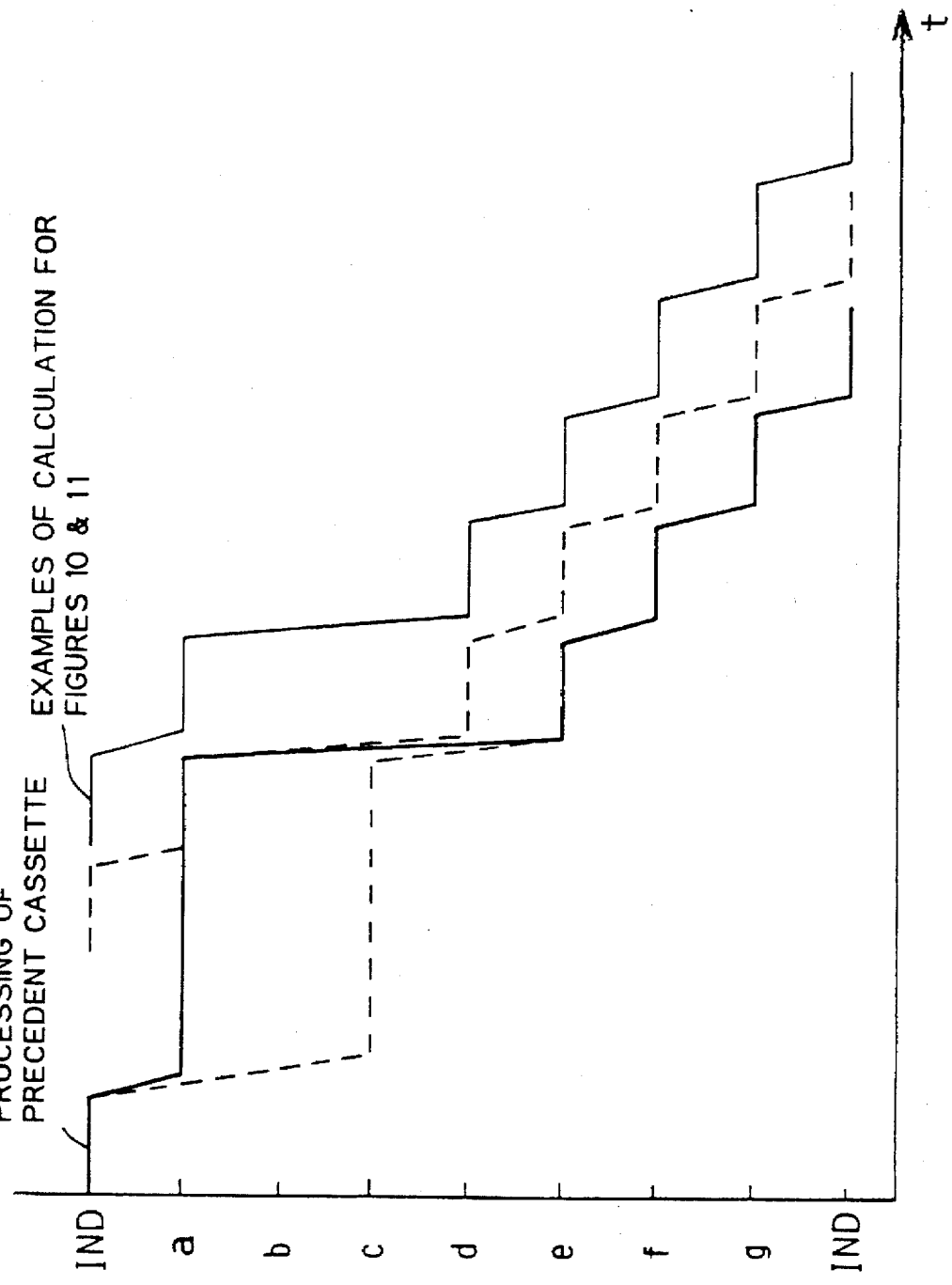
FIG. 16 is a graph of flows and timing of wafer processing in a modified version of the substrate processing apparatus according to the first preferred embodiment.

FIG. 16 shows a specific example of the wafer processing flow and timing of Table 19. The horizontal axis expresses

TABLE 18

| Cassette n | IND (L) | SC | HP1 | CP1 | (1) IF-B | (2) DEV | (3) HP2 | (4) CP2 | | | (5) IND (UL) |
|---|---|---|---|---|---|---|---|---|---|---|---|
| Cassette n + 1 | | | | | (1) IND (L) | | (2) HP2 | (3) CP2 | (4) SC | (5) HP3 | (6) CP3 | (7) IND (UL) |

Table 18 above shows an example of the wafer flows of the pair of the cassettes (n, n+1). The wafer flow of the precedent cassette (n) includes a treatment (IF-B) at the interface buffer and a treatment (DEV) at the spin developer SD. In this example, Processing Position Difference $A_n=0$, Flow Step Difference $B_m=1$, and Maximum Flow Step Difference $B_n=1$. Hence, the loading wait cycle $W_n$ at successive loading of the substrate from the subsequent cassette (n+1) is, Loading Wait Cycle $W_n=1$.

In the first preferred embodiment, when the precedent cassette 20 is to undergo concurrent processing, new flow steps are defined by adding the value (the number of concurrent processing–1) with respect to the substrate processing parts (or units) performing concurrent processing, thereby preventing contention between substrates of the precedent and the subsequent cassettes 20 at the substrate processing parts (or units) in which concurrent processing is performed. It is to be noted that this is a countermeasure assuming the worst scenario. For instance, it is possible that the last substrate 30 of the precedent cassette 20 is not to be processed in a certain substrate processing part (or unit) in which the substrates of the subsequent cassette 20 is processed. In this case, in terms of circulating transportation, the second last or the previous substrate of the precedent cassette 20 is virtually the last substrate of this cassette 20. Hence, the flow step difference $B_m$ is calculated noting the nature of this substrate processing part (or unit) which is skipped (Specifically, values (the number of concurrent processing–2), (the number of concurrent processing–3), . . . are added to the flow steps.). As a result, the loading wait cycle $W_n$ is shortened as a whole. Even when principally the earlier substrates of the subsequent cassette 20 are to be processed concurrently, it is possible to reduce the flow step difference $B_m$ and shorten the overall loading wait cycle $W_n$ in the same manner as above.

Table 19 below shows wafer flows including concurrent processing as above.

TABLE 19

| Flow of Cassette n (L) | IND (L) | ⌈a⌉ -b-- ⌊c⌋ | e— | f— | g------ | | IND (UL) |
|---|---|---|---|---|---|---|---|
| Flow of Cassette n + 1 (L) | IND (L) | -a— | b-- | e-- | f-- | g-- | IND (UL) |

In Table 19, the wafer flow of the precedent cassette (n) includes concurrent processing. That is, treatments a, b and c on substrates of the cassette (n) are performed concurrently.

time, i.e., cycles while the vertical axis denotes the substrate processing parts (or units). In FIG. 16, the solid line expresses a case where the loading wait cycle $W_n$ is calculated in the calculation method as that of FIGS. 10 and 11, while the dotted line expresses a case where the cassettes (n, n+1) are linked to each other most efficiently. As clearly shown in FIG. 16, loading of the substrates from the subsequent cassette (n+1) is advanced one cycle.

C. Structure of Substrate Processing Apparatus of Second Preferred Embodiment

A substrate processing apparatus according to a second preferred embodiment does not perform tact management. The substrate processing apparatus of the second preferred embodiment is otherwise almost the same as the substrate processing apparatus of the first preferred embodiment. The structure of the substrate processing apparatus of the second preferred embodiment is virtually the same as that shown in FIGS. 7 and 8. The only difference is the structure of the controller 50. For this reason, a detailed description regarding the structure of the substrate processing apparatus will be given while describing an operation of the substrate processing apparatus.

D. Operation of Substrate Processing Apparatus of Second Preferred Embodiment

The substrate processing apparatus according to the second preferred embodiment does not perform tact management. An operation of the substrate processing apparatus of the second preferred embodiment is otherwise almost the same as that of the substrate processing apparatus of the first preferred embodiment. The operation of the substrate processing apparatus of the second preferred embodiment is virtually the same as that shown in FIG. 9. The only difference is transportation and etc. (Step S3). For this reason, only transportation and etc. (Step S3) will be described below.

Figure 17:
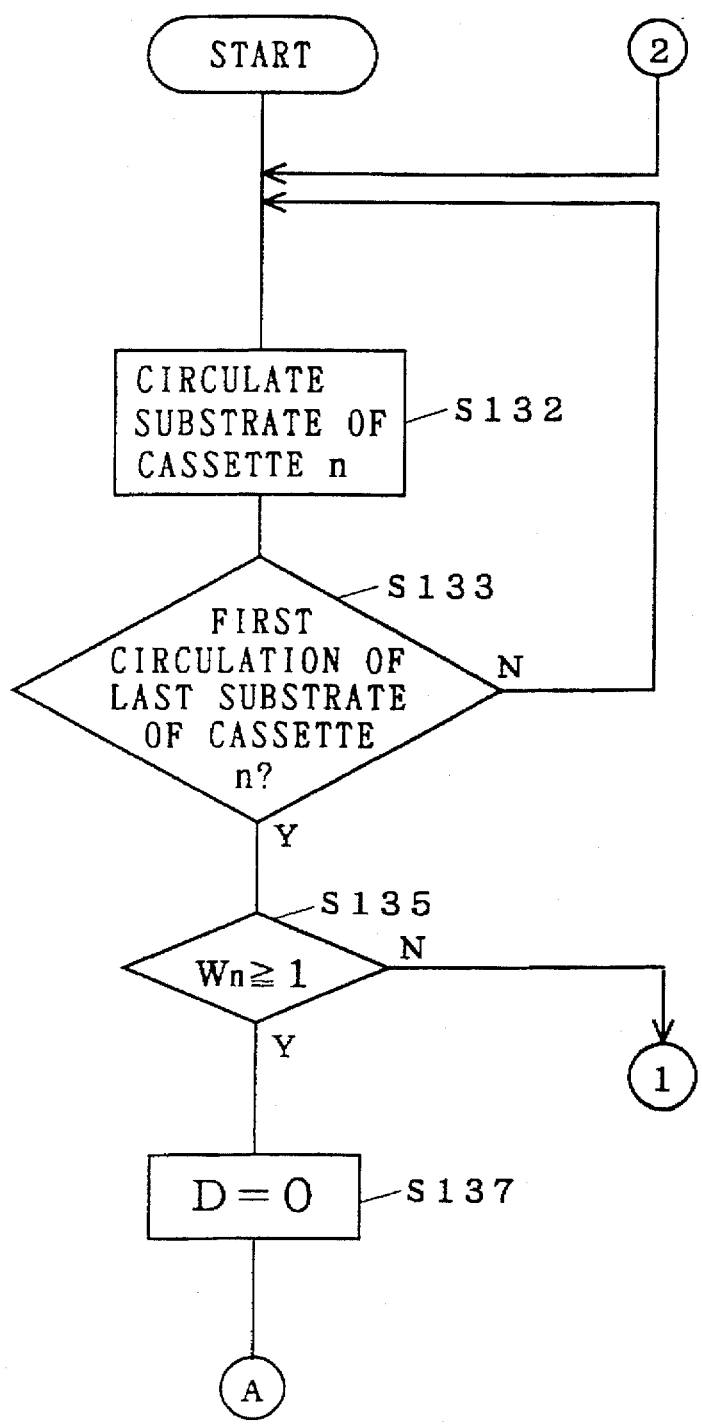
FIGS. 17 to 19 are flow charts showing transportation, suspension of loading and the like of substrates in a substrate processing apparatus according to a second preferred embodiment of the present invention.
Figure 18:
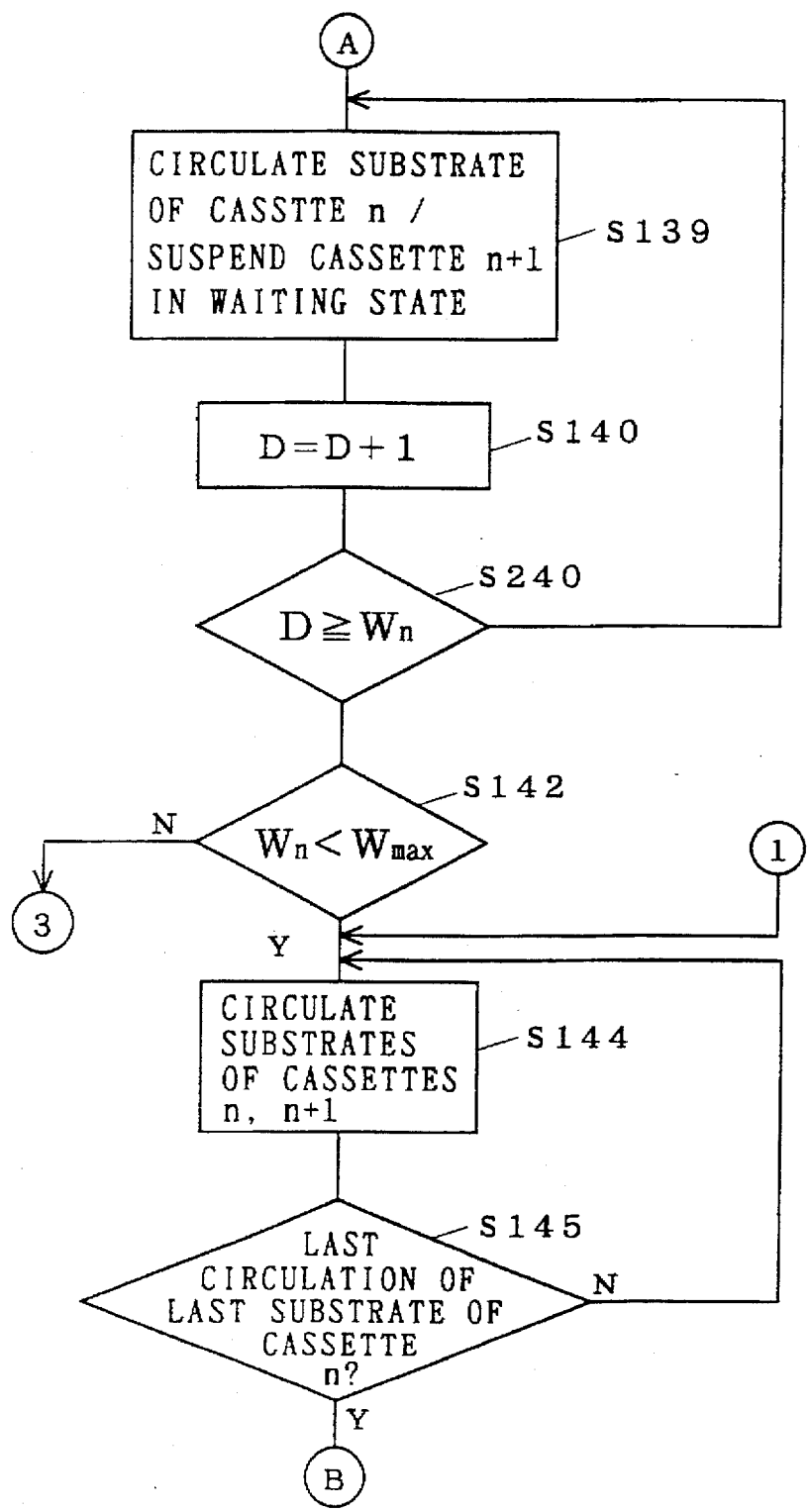
Figure 19:
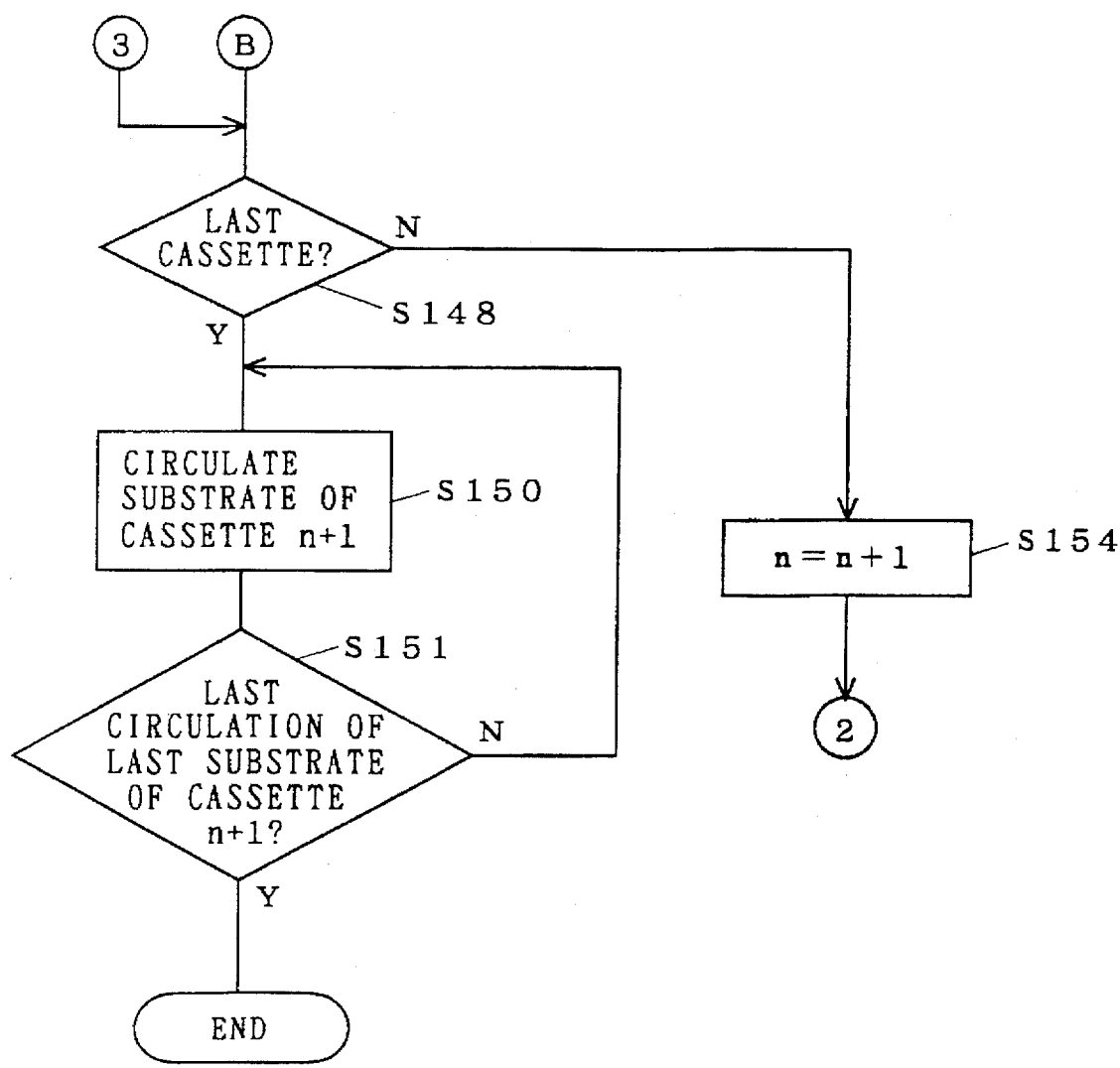

FIGS. 17 to 19 are flow charts showing the details of transportation and other operations (Step S3).

First, the transport robot 10 starts one cycle of circulating transportation of the substrates 30 of the first cassette 20 (where n=1) (Step S132), whereby the first substrate 30 is retrieved from the first cassette 20 to be ready in the indexer IND for loading into the substrate processing parts. Next, it is judged whether the current circulating transportation is the first cycle of circulating transportation of the last substrate 30 of the first cassette 20 (Step S133). Since NO, the sequence returns to Step S132. This is repeated to serially process the substrates 30 of the first cassette 20. When the first cycle of circulating transportation of the last substrate 30 is detected at Step S133, it is judged whether the loading wait cycle $W_1$ is equal to or larger than 1 (Step S135).

If it is judged at Step S135 that the loading wait cycle $W_1$ is equal to or larger than 1, indicating that retrieving of the substrate from the second cassette must be restricted, a count D registered by the counter is reset as D=0 to an initial state (Step S137). Next, one cycle of circulating transportation of the substrates 30 of the first cassette 20 is started (Step S139), thereby suspending the second cassette 20 in a waiting state. The registered count D is then incremented by 1 (Step S140), and it is judged whether the count D is equal to or larger than the loading wait cycle $W_1$ (Step S240). If NO, the sequence returns to Step S139. This is repeated to process the last substrate 30 of the first cassette 20.

If it is judged at Step S240 that the count D is equal to or larger than the loading wait cycle $W_1$, the substrates 30 of the second cassette 20 are released from the waiting state. Whether the loading wait cycle $W_1$ is shorter than the standard wait cycle Wmax is then judged (Step S142), and if YES, one cycle of circulating transportation of the substrates 30 of the first and the second cassettes 20 is started (Step S144). Next, it is judged whether the current circulating transportation is the last cycle of circulating transportation of the last substrate 30 of the first cassette 20 (Step S145). If NO, the sequence returns to Step S144. This is repeated to serially process the substrates 30 of the first and the second cassettes 20.

If the last cycle of circulating transportation of the last substrate 30 of the first cassette 20 is detected at Step S145, whether the second cassette 20 containing the substrate 30 which is to be processed next is the last cassette is judged at Step S148. If processing of the substrates 30 of the second cassette 20 is to complete the sequence, the second cassette 20 is determined as the last cassette and the transport robot 10 starts one cycle of circulating transportation of the remaining substrates 30 of the second cassette 20 (Step S150). Next, it is judged whether the current circulating transportation is the last cycle of circulating transportation of the last substrate 30 of the second cassette 20 (Step S151). Since NO, the sequence returns to Step S150. This is repeated to serially process the remaining substrates 30 of the second cassette 20. The sequence is ended upon detection at Step S151 of the last cycle of circulating transportation of the last substrate 30.

When it is judged that the second cassette 20 is not the last cassette at Step S148, the cassette number is incremented (Step S154) and the second cassette 20 and substrates stored in a third cassette 20 are successively processed (Steps S132 to S148). This is repeated until the last cassette is detected.

If it is judged at Step S135 that the loading wait cycle $W_1$ is smaller than 1 (that is, equal to 0) so that retrieving of the substrate from the second cassette is not to be restricted, the sequence proceeds to Step S144, starting one cycle of circulating transportation of the remaining substrates 30 of the first cassette 20 and the first substrate 30 of the second cassette 20. Next, Step S145 is executed to judge whether the current circulating transportation is the last cycle of circulating transportation of the last substrate 30 of the first cassette 20. If NO, the sequence returns to Step S144. This is repeated until the last cycle of circulating transportation of the last substrate 30 of the first cassette 20 is detected. Upon detection of the last cycle, the sequence proceeds to Step S148. Steps 148 to S154, similar to those where retrieving of the substrate from the second cassette is to be restricted, will not be described here.

If it is found at Step 142 that the loading wait cycle $W_1$ is equal to Wmax, assuming that retrieving of the substrate from the second cassette is to be restricted until processing for the first cassette 20 completes, the sequence proceeds to Step S148 to judge whether the second cassette 20 containing the substrate 30 which is to be processed next is the last cassette. If NO, the cassette number is incremented (Step S154) and the sequence returns to the first step S132. If YES conversely, the sequence proceeds to Step S150 to start processing the second cassette.

The present invention, heretofore described in relation to the first and the second preferred embodiments, is not restricted to these particular embodiments. For example, the loading wait cycle $W_n$ may not be equal to the maximum flow step difference $B_n$ or the processing position difference $A_n$. That is, one cassette of a certain lot never passes a precedent cassette of a different lot when the loading wait cycle $W_n$ is larger than the maximum flow step difference $B_n$ or the processing position difference $A_n$, which in turn never allows interference between substrates of these two cassettes. On the other hand, if the loading wait cycle $W_n$ is shorter than the standard wait cycle (the wait cycle in the conventional method), the through put is improved.

Further, although the first preferred embodiment uses the longer one of different tact times of two successive cassettes of different lots which are within the apparatus, this may not be necessary. For instance, if the tact time of the precedent cassette is longer, the tact time of the subsequent cassette may be adjusted to the tact time of the precedent cassette. In this case, however, the two cassettes must be processed such that the effect created by extending the tact time and setting the loading wait cycle shorter than the standard wait cycle is not be offset. Meanwhile, if the two successive cassettes have the same tact time, it is possible to process the two cassettes both with a constant cycle time, or a tact time.

In addition, although the foregoing has described the first and the second preferred embodiments as both related only to successive processing of substrates having different flows (i.e., wafer flows), the present invention is also applicable to successive processing of different recipes in which various process data such as a processing temperature, a processing time, a rotation number and a processing fluid as well as through puts are different although the wafer flows are the same. Even in such successive processing, the through put is improved by appropriately delaying the loading timing of a subsequent lot in each cycle.

Still further, in the first and the second preferred embodiments, the contents of the wafer flows of the lots having the different flows are inputted in advance (Step S1 in FIG. 9), the loading wait cycle $W_n$ is determined (Step S2 in FIG. 9), and the substrates of each cassette 20 are circulated serially (Step S3 in FIG. 9). However, the content of the wafer flow of the later lot may be inputted immediately after the start of a circulation of the earlier lot, followed by determination of the loading wait cycle $W_n$. A circulation of the later lot may be then started after the loading wait cycle $W_n$.

E. Structure of Substrate Processing Apparatus of Third Preferred Embodiment

A substrate processing apparatus according to a third preferred embodiment is modification of the substrate processing apparatus of the first preferred embodiment. The apparatus of the third preferred embodiment performs interrupting processing in which processing of the current lot is temporarily suspended and other lot having a different flow is processed, whereas the apparatus of the first preferred embodiment links processing for lots which have different flows from each other and successively processes substrates of these lots. The substrate processing apparatus of the third preferred embodiment is otherwise almost the same as the substrate processing apparatus of the first preferred embodiment. The structure of the substrate processing apparatus of the third preferred embodiment is virtually the same as that shown in FIGS. 7 and 8. The only difference is the structure of the controller 50. For this reason, a detailed description regarding the structure of the substrate processing apparatus will be given while describing an operation of the substrate processing apparatus.

F. Operation of Substrate Processing Apparatus of Third Preferred Embodiment

FIGS. 20 to 28 are flow charts showing an operation of the substrate processing apparatus of the third preferred embodiment. In the third preferred embodiment, the substrate processing apparatus temporarily suspends processing of an interrupted lot and processes an interrupting lot first which has a different flow from that of the interrupted lot while performing tact management. In the following, an operation of the substrate processing apparatus, and particularly procedures of transporting the substrates 30 will be described with reference to the flow charts.

Figure 20:
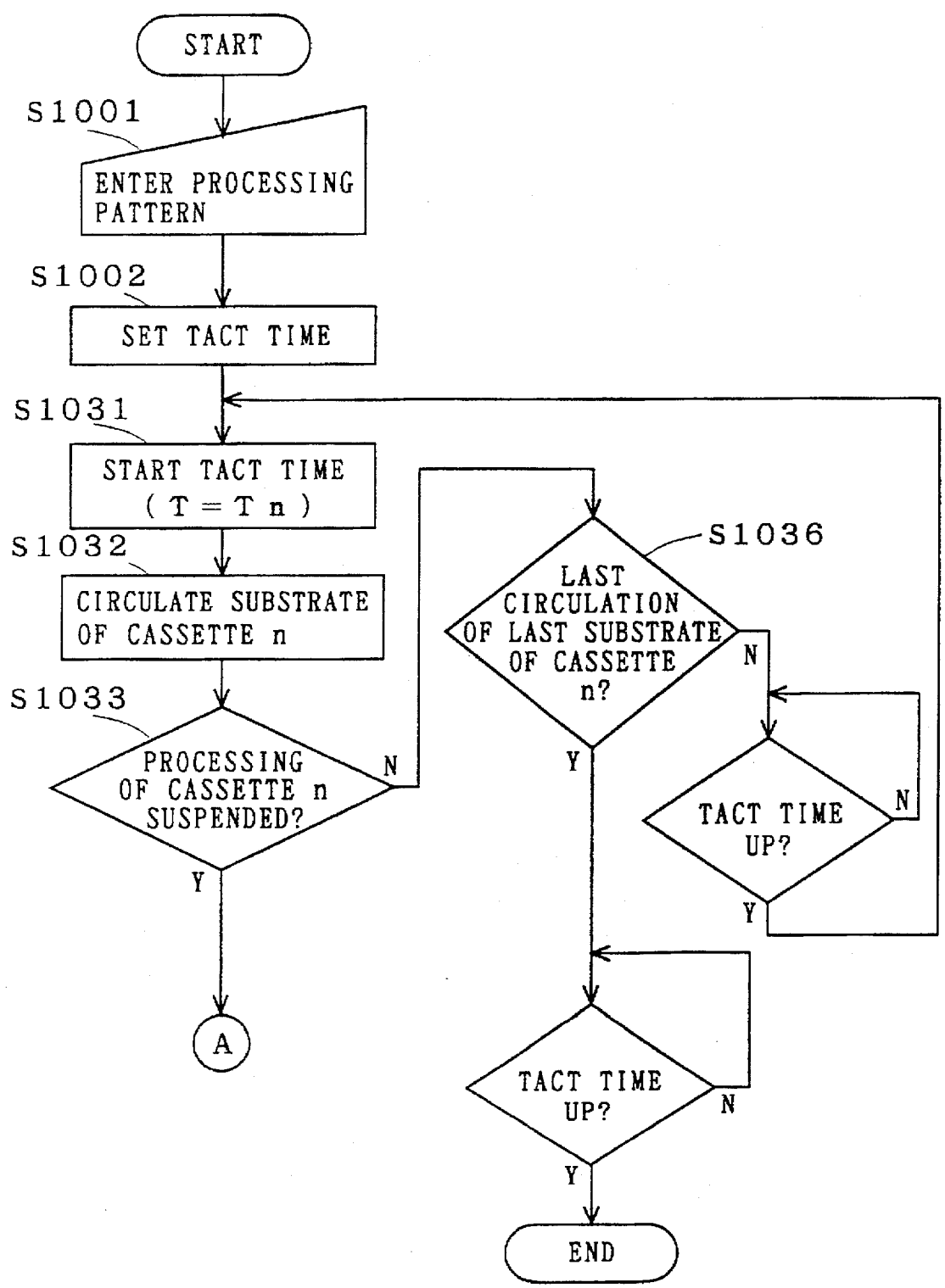
FIGS. 20 to 26 are flow charts of an operation of a substrate processing apparatus according to a second preferred embodiment of the present invention.

As shown in FIG. 20, an operator enters the types of lots which are to be processed, the number of the substrates 30 in the cassettes 20, the wafer flows of the respective lots, processing conditions and etc. (Step S1001). If necessary, the operator inputs information regarding the arrangement of the substrate processing parts in the apparatus and information regarding the transport robot 10 on the keyboard 52.

Next, in response to an instruction from the operator to start processing, and then based on the information entered at Step S1001, the tact time $T_n$ for processing the substrates of each cassette (n) is calculated (Step S1002). A detailed operation routine of the transport robot 10 and a detailed processing pattern at each substrate processing part (or unit) are determined in accordance with the transportation order of the substrate 30, the processing time and the other parameters, if needed.

A tact timer is then started at a tact time $T=T_1$ of the first cassette (n=1), or the interrupted lot which is to be processed (Step S1031), and one cycle of circulating transportation of substrates of the first cassette (n=1) is started by the transport robot 10 (Step S1032), whereby the first substrate 30 is retrieved from the first cassette (n=1) to be ready in the indexer IND for loading into the substrate processing parts. Next, whether an instruction to suspend the processing of the first cassette (n=1) was received is judged (Step S1033). If receipt of such an instruction is confirmed, the processing of the first cassette (n=1), or the interrupted lot is temporarily suspended and processing of the second cassette which has a different flow is started (Step S1034 and subsequent steps) as described below in detail. If receipt of such an instruction is not confirmed, it is judged whether the current circulating transportation is the last cycle of circulating transportation of the last substrate 30 of the first cassette (n=1) (Step S1036). If NO, the sequence waits for the tact time $T_1$ and returns to Step S1031. This is repeated to serially process the substrates 30 of the first cassette (n=1). Conversely, if the last cycle of circulating transportation of the last substrate 30 of the first cassette (n=1) is detected at Step S1036, the sequence waits for the tact time $T_n=T_1$ and completes processing the substrates 30 of the first cassette (n=1).

Figure 21:
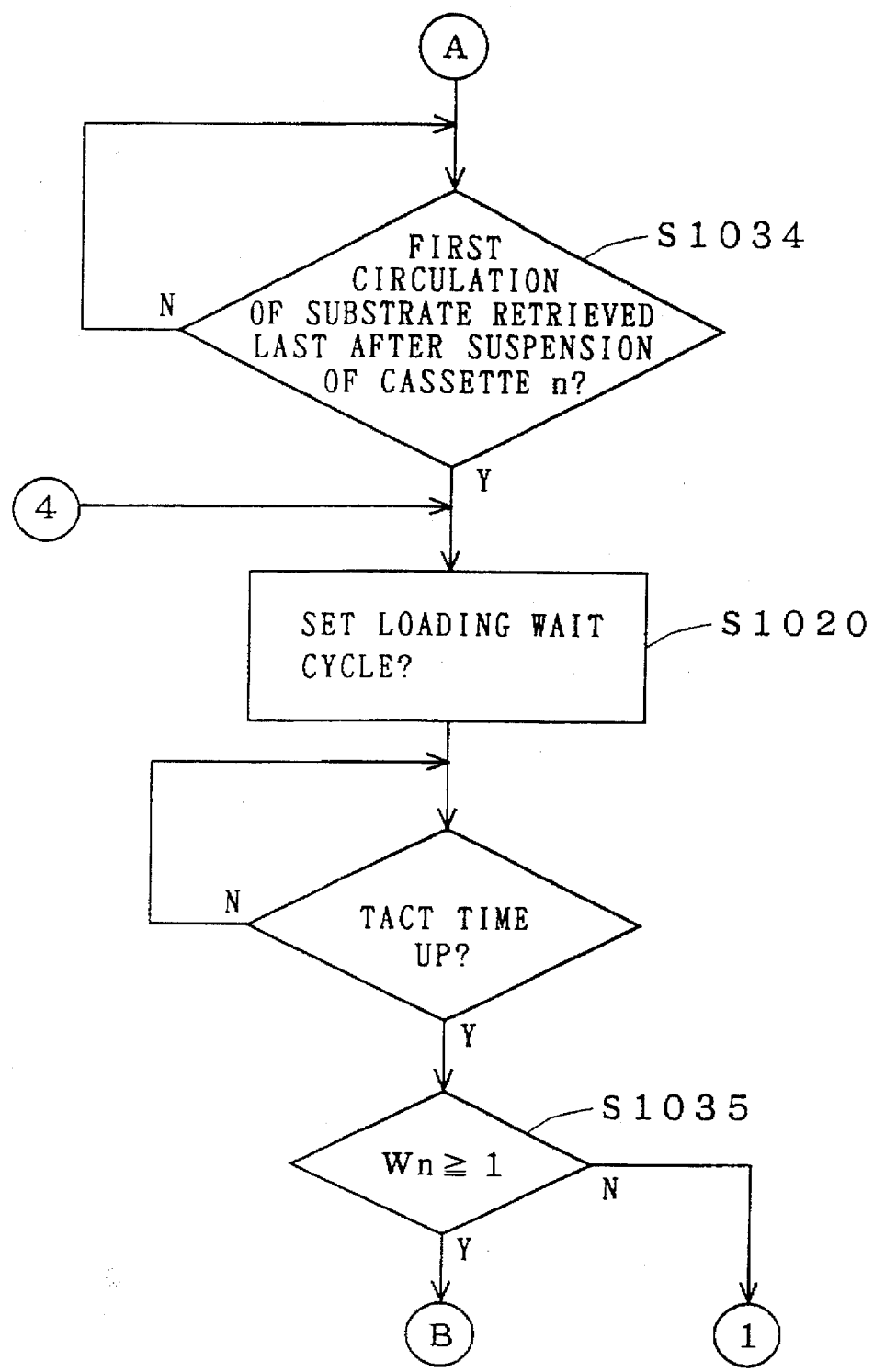

If receipt of the instruction to suspend processing of the first cassette (n=1), or the interrupted lot is confirmed at Step S1033, it is then judged whether the current circulating transportation is the first cycle of circulating transportation of the last substrate 30 of the first cassette (n=1) (Step S1034) as shown in FIG. 21. That is, although interrupting processing is started in response to the instruction, it is judged whether the first cycle of circulating transportation of the last substrate 30 of the first cassette (n=1), or the interrupted lot prior to the suspension has already begun. If the first cycle of circulating transportation of the last substrate 30 prior to the suspension has already begun, values are determined which are necessary to perform interrupting processing of the substrates 30 of the second cassette (n+1=2) which is to be processed from now, or the interrupting lot having a different flow (Step S1020).

The values calculated here include the processing position difference $A_n$ between the wafer flow of the first cassette (n=1), or the interrupted lot and the wafer flow of the second cassette (n+1=2), or the interrupting lot, the maximum flow step difference $B_n$ between the first cassette (n=1) and the second cassette (n+1=2), and the loading wait cycle $W_n$ which is the larger one of the processing position difference $A_n$ and the maximum flow step difference $B_n$. The differences $A_n$ and $B_n$ will be defined later. Parameters regarding the processing of the substrates of the second cassette, or the interrupting lot are supplied or determined in advance prior to the suspension instruction at Step S1033 in FIG. 20. The parameters for the second cassette include a transportation order of and a processing time for the substrates 30 of the second cassette (n+1=2), and a tact time $T_{n+1}$ which is calculated from the transportation order and the processing time.

Figure 27:
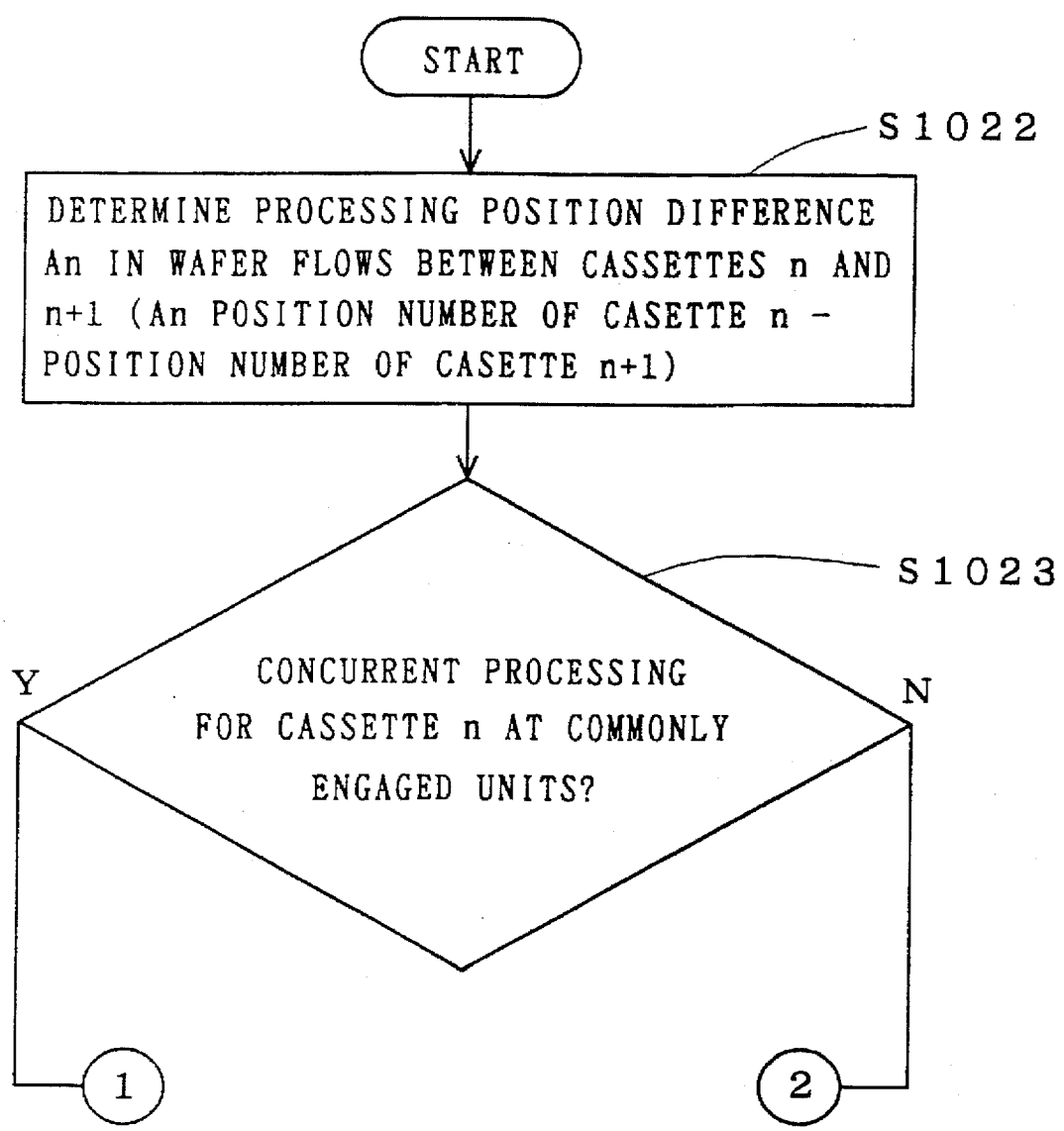
FIGS. 27 and 28 are flow charts showing calculation of a loading wait cycle in a substrate processing apparatus according to a third preferred embodiment of the present invention.
Figure 28:
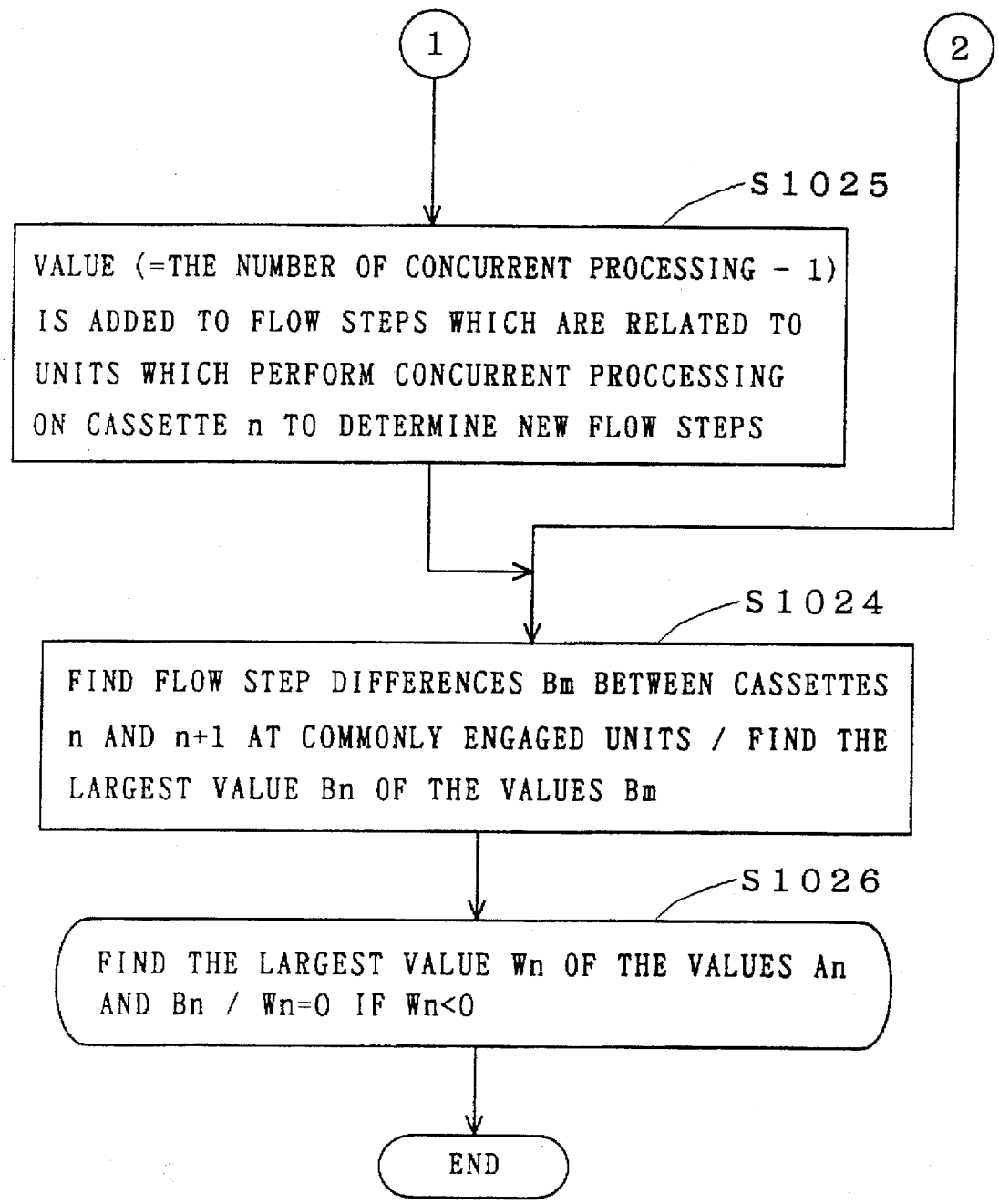

FIGS. 27 and 28 are flow charts showing the details of Step S1020. First, Step S1022 is executed to find the processing position difference $A_n$ between the wafer flow of the first cassette (n=1), or the interrupted lot and the wafer flow of the second cassette (n+1=2), or the interrupting lot. The processing position difference $A_n$ is defined as a difference between the cassettes (n, n+1) in the number of the substrate processing parts (or units) which are engaged with during the respective wafer flows. If the difference has a negative value, the processing position difference $A_n$ is determined as 0. Instead of including an operation of the indexer IND in the position number as in the third preferred embodiment, an operation of the indexer IND may not be included in the position number. The processing position difference $A_n$ is calculated to prevent a substrate of the subsequent second cassette (n+1) from passing a substrate of the precedent first cassette (n). More precisely, where the position number of the second cassette (n+1) is less than the position number of the first cassette (n), a substrate of the second cassette (n+1) interferes with a substrate of the first cassette (n) when passing, whereby tact management becomes impossible or the wafer flows of the two cassettes (n, n+1) get confused, unless the start of the processing of the second cassette (n+1) does not wait for a time which is expressed by the difference in the number of the cycles.

A specific method of calculating the processing position difference $A_n$ is the same as that described in relation to the first preferred embodiment (Step S22 in FIG. 10) and Tables 1 and 2, and therefore, will not be described in detail here. In reading Tables 1 and 2 in relation to the third preferred embodiment, it is to be noted that the precedent cassette (n) corresponds to the interrupted cassette while the subsequent cassette (n+1) corresponds to the interrupting cassette.

Next, as shown in FIG. 27, it is then judged whether substrates of the first cassette (n=1), or the interrupted lot are to be concurrently processed at the substrate processing parts (or units) which are used in the wafer flows of the both cassettes (Step S1023). This is to prevent contention between a substrate of the first cassette (n) and a substrate of the second cassette (n+1) at the substrate processing parts (or units) which perform concurrent processing as described below in detail.

When there is no concurrent processing to be performed, as shown in FIG. 28, Step S1024 is executed to calculate the maximum flow step difference $B_n$ between the wafer flow of the first cassette (n=1), or the interrupted lot and the wafer flow of the second cassette (n+1=2), or the interrupting lot. The maximum flow step difference $B_n$ is defined as a maximum difference (a flow step difference $B_m$) in the orders (i.e., flow steps) of the substrate processing parts (or units) which are commonly engaged by the cassettes (n, n+1) during the respective wafer flows (where m is a subscript for distinguishing the commonly engaged substrate processing parts). Here, it is assumed that $B_m=0$ when the flow step difference $B_m$ has a negative value. Instead of including retrieving the substrate from the indexer IND in the flow steps, unlike herein described, retrieving from the indexer IND may not be included in the flow steps. The maximum flow step difference $B_n$ is calculated principally to prevent contention between substrates of the second cassettes (n, n+1), that is, processing of a substrate of the second cassette (n+1) from passing processing of a substrate of the first cassette (n). That is, when there is a substrate processing part where the flow steps for the second cassette (n+1) are less than that of the first cassette (n), a substrate of the second cassette (n+1) interferes with a substrate of the first cassette (n) to make tact management impossible, unless the processing of the second cassette (n+1) does not wait for a time which is expressed by the maximum difference or longer.

When there is no concurrent processing to be performed as described above, a specific method of calculating the flow step differences $B_m$ and the maximum flow step difference $B_n$ is the same as that described in relation to the first preferred embodiment (Step S24 in FIG. 11) and Tables 3 to 6, and therefore, will not be described in detail here. In reading Tables 3 to 6, it is to be noted that the precedent cassette (n) corresponds to the interrupted cassette while the subsequent cassette (n+1) corresponds to the interrupting cassette.

Conversely, when concurrent processing is performed, as shown in FIG. 28, of the flow steps which are found in the same manner as in the case of where concurrent processing is not performed, a value (the number of concurrent processing−1) is added to those which are related to the substrate processing parts (or units) in which concurrent processing is performed, to thereby determine new flow steps (Step S1025). Following this, the flow step differences $B_m$ are calculated as differences in the flow steps, and the flow step difference $B_m$ which has the largest value is determined as the maximum flow step difference $B_n$ (Step S1024). As described above, the maximum flow step difference $B_n$ is found using the new flow steps which are defined by adding the value (the number of concurrent processing−1) with respect to the substrate processing parts (or units) in which concurrent processing is performed. This is to prevent contention between processing of a substrate of the interrupting second cassette (n+1) and processing of a substrate of the interrupted first cassette (n) at the substrate processing parts (or units) in which concurrent processing is performed. The term "−1" aims at preventing possible interference between the two cassettes (n, n+1) even when it is unknown which substrate processing part (or unit) performing concurrent processing still contains the last substrate of the first cassette (n).

When concurrent processing is performed as described above, a specific method of calculating the flow step differences $B_m$ and the maximum flow step difference $B_n$ is the same as that described in relation to the first preferred embodiment (Steps S24 and S25 in FIG. 11) and Tables 7 to 9, and therefore, will not be described in detail here. In reading Tables 7 to 9, it is to be noted that the precedent cassette (n) corresponds to the interrupted cassette while the subsequent cassette (n+1) corresponds to the interrupting cassette. Since the precedent cassette and the subsequent cassette are simply reversed between Tables 8 and 9, if there is only one interrupting cassette, assuming that there is only one interrupting cassette, if the maximum flow step difference in one of Tables 8 and 9 is the maximum flow step difference $B_n$ at the start of interrupting processing, the maximum flow step difference in the other of Tables 8 and 9 is the maximum flow step difference $B_n$ which is calculated when the loading wait cycle $W_n$, which causes a problem later, is calculated at the end of the interrupting processing.

Lastly, as shown in FIG. 28, the larger one of the processing position difference $A_n$ and the maximum flow step difference $B_n$ is determined as the maximum value $W_n=W_1$ (Step S1026). The maximum value $W_n$ expresses the number of circulating transportation during which retrieving of a substrate from the subsequent cassette (n+1) must be restricted to prevent interference between substrates of the two cassettes (n, n+1). That is, the maximum value $W_n$ expresses a loading wait cycle.

Referring again to FIG. 21, the sequence waits for the tact time $T_n=T_1$, and Step S1035 is executed to judge whether the loading wait cycle $W_n=W_1$ is equal to or larger than 1.

Figure 22:
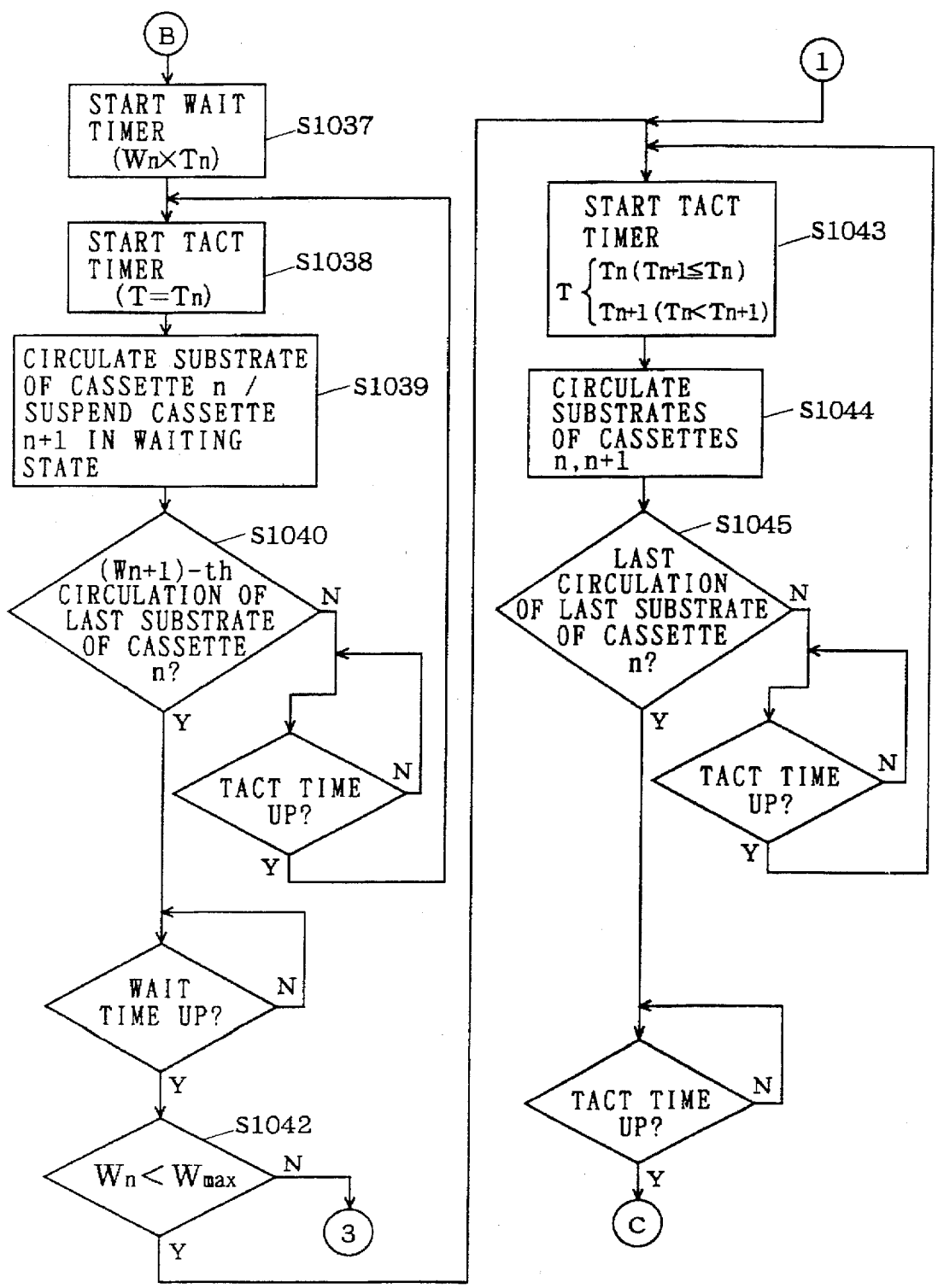

If it is judged at Step S1035 that the loading wait cycle $W_n=W_1$ is equal to or larger than 1 so that retrieving from the second cassette is to be restricted, the wait timer is started as shown in FIG. 22 (Step S1037). Following this, the tact timer is started (Step S1038), and one cycle of circulating transportation of the substrates 30 of the interrupted first cassette (n) is started (Step S1039), whereby the interrupting second cassette (n+1) is suspended in a waiting state. Next, Step S1040 is executed to judge whether the current circulating transportation is a $(W_{n+1}=W_{1+1})$-th cycle of circulating transportation of the last substrate 30 of the first cassette (n=1) prior to the suspension. If NO, the sequence waits for the tact time $T_n=T_1$ and returns to Step S1038. This is repeated until the last substrate 30 of the first cassette (n=1) prior to the suspension is processed.

If the $(W_{n+1}=W_{1+1})$-th cycle of circulating transportation of the last substrate 30 of the first cassette (n=1) prior to the suspension is detected at Step S1040, the sequence waits for a wait time $(W_n \times T_n=W_1 \times T_1)$ to release the substrate 30 of the interrupting second cassette (n+1) from the waiting state. It is then judged whether the loading wait cycle $W_n=W_1$ is shorter than the standard wait cycle Wmax (Step S1042). The standard wait cycle Wmax expresses the number of cycles during which the processing of the interrupting subsequent cassette must wait until the processing of the remaining substrates of the interrupted precedent cassette which are skipped due to interruption completes. In this example, the standard wait cycle Wmax is equal to 1 subtracted from the total position number of the wafer flows of the first cassette (n=1) (The indexer IND is included in the total position number.).

The tact timer is started if it is judged at Step S1042 that the loading wait cycle $W_n=W_1$ is shorter than the standard wait cycle Wmax (Step S1043). Here, it is assumed that the tact time T is defined as the longer one of the tact time $T_n=T_1$ for the first cassette and the tact time $T_{n+1}=T_2$ for the second cassette. Next, one cycle of circulating transportation of the substrates 30 of the first and the second cassettes (n, n+1) is started (Step S1044). The transport robot 10 transports around the respective substrates 30 of the first and the second cassettes (n, n+1) smoothly avoiding any confusion. That is, the transport robot 10 accesses all substrate processing parts (or units) which are to be engaged with during the wafer flows of the both cassettes. Step S1045 is then executed to judge whether the current circulating transportation is the last cycle of circulating transportation of the last substrate 30 of the first cassette (n). If NO, the sequence waits for the tact time T and returns to Step S1043. This is repeated to serially process the substrates 30 of the first and the second cassettes (n, n+1).

Figure 23:
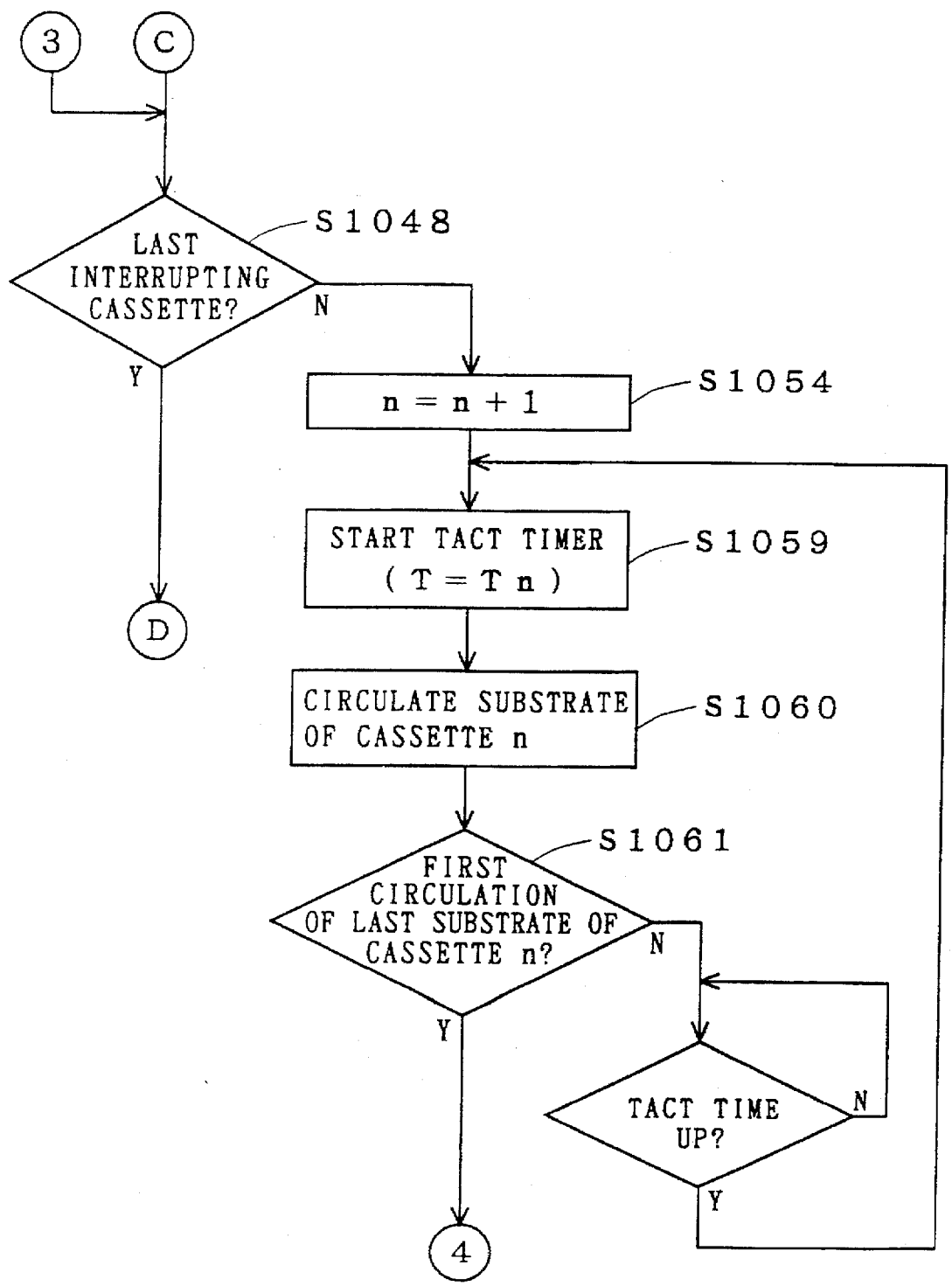
Figure 24:
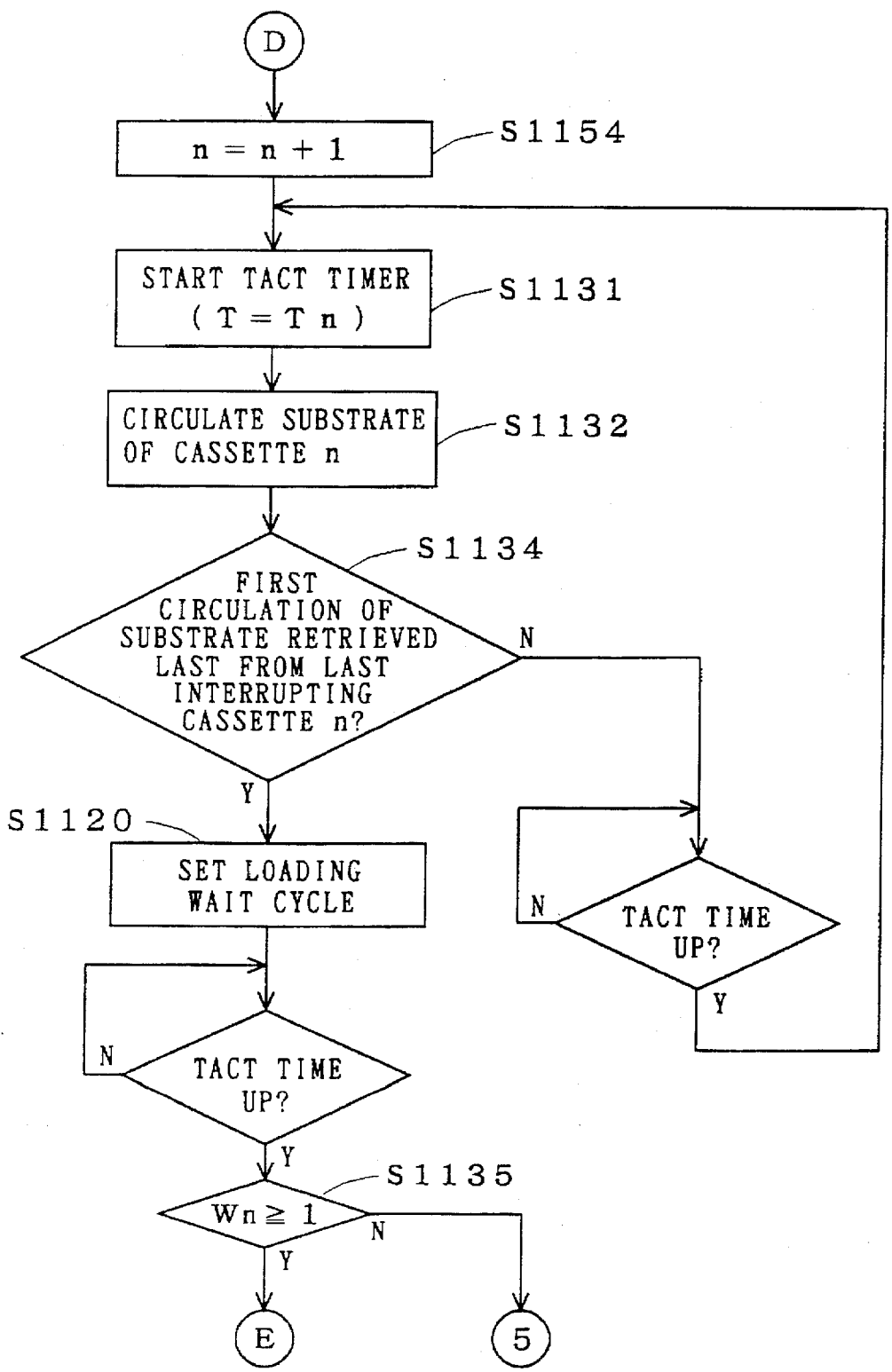

If the last cycle of circulating transportation of the last substrate 30 of the first cassette (n) is detected at Step S1045, as shown in FIG. 23, the sequence waits for the tact time T and Step S1048 is executed to judge whether the second cassette (n+1) is the last interrupting cassette. If it is judged NO at Step S1048, the cassette number n and the maximum value $W_n$ are updated to process a substrate of the third cassette which is to interrupt next (Step S1054). Following this, the tact timer is started (Step S1059), and the transport robot 10 performs one cycle of circulating transportation of the remaining substrates 30 of the second cassette (n=2) (Step S1060). Next, Step S1061 is executed to judge whether the current circulating transportation is the first cycle of circulating transportation of the last substrate 30 of the second cassette (n=2). Since the current circulating transportation is not the first cycle of circulating transportation of the last substrate 30 of the second cassette (n=2), the sequence waits for the tact time $T_2$ and returns to Step S1059. This is repeated to serially process the remaining substrates 30 of the second cassette (n=2). If the first cycle of circulating transportation of the last substrate 30 is detected at Step S1061, the sequence waits for the tact time $T_n=T_2$ and returns to Step S1020 of FIG. 21. At Step S1020, values including the maximum value $W_n$ are determined which are necessary to successively process the substrates of the third cassette (n+1=3) which is to interrupt next. This is followed by Steps S1035 to S1048 of FIGS. 21 to 23 so that the substrates of the second and the third cassettes (n=2, n+1=3) are successively processed with a minimum wait time. If it is judged NO at Step 1048, the cassette number is incremented and otherwise changed (Step S1054), and successive processing of the third cassette (n=3) and the fourth cassette (n+1=4) is performed (Steps S1059 to S1061, S1020, S1035 to S1048). This is repeated until the processing for the last interrupting cassette completes.

If it is judged at Step S1036 (FIG. 21) that the loading wait cycle $W_n=W_1$ is smaller than 1 (that is, equal to 0) so that retrieving of the substrate from the second cassette is not to be restricted, the sequence proceeds to Step S1043 of FIG. 22 to start the tact timer. Step S1044 is then executed to start one cycle of circulating transportation of the remaining substrates 30 of the first cassette (n=1) and the first substrate 30 of the second cassette (n+1=2). Next, it is judged at Step S1045 whether the current circulating transportation is the last cycle of circulating transportation of the last substrate 30 of the first cassette (n=1). If NO, the sequence waits for the tact time T and returns to Step S1043. This is repeated until the last cycle of circulating transportation of the last substrate 30 of the first cassette (n=1) is detected. Detecting the last cycle, the sequence waits for the tact time T and proceeds to Step S1048 of FIG. 23.

If $W_1$=Wmax is found at Step S1042 of FIG. 22, assuming that retrieving of the substrate from the interrupting second cassette (n+1=2) is to be restricted until the processing for the interrupted first cassette (n=1) completes, the sequence immediately proceeds to Step S1048 of FIG. 23 to judge whether the second cassette (n+1=2) is the last interrupting cassette. Following this, the substrates 30 of the second cassette (n+1=2) are serially processed in the manner described above.

Figure 25:
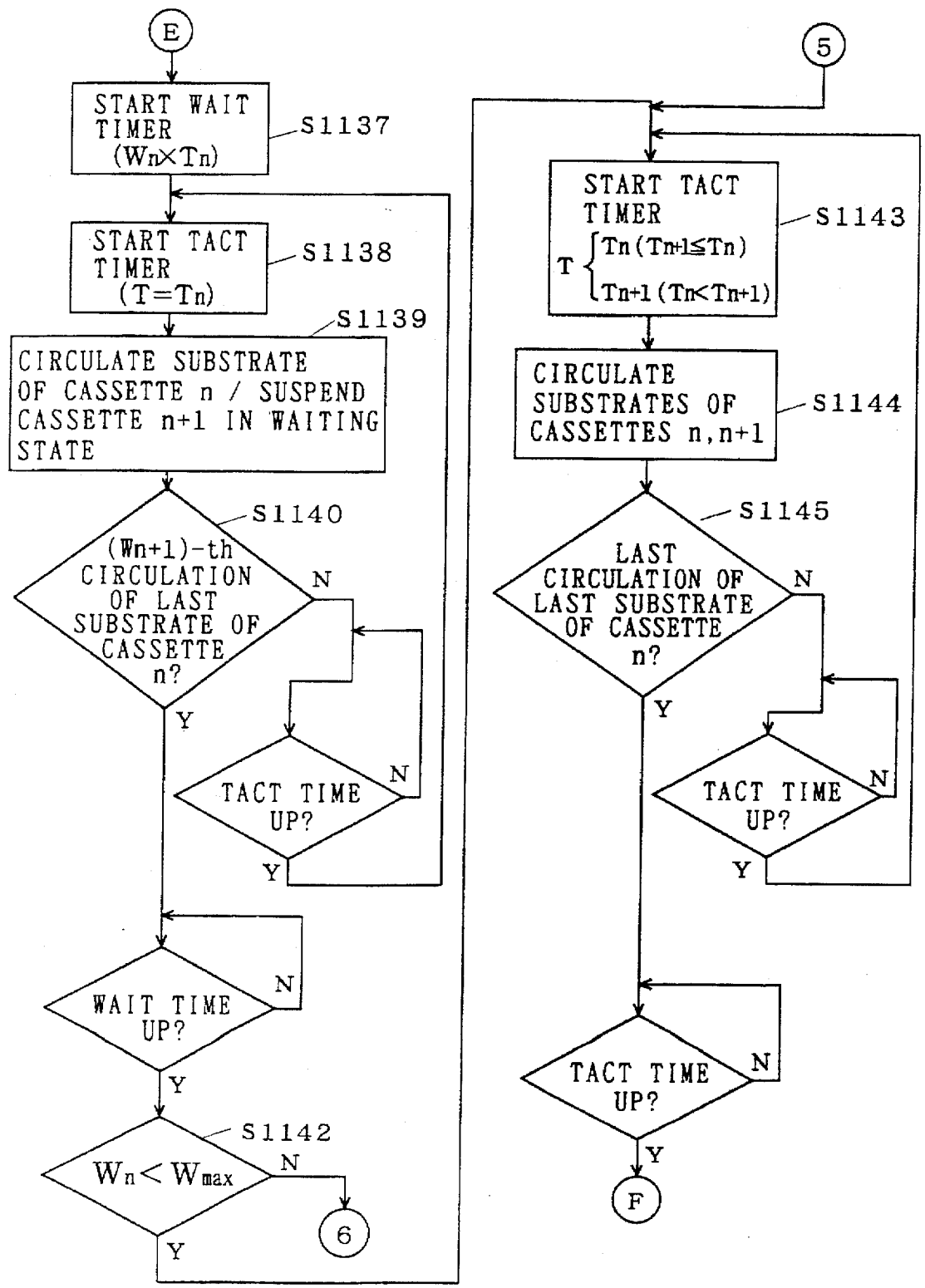

If the last interrupting cassette is detected at Step S1048 of FIG. 23, the cassette number n and the maximum value $W_n$ are updated (Step S1154), and the tact timer is started (Step S1131). For example, if the second cassette (n+1=2) is the last interrupting cassette, the tact time $T_n$ is $T_2$. Next, the transport robot 10 performs one cycle of circulating transportation of the remaining substrates 30 of the second cassette (n=2) (Step S1132). It is then judged at Step S1134 whether the current circulating transportation is the first cycle of circulating transportation of the last substrate 30 of the interrupting second cassette (n=2). If NO, the sequence waits for the tact time $T_n=T_2$ and returns to Step S1131. This is repeated to serially process the remaining substrates 30 of the interrupting second cassette (n=2). On the other hand, if the first cycle of circulating transportation of the last substrate 30 of the interrupting second cassette (n=2) is detected at Step S1134, values including the maximum value $W_n$ are determined which are necessary to end the interrupting processing for the second cassette (n=2) and release the interruption of the interrupted first cassette (n+1=3) which is to interrupt next (Step S1120). At Step S1120 which corresponds to Step S1020 described earlier, the maximum value $W_n$ and the like are determined while performing procedures which are similar to those at Step S1020 (FIGS. 27 and 28). Following this, Step S1135 of FIG. 24 and Steps S1137 to S1148 of FIG. 25 are executed to successively process the substrates of the second and the first cassettes (n=2, n+1=3) with a minimum wait time. Corresponding to Step S1035 of FIG. 21 and Steps S1037 to S1045 of FIG. 22, Step S1135 of FIG. 24 and Steps S1137 to S1148 of FIG. 25 will not be described in detail here.

Figure 26:
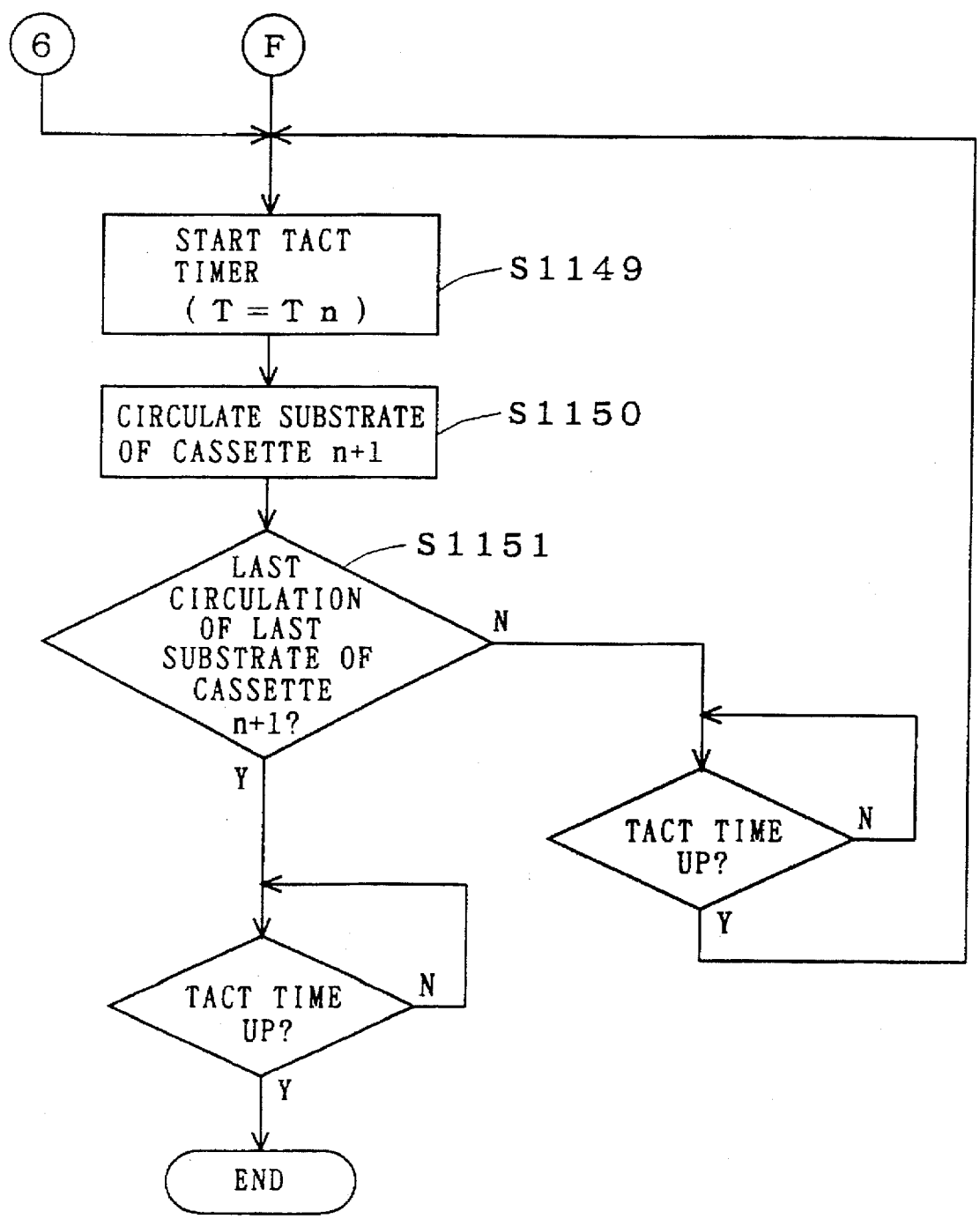

If the last cycle of circulating transportation of the last substrate 30 of the interrupting second cassette (n) is detected at Step S1145 of FIG. 25, the sequence waits for the tact time T, and the tact timer is started as shown in FIG. 26 (Step S1149). The transport robot 10 then starts one cycle of circulating transportation of the remaining substrates 30 of the interrupted first cassette (n+1=3) (Step S1150). Next, Step S1151 is executed to judge whether the current circulating transportation is the last cycle of circulating transportation of the last substrate 30 of the first cassette (n+1=3). Since NO, the sequence waits for the tact time $T_n=T_1$ and returns to Step S1149. This is repeated to serially process the remaining substrates 30 of the first cassette (n+1=3). If the last cycle of circulating transportation of the last substrate 30 is detected at Step S1151, the sequence waits for the tact time $T_n=T_1$ and completes the processing for the interrupted first cassette (n+1=3).

Now, in the following, a specific operation of the substrate processing apparatus of the third preferred embodiment will be described.

Table 20 shows wafer processing cycles during a transition from one flow to another different flow (i.e., in an interruption start zone) in the apparatus of the third preferred embodiment. Between the cassettes (n, n+1) of Table 1 of the first preferred embodiment, the subsequent second cassette (n+1) interrupts processing of the precedent first cassette (n). Table 21 shows wafer processing cycles during a transition from one flow to another different flow (i.e., in an interruption end zone) in the apparatus of the third preferred embodiment where the processing of the first cassette (n'+1) is resumed after the interrupting processing of the second cassette (n') is completed. Tables 20 and 21 show whether the substrates 30 are present in the substrate processing parts (or units) after one unprocessed substrate 30 retrieved from a wafer transfer position of the indexer IND and circulated by the transport robot 10 returns to the indexer IND as a processed substrate.

TABLE 20

Wafer Processing Cycle in Third Embodiment (Flex Flow)

| Cassette n | (1) IND | (2) HP1 | (3) CP | (4) SC | (5) HP2 | HP3 | (6) IND |
|---|---|---|---|---|---|---|---|
| Cassette n + 1 Processing Cycle | (1) | (2) | (3) | (4) | | (5) | (6) |
| 1 | B | [A] | A | A | A | X | A |
| | *Cassette n + 1 is started immediately after the cassette end wafer [A] of cassette n is started. | | | | | | |
| 2 | B | B | [A] | A | A | X | A |
| 3 | B | B | B | [A] | A | X | A |
| 4 | B | B | B | B | [A] | X | A |
| 5 | B | B | B | B | X | B | [A] |
| | *Cassette end wafer [A] is transferred to IND. | | | | | | |
| 6 | B | B | B | B | X | B | B |
| | *Wafer of cassette n + 1 is transferred to IND without a break between cycles. | | | | | | |

TABLE 21

Wafer Processing Cycle in Third Embodiment (Flex Flow)

| Cassette n' | (1) IND | (2) HP1 | (3) CP | (4) SC | HP2 | (5) HP3 | (6) IND |
|---|---|---|---|---|---|---|---|
| Cassette n' + 1 Processing Cycle | (1) | (2) | (3) | (4) | (5) | | (6) |
| 1' | A | [B] | B | B | X | B | B |
| | * Cassette n' + 1 is started immediately after the cassette end wafer [B] of cassette n' is started. | | | | | | |
| 2' | A | A | [B] | B | X | B | B |
| 3' | A | A | A | [B] | X | B | B |
| 4' | A | A | A | A | X | [B] | B |
| 5' | A | A | A | A | A | X | [B] |
| | * Cassette end wafer [B] is transferred to IND. | | | | | | |
| 6' | A | A | A | A | A | X | A |
| | * Wafer of cassette n' + 1 is transferred to IND without a break between cycles. | | | | | | |

In Tables 20 and 21, the letter A expresses that the substrate 30 of the interrupted first cassette (n or n'+1) is present, the letter B expresses that the substrate 30 of the interrupting second cassette (n+1or n') is present, and the letter X expresses that the substrate 30 is not present. The symbol [A] expresses that the last substrate 30 of the first cassette (n) is present while the symbol [B] expresses that the last substrate 30 of the second cassette (n') is present.

As clearly seen in Tables 20 and 21, the processing of the second cassette (n+1), or the interrupting lot smoothly interrupts the processing of the first cassette (n), or the interrupted lot without any break. In addition, the processing of the first cassette (n'+1) is smoothly resumed after the processing of the second cassette (n') is completed without any break. Hence, it is possible to eliminate a time loss which is created when loading of a substrate from the interrupting second cassette (n+1) or from the interrupted first cassette (n'+1) is temporarily suspended.

Tables 22 and 23 below show wafer processing cycles in the conventional apparatus where substrates of the cassettes (n, n+1) having different flows (First preferred embodiment, Table 1) are processed by interrupting processing.

TABLE 22

Conventional Wafer Processing Cycle

| Cassette n | (1) IND | (2) HP1 | (3) CP | (4) SC | (5) HP2 | HP3 | (6) IND |
|---|---|---|---|---|---|---|---|
| Cassette n + 1 Processing Cycle | (1) | (2) | (3) | | (4) | (5) | (6) |
| 1 | [A] | A | A | A | A | X | A |
| 2 | X | [A] | A | A | A | X | A |
| 3 | X | X | [A] | A | A | X | A |
| 4 | X | X | X | [A] | A | X | A |
| 5 | X | X | X | X | [A] | X | A |
| 6 | X | X | X | X | X | X | [A] |
| | * Cassette end wafer [A] is transferred to IND. | | | | | | |
| 7 | B | X | X | X | X | X | X |
| | * Cassette n + 1 is started after the cassette end wafer is returned to the cassette | | | | | | |
| 8 | B | B | X | X | X | X | X |
| 9 | B | B | B | X | X | X | X |
| 10 | B | B | B | B | X | X | X |
| 11 | B | B | B | B | X | B | X |
| 12 | B | B | B | B | X | B | B |
| | * Wafer returning to IND waits for five cycles. | | | | | | |

TABLE 23

Conventional Wafer Processing Cycle

| Cassette n' | (1) IND | (2) HP1 | (3) CP | (4) SC | HP2 | (5) HP3 | (6) IND |
|---|---|---|---|---|---|---|---|
| Cassette n' + 1 Processing Cycle | (1) | (2) | (3) | (4) | | (5) | (6) |
| 1' | [B] | B | B | B | X | B | B |
| 2' | X | [B] | B | B | X | B | B |
| 3' | X | X | [B] | B | X | B | B |
| 4' | X | X | X | [B] | X | B | B |
| 5' | X | X | X | X | X | [B] | B |
| 6' | X | X | X | X | X | X | [B] |
| | * Cassette end wafer [B] is transferred to IND. | | | | | | |
| 7' | A | X | X | X | X | X | X |
| | * Cassette n' + 1 is started after the cassette end wafer is returned to the cassette. | | | | | | |
| 8' | A | A | X | X | X | X | X |
| 9' | A | A | A | X | X | X | X |
| 10' | A | A | A | A | X | X | X |
| 11' | A | A | A | A | A | X | X |
| 12' | A | A | A | A | A | X | A |
| | * Wafer returning to IND waits for five cycles. | | | | | | |

As clearly seen in Tables 22 and 23, retrieving of a substrate from the second cassette (n+1) must wait for five cycles when the second cassette (n+1) interrupts processing of the first cassette (n). Thus, the wait time is five cycles longer than in the third preferred embodiment of Table 20. Further, since retrieving of a substrate from the first cassette (n'+1) must wait for five cycles when the processing for the first cassette (n'+1) is resumed after the interrupting processing of the second cassette (n') is completed, the wait time is another five cycles longer than in the third preferred embodiment of Table 21. Hence, the delay is as long as ten cycles in total in the conventional apparatus than in the third preferred embodiment.

Table 24 below shows delays crated by interrupting processing in the conventional apparatus and the apparatus of the third preferred embodiment.

TABLE 24

|  | The number of cycles during which retrieving must be restricted | Time loss (per cassette) |
| --- | --- | --- |
| Coventional | 5 + 5 | 300 sec + 300 sec |
| Third Embodiment (Flex Flow) | 0 | 0 sec + 0 sec |

The time losses are calculated assuming that the tact time is equally 60 seconds in wafer processing for both the first and the second cassettes.

Figure 29A:
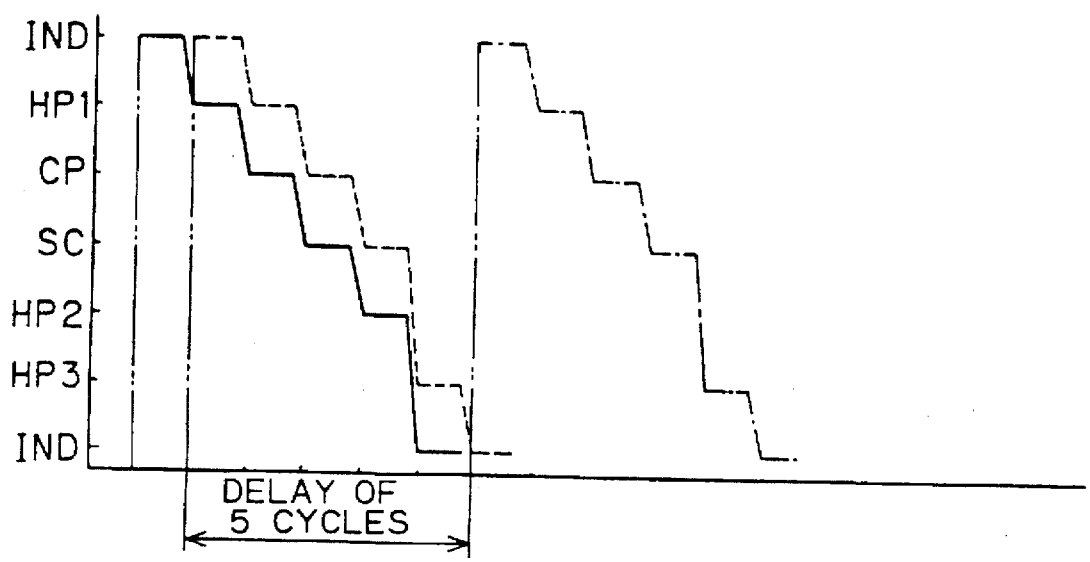
FIGS. 29A and 29B are graphs of flows and timing of wafer processing in the substrate processing apparatus according to the third preferred embodiment.
Figure 29B:
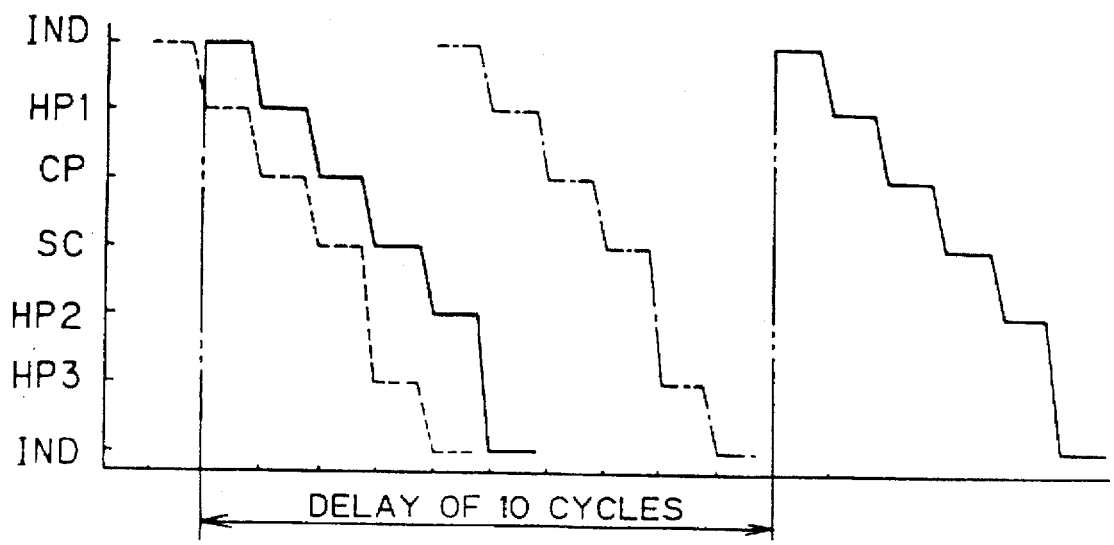

FIGS. 29A and 29B specifically show the flows and the timing of the wafer processing of Tables 20 to 23. FIG. 29A shows the wafer processing at the start of interrupting processing while FIG. 29B shows the wafer processing at the end of interrupting processing. The horizontal axes express time, i.e., cycles, and the vertical axes express the substrate processing parts (or units). In FIG. 29A, the solid line denotes the processing timing of the last substrate 30 of the interrupted first cassette (n) at the start of interrupting processing, the dotted line denotes the processing timing of the first substrate 30 of the second cassette (n+1) which is loaded as an interrupting lot in the apparatus of the third preferred embodiment, and the dotted-and-dashed denotes the processing timing of the first substrate 30 of a cassette which is loaded as an interrupting lot in the conventional apparatus. In FIG. 29B, the dotted line denotes the processing timing of the last substrate 30 of the second cassette (n') which is loaded as an interrupting lot in the apparatus of the third preferred embodiment, the solid line denotes the processing timing of the first substrate 30 of the first cassette (n'+1) whose processing is resumed at the end of the interrupting processing in the apparatus of the third preferred embodiment, the dotted-and-dashed denotes the processing timing of the last substrate 30 of a cassette which is loaded as an interrupting lot in the conventional apparatus, and the solid thin line denotes the processing timing of the first substrate 30 of the interrupted cassette whose processing is resumed at the end of the interrupting processing in the conventional apparatus. As clearly seen in FIGS. 29A and 29B, a wait cycle is not created in the processing of the third preferred embodiment denoted by the solid line. On the other hand, ten wait cycles in total are created in the processing in the conventional apparatus denoted by the solid thin line.

Table 25 below shows wafer processing cycles during a transition from one flow to another different flow (i.e., in an interruption start zone) in the apparatus of the third preferred embodiment. Between the cassettes (n, n+1) of Table 2 for the first preferred embodiment, the subsequent second cassette (n+1) interrupts processing of the precedent first cassette (n). Table 26 shows wafer processing cycles during a transition from one flow to another different flow (i.e., in an interruption end zone) in the apparatus of the third preferred embodiment where the processing of the first cassette (n'+1) is resumed after the interrupting processing of the second cassette (n') is completed.

TABLE 25

Wafer Processing Cycle in Third Embodiment (Flex Flow)

| Cassette n | (1) IND | (2) HP1 | (3) CP | (4) SC | (5) 11P2 | (6) IND |
| --- | --- | --- | --- | --- | --- | --- |
| Cassette n + 1 Processing Cycle | (1) |  |  | (2) | (3) | (4) |
| 1 | X | [A] | A | A | A | A |
| 2 | X | X | [A] | A | A | A |
| 3 | B | X | X | [A] | A | A |
| * Cassette n + 1 is started after two wafers. | | | | | | |
| 4 | B | X | X | B | [A] | A |
| 5 | B | X | X | B | B | [A] |
| * Cassette end wafer [A] is transferred to IND. | | | | | | |
| 6 | B | X | X | B | B | B |
| * Wafer of cassette n + 1 is transferred to IND without a break between cycles. | | | | | | |

TABLE 26

Wafer Processing Cycle in Third Embodiment (Flex Flow)

| Cassette n' | (1) IND | HP1 | CP | (2) SC | (3) HP2 | (4) IND |
| --- | --- | --- | --- | --- | --- | --- |
| Cassette n' + 1 Processing Cycle | (1) | (2) | (3) | (4) | (5) | (6) |
| 1' |  | [B] | X | X | B | B | B |
| 2' |  | A | X | X | [B] | B | B |
| * Cassette n' + 1 is started immediately after the cassette end wafer [B] of cassette n' is started. | | | | | | |
| 3' | A | A | X | X | [B] | B |
| 4' | A | A | A | X | X | [B] |
| * Cassette end wafer [B] is transferred to IND. | | | | | | |
| 5' | A | A | A | A | X | X |
| 6' | A | A | A | A | A | X |
| * Wafer of cassette n' + 1 is transferred to IND without a break between cycles. | | | | | | |

As clearly seen in Tables 25 and 26, the processing of the second cassette (n+1), or the interrupting lot successively interrupts the processing of the interrupted first cassette (n), or the interrupted lot. In addition, the processing of the first cassette (n'+1) is smoothly resumed after the processing of the second cassette (n') is completed without any break. Due to the differences in the processing positions and the flow steps, the interrupting processing of the second cassette (n+1) must wait for two cycles.

Tables 27 and 28 below show wafer processing cycles in the conventional apparatus where substrates of the cassettes (n, n+1) having different flows (First preferred embodiment, Table 2) are processed by interrupting processing.

TABLE 27

Conventional Wafer Processing Cycle

| Cassette n | (1) IND | (2) HP1 | (3) CP | (4) SC | (5) HP2 | (6) IND |
| --- | --- | --- | --- | --- | --- | --- |
| Cassette n + 1 Processing Cycle | (1) |  |  | (2) | (3) | (4) |
| 1 | X | [A] | A | A | A | A |
| 2 | X | X | [A] | A | A | A |
| 3 | X | X | X | [A] | A | A |
| 4 | X | X | X | X | [A] | A |
| 5 | X | X | X | X | X | [A] |
| * Cassette end wafer [A] is transferred to IND. | | | | | | |
| 6 | B | X | X | X | X | X |
| * Cassette n + 1 is started after the cassette end wafer is returned to the cassette. | | | | | | |

TABLE 27-continued

Conventional Wafer Processing Cycle

| | | | | | | |
|---|---|---|---|---|---|---|
| 7 | B | X | X | B | X | X |
| * Wafer skips HP1/CP1 and is loaded into SC. | | | | | | |
| 8 | B | X | X | B | B | X |
| 9 | B | X | X | B | B | B |
| * Wafer returning to IND waits for three cycles. | | | | | | |

TABLE 28

Conventional Wafer Processing Cycle

| Cassette n' | (1) IND | HP1 | CP | (2) SC | (3) HP2 | (4) IND |
|---|---|---|---|---|---|---|
| Cassette n' + 1 Processing Cycle | (1) | (2) | (3) | (4) | (5) | (6) |
| 1' | [B] | X | X | B | B | B |
| 2' | X | X | X | [B] | B | B |
| 3' | X | X | X | [X] | [B] | B |
| 4' | X | X | X | X | X | [B] |
| * Cassette end wafer [B] is transferred to IND. | | | | | | |
| 5' | A | X | X | X | X | X |
| * Cassette n' + 1 is started after the cassette end wafer is returned to the cassette. | | | | | | |
| 6' | A | A | X | X | X | X |
| 7' | A | A | A | X | X | X |
| 8' | A | A | A | A | X | X |
| 9' | A | A | A | A | A | X |
| * Wafer returning to IND waits for five cycles. | | | | | | |

As clearly seen in Tables 27 and 28, since retrieving of a substrate from the interrupting second cassette (n+1) must wait for five cycles at the beginning, and retrieving of a substrate from the interrupted first cassette (n'+1) must wait for additional three cycles when the processing of the first cassette (n'+1) is resumed. Thus, the wait time is six cycles longer in the conventional apparatus than in the third preferred embodiment.

Table 29 shows delays between the conventional apparatus and the apparatus of the third preferred embodiment.

TABLE 29

| | The number of cycles during which retrieving must be restricted | Time loss (per cassette) |
|---|---|---|
| Coventional | 5 + 3 | 300 sec + 180 sec |
| Flex Flow | 2 + 0 | 120 sec + 0 sec |

Time losses are calculated assuming that the tact time is equally 60 seconds in wafer processing of both the first and the second cassettes.

Table 30 shows wafer processing cycles during a transition from one flow to another different flow (i.e., in an interruption start zone) in the apparatus of the third preferred embodiment. Between the cassettes (n, n+1) of Table 7 for the first preferred embodiment, the subsequent second cassette (n+1) interrupts processing of the precedent first cassette (n). Table 31 shows wafer processing cycles during a transition from one flow to another different flow (i.e., in an interruption end zone) in the apparatus of the third preferred embodiment where the processing of the first cassette (n'+1) is resumed after the interrupting processing of the second cassette (n') is completed. The wafer flow of the first cassette (n or n'+1) includes concurrent processing.

TABLE 30

Wafer Processing Cycle Including Concurrent Processing $W_n = 5$

| Cassette n | (1) | (2) ((4)) | (2) ((4)) | (2) ((4)) | (3) | (4) | (5) | (6) | (7) |
|---|---|---|---|---|---|---|---|---|---|
| | IND (L) | a | b | c | d | e | f | g | IND (UL) |
| Cassette n + 1 Processing Cycle | (1) | (5) | | | | (4) | (2) | (3) | (6) |
| 1 | X | A | A | [A] | A | A | A | A | A |
| *2 | X | X | A | [A] | A | A | A | A | A |
| 3 | X | X | X | [A] | A | A | A | A | A |
| 4 | X | X | X | X | [A] | A | A | A | A |
| 5 | X | X | X | X | X | [A] | A | A | A |
| 6 | B | X | X | X | X | X | [A] | A | A |
| *7 | B | X | X | X | X | X | B | [A] | A |
| 8 | B | X | X | X | X | X | B | B | [A] |
| 9 | B | X | X | X | X | B | B | B | X |
| 10 | B | B | X | X | X | B | B | B | X |
| 11 | B | B | X | X | X | B | B | B | B |
| 12 | B | B | X | X | X | B | B | B | B |

TABLE 31

Wafer Processing Cycle Including Concurrent Processing $W_n = 3$

| Cassette n' | (1) | (5) | | | | (4) | (2) | (3) | (6) |
|---|---|---|---|---|---|---|---|---|---|
| | IND (L) | a | b | c | d | e | f | g | IND (UL) |
| Cassette n' + 1 Processing Cycle | (1) | (2) | (2) | (2) | (3) | (4) | (5) | (6) | (7) |
| 1' | X | B | X | X | X | B | [B] | B | B |
| *2' | X | B | X | X | X | B | X | [B] | B |
| 3' | X | B | X | X | X | [B] | X | X | B |
| 4' | A | [B] | X | X | X | X | X | X | B |
| *5' | A | A | X | X | X | X | X | X | [B] |
| 6' | A | A | X | X | X | X | X | X | X |
| 7' | A | A | A | X | X | X | X | X | X |
| 8' | A | A | A | A | X | X | X | X | X |

As clearly seen in Tables 30 and 31, retrieving of a substrate from the second cassette (n+1) must wait for five cycles when the second cassette (n+1) interrupts. Thus, the wait time is three cycles shorter than in the conventional apparatus in which retrieving must wait for eight cycles. Further, since retrieving of a substrate from the first cassette (N'+1) must wait for three cycles when the processing is performed for the first cassette (n'+1) after the interrupting processing ends, the wait time is another two cycles shorter than in the conventional apparatus in which retrieving must wait for five cycles. Hence, the delay is as long as five cycles in total in the conventional apparatus than in the third preferred embodiment.

The third preferred embodiment is related to where the substrate processing parts (or units) do not include an interface buffer, or a device which serves as an interface with an external device such as a stepper which is externally connected to the substrate processing apparatus. In general, an external device such as a stepper operates with its own special cycle time which is different from the tact time of the substrate processing apparatus of the first preferred embodiment, and therefore, tact management is impossible. Hence, when a wafer flow which includes an interface buffer is to be interrupted by another wafer flow, tact management of the wafer flow of the interrupting wafer flow is impossible. To deal with this, the loading wait cycle $W_n$ is calculated as in the third preferred embodiment with respect to both the wafer flow of the interrupted cassette and that of the interrupting cassette after the interface buffer (See FIGS. 27 and 28) to make it possible to perform tact management of the wafer flow of the interrupting cassette. Calculation of the loading wait cycle $W_n$ is performed with the interface buffer replaced with the indexer IND. In this case, tact management is started when processing in the wafer flow of the interrupted cassette up to the interface buffer completely ends and retrieving of the last substrate of the interrupted cassette 20 from the interface buffer completes. The loading wait cycle $W_n$ is then calculated and the substrate of the interrupting cassette 20 is processed after suspended, or the substrate of the interrupting cassette 20 is processed after suspended in accordance with a preliminarily calculated loading wait cycle $W_n$.

Referring again to Table 18 already explained in relation to the first preferred embodiment, the wafer flow of the interrupted first cassette (n) which is loaded first includes the treatment at the interface buffer (IF-B) and the treatment at the spin developer SD (DEV). Processing Position Difference $A_n=0$, Flow Step Difference $B_m=1$, and Maximum Flow Step Difference $B_n=1$. Hence, the loading wait cycle $W_n$ at retrieving of a substrate from the interrupting cassette (n+1) is, Loading Wait Cycle $W_n=1$. The loading wait cycle $W_n$ at the resumption of the processing for the interrupted cassette (n) is, Loading Wait Cycle $W_n=2$.

In the third preferred embodiment, when the interrupted cassette 20 is to undergo concurrent processing, new flow steps are defined by adding the value (the number of concurrent processing–1) with respect to the substrate processing parts (or units) performing concurrent processing, thereby preventing substrates of the interrupting and the interrupted cassettes 20 from being in contention for the substrate processing parts (or units) in which concurrent processing is performed. It is to be noted that this is a countermeasure assuming the worst scenario. For instance, it is possible that the last substrate 30 of the interrupted cassette 20 is not to be processed in a certain substrate processing part (or unit) in which the substrates of the interrupting cassette 20 is processed. In this case, in terms of circulating transportation, the second last or the previous substrate of the interrupted cassette 20 is virtually the last substrate of this cassette 20. Hence, the flow step difference $B_m$ is calculated noting the nature of this substrate processing part (or unit) which is skipped (Specifically, values (the number of concurrent processing–2), (the number of concurrent processing–3), . . . are added to the flow steps.). As a result, the loading wait cycle $W_n$ is shortened as a whole. Even when principally the earlier substrates of the interrupting cassette 20 are to be processed concurrently, it is possible to reduce the flow step difference $B_m$ and shorten the overall loading wait cycle $W_n$ in the same manner as above.

Referring again to Table 19 already explain in relation to the first preferred embodiment, treatments a, b and c on substrates of the interrupted cassette (n) are performed concurrently. When the processing of the interrupted cassette (n) is to be temporarily suspended and followed by the processing for the interrupting cassette (n+1), Loading Wait Cycle $W_n=2$ according to the calculation method of FIG. 27 and 28. On the other hand, when the last substrate of the interrupted cassette (n) is to be processed at the substrate processing part (or unit) which is in charge of the treatment c, the loading wait cycle $W_n$ is shortened since possible contention for the treatment a is caused by the second last or the previous substrate 30. That is, retrieving of the substrate from the interrupting cassette (n+1) is advanced one cycle.

G. Structure of Substrate Processing Apparatus of Fourth Preferred Embodiment

A substrate processing apparatus according to a fourth preferred embodiment is almost the same as the apparatus of the third preferred embodiment except that the apparatus of the fourth preferred embodiment does not perform tact management. The structure of the apparatus of the fourth preferred embodiment is very similar to the structure shown in FIGS. 5 and 6. The only difference is the structure of the controller 50. For this reason, a detailed description regarding the structure of the substrate processing apparatus will be given while describing an operation of the substrate processing apparatus.

H. Operation of Substrate Processing Apparatus of Fourth Preferred Embodiment

Except that tact management is not performed, an operation of the apparatus of the fourth preferred embodiment is the same as that of the apparatus of the third preferred embodiment.

FIGS. 30 to 36 are flow charts showing an operation of the apparatus of the fourth preferred embodiment in detail.

Figure 30:
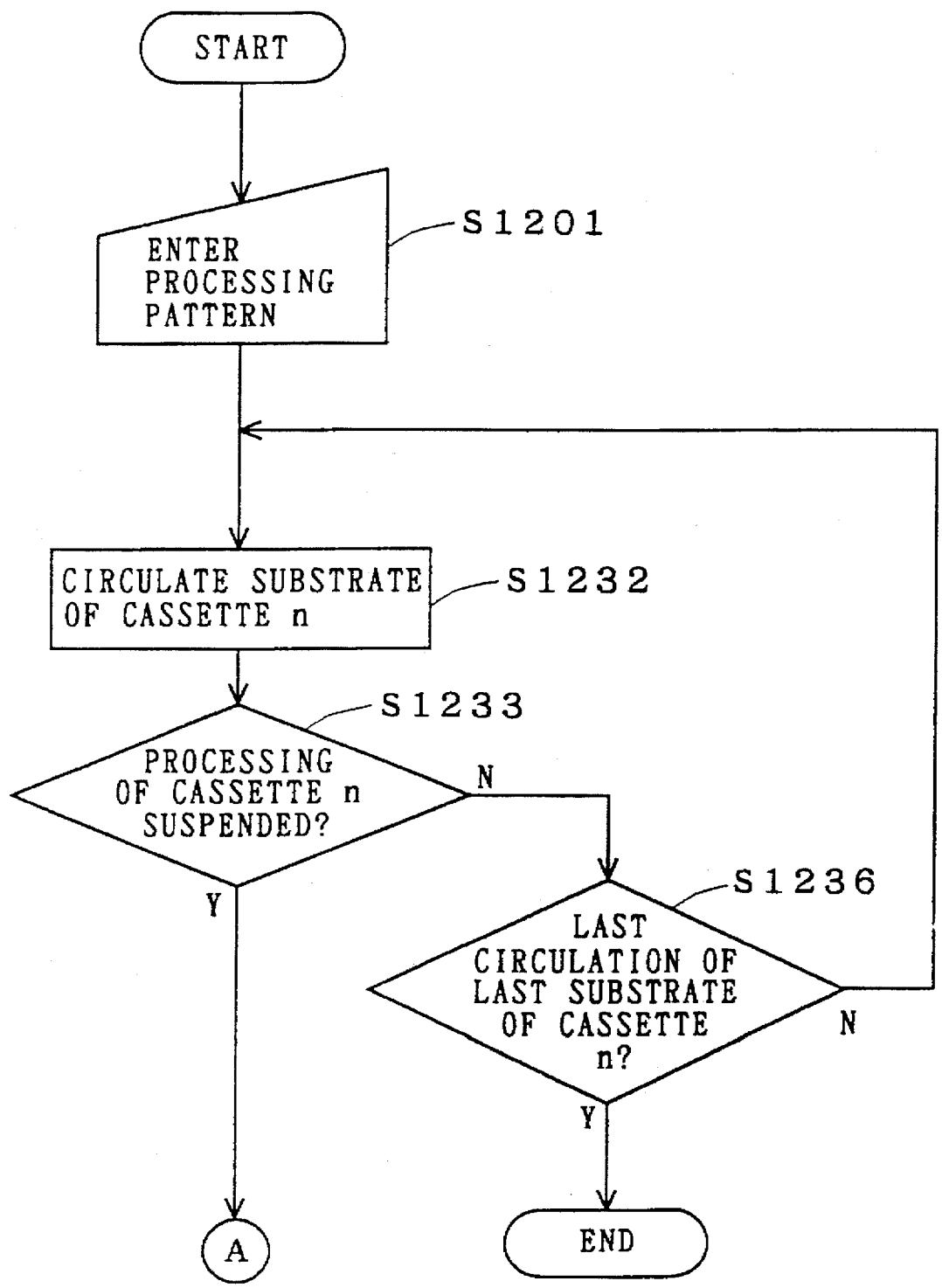
FIGS. 30 to 36 are flow charts of an operation of a substrate processing apparatus according to a fourth preferred embodiment of the present invention.

First, as shown in FIG. 30, a processing condition and other information about the first cassette (n=1) which is to be processed from now are inputted (Step S1201). Next, in accordance with the information inputted at Step S1201, the transport robot 10 performs one cycle of circulating transportation of the substrates 30 of the first cassette (n=1) (Step S1232). Step S1233 is then executed to judge whether an instruction to suspend the processing of the first cassette (n=1) was received (Step S1233). If receipt of such an instruction is confirmed, the processing for the first cassette (n=1) is temporarily suspended and interrupting processing for the second cassette (n+1=2) which has a different flow is started. If receipt of such an instruction is not confirmed, it is judged whether the current circulating transportation is the last cycle of circulating transportation of the last substrate 30 of the first cassette (n=1) (Step S1236). If NO, the sequence returns to Step S1232. This is repeated to serially process the substrates 30 of the first cassette (n=1). Conversely, if the last cycle of circulating transportation of the last substrate 30 of the first cassette (n=1) is detected, the processing for the first cassette (n=1) is finished with the current substrate 30.

Figure 31:
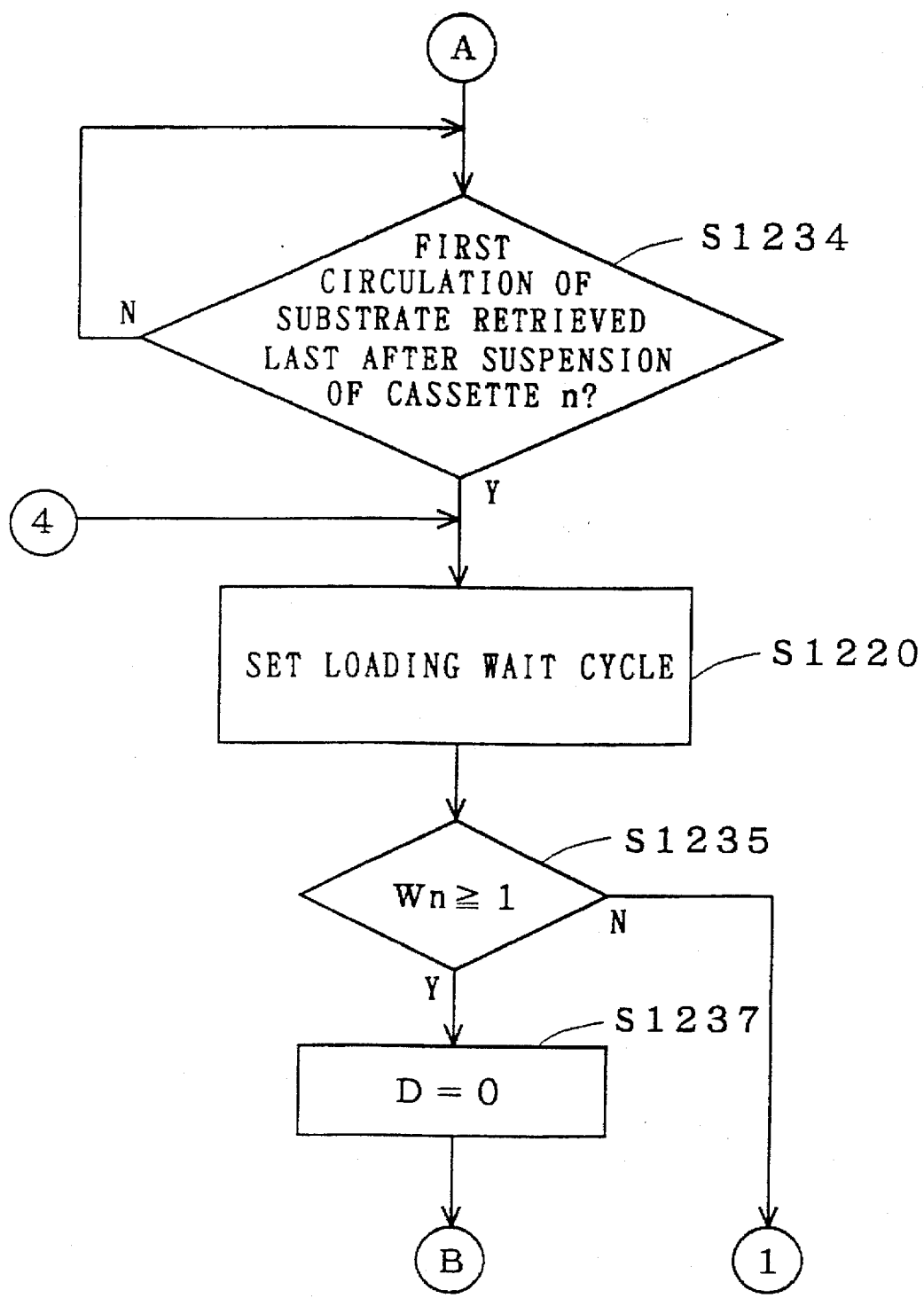
Figure 32:
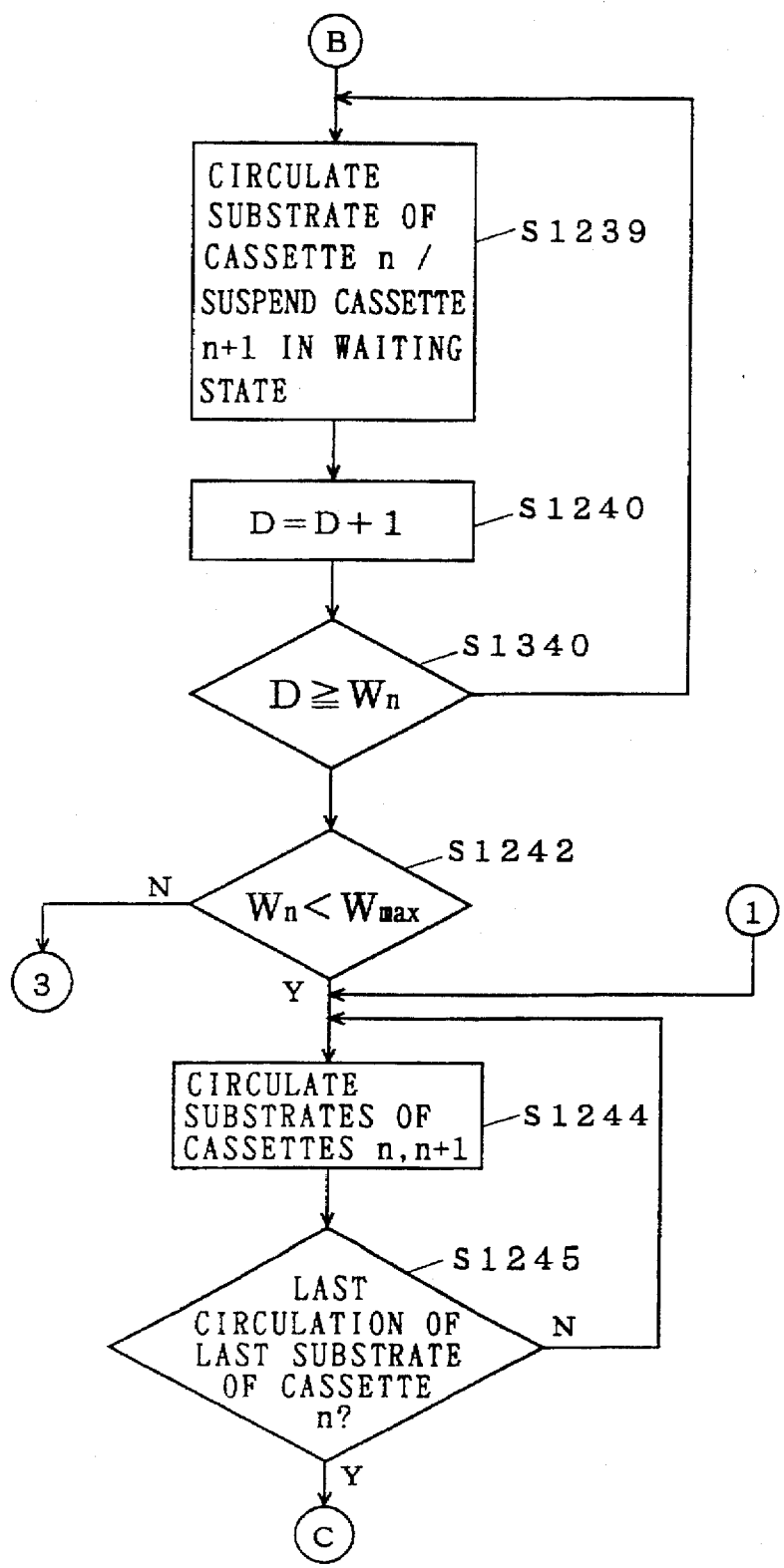

If receipt of the instruction to suspend processing for the first cassette (n=1) is confirmed at Step S1233, it is then judged whether the current circulating transportation is the first cycle of circulating transportation of the last substrate 30 of the interrupted first cassette (n=1) prior to the suspension (Step S1234) as shown in FIG. 31. If the first cycle of circulating transportation of the last substrate 30 prior to the suspension has already begun, a loading wait cycle is determined which is necessary to perform interrupting processing of the substrates 30 of the second cassette (n+1=2), or the interrupting lot which is to be processed from now having a different flow (Step S1020). The loading wait cycle is determined in the manner as that shown in FIGS. 27 and 28. Next, whether the loading wait cycle $W_n=W_1$ is equal to or larger than 1 is judged (Step S1235). If it is judged at Step S1235 that the loading wait cycle $W_n=W_1$ is equal to or larger than 1 so that retrieving of a substrate from the second cassette (n+1) is to be restricted, a count D registered by the counter is reset as D=0 to an initial state (Step S1237). Next, one cycle of circulating transportation of the substrates of the interrupted first cassette (n=1) is started (Step S1239), thereby suspending the processing for the second cassette (n+1=2) in a waiting state as shown in FIG. 32. The registered count D is then incremented by 1 (Step S1240), and it is judged whether the count D is equal to or larger than the loading wait cycle $W_1$ (Step S1340). If NO, the sequence returns to Step S1239. This is repeated to process the last substrate of the first cassette (n=1).

If it is judged at Step S1340 that the count D is equal to or larger than the loading wait cycle $W_1$, the substrates of the second cassette (n+1) are released from the waiting state. Whether the loading wait cycle $W_1$ is shorter than the standard wait cycle Wmax is then judged (Step S1242), and if YES, one cycle of circulating transportation of the substrates of the first and the second cassettes (n, n+1) is started (Step S1244). Next, it is judged whether the current circulating transportation is the last cycle of circulating transportation of the last substrate of the first cassette (n=1) (Step S1245). If NO, the sequence returns to Step S1244. This is repeated to serially and concurrently process the substrates of the first and the second cassettes (n, n+1).

Figure 33:
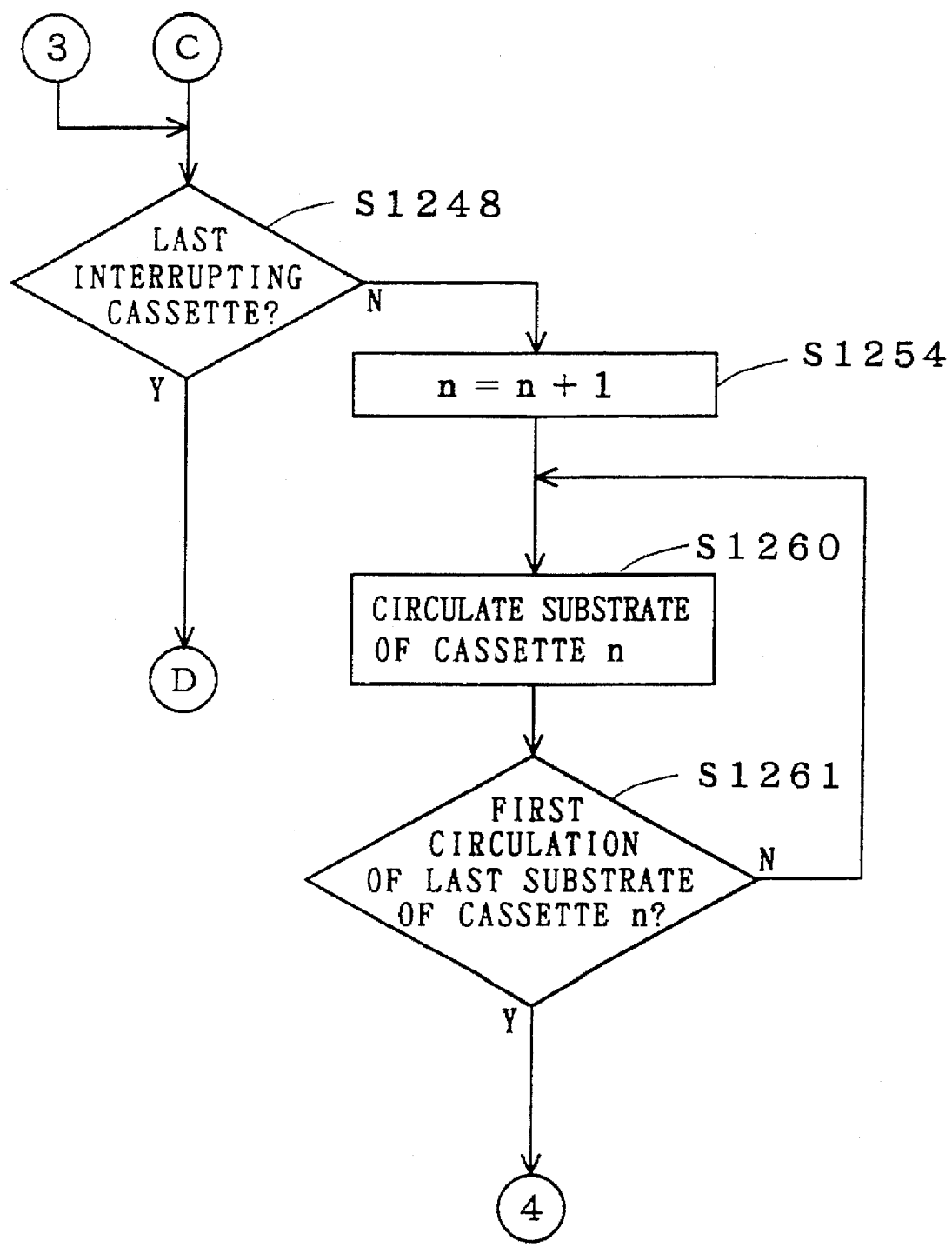

If the last cycle of circulating transportation of the last substrate of the first cassette (n) is detected at Step S1245, whether the interrupting second cassette (n+1) is the last cassette is judged at Step S1248 as shown in FIG. 33. If it is judged at Step S1248 that the second cassette (n+1) is not the last cassette, the cassette number n and the maximum value $W_n$ are updated to retrieve a substrate from a third cassette, or the next interrupting cassette (Step S1254). Following this, the transport robot starts one cycle of circulating transportation of the remaining substrates of the second cassette (n=2) (Step S1260). Next, Step S1261 is executed to judge whether the current circulating transportation is the first cycle of circulating transportation of the last substrate of the second cassette (n=2). Since NO here, the sequence returns to Step S1260. This is repeated to serially process the remaining substrates of the second cassette (n=2). If the first cycle of circulating transportation of the last substrate is detected at Step S1261, the sequence returns to Step S1220 of FIG. 31. At Step S1220, the maximum value $W_n$ is determined which is necessary to successively process a substrate of the third cassette (n+1=3), or the next interrupting lot as shown in FIGS. 27 and 28. This is followed by Steps S1235 to S1248 of FIGS. 31 to 21 so that the substrates of the second and the third cassettes (n=2, n+1=3) are successively processed with a minimum wait time. This is repeated until processing for the last interrupting cassette completes.

If it is judged at Step S1235 (FIG. 31) that the loading wait cycle $W_n=W_1$ is shorter than 1 (that is, equal to 0) so that retrieving of a substrate from the second cassette is not to be restricted, the sequence proceeds to Step S1244 of FIG. 32 to start one cycle of circulating transportation of the remaining substrates of the first cassette (n=1) and the first substrate of the second cassette (n+1=2). Next, it is judged at Step S1245 whether the current circulating transportation is the last cycle of circulating transportation of the last substrate of the first cassette (n=1). If NO, the sequence returns to Step S1244. This is repeated until the last cycle of circulating transportation of the last substrate of the first cassette (n=1) is detected. Detecting the last cycle, the sequence proceeds to Step S1248 of FIG. 33.

If $W_1$=Wmax is found at Step S1242 of FIG. 32, assuming that retrieving of the substrate from the interrupting second cassette (n+1=2) is to be restricted until the processing for the interrupted first cassette (n=1) completes, the sequence immediately proceeds to Step S1248 of FIG. 33 to judge whether the second cassette (n+1=2) is the last interrupting cassette.

Figure 34:
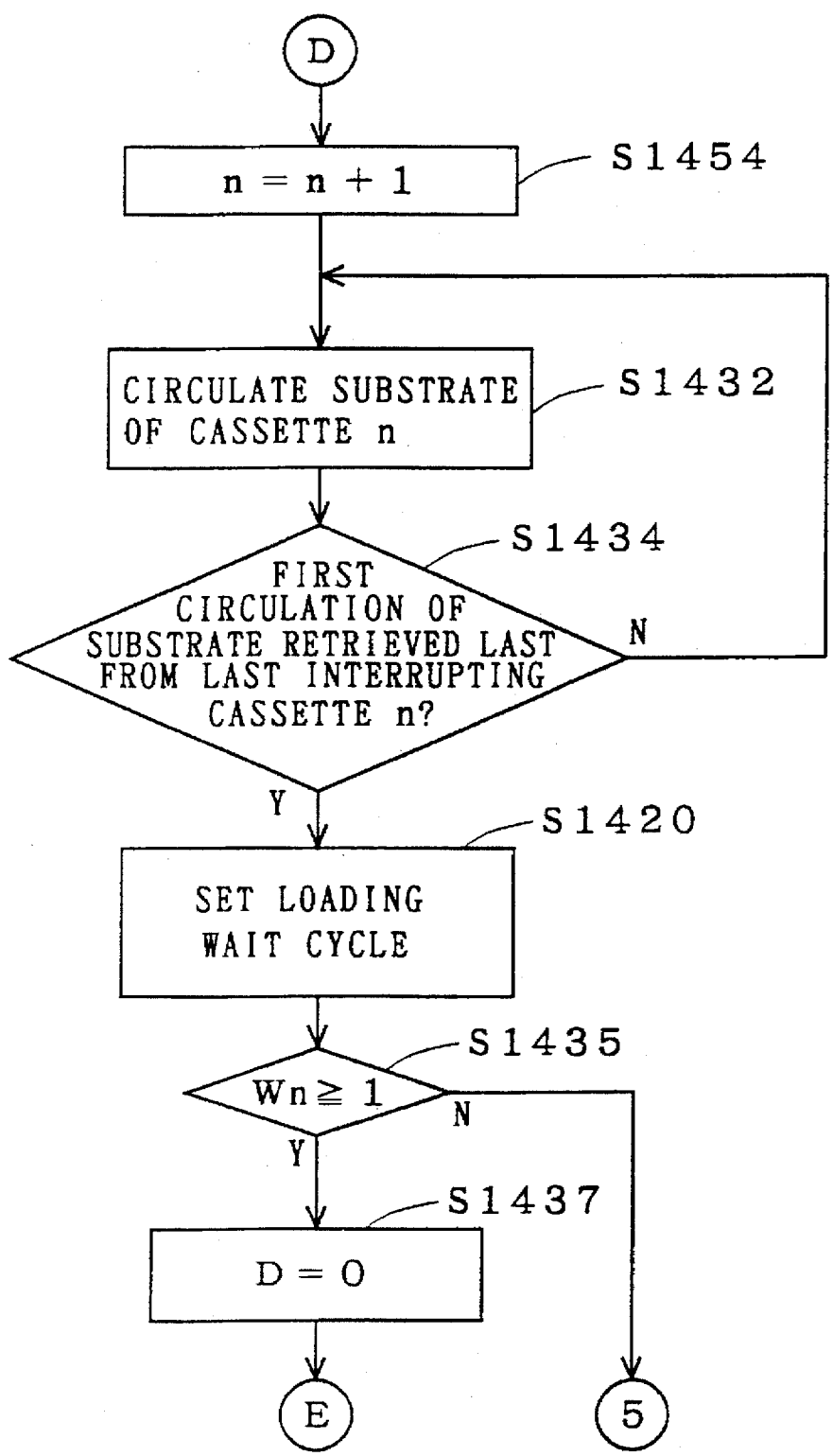
Figure 35:
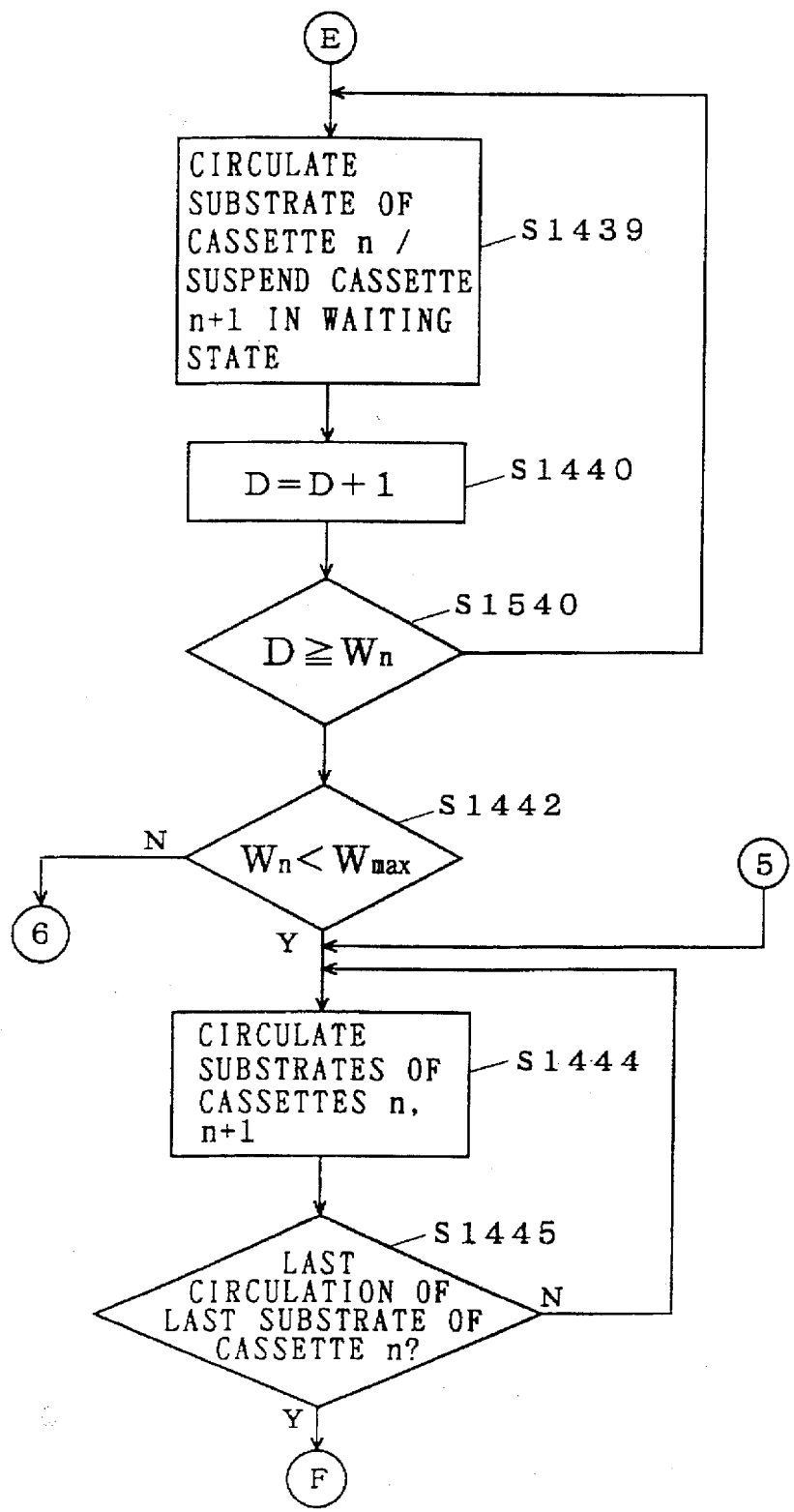

If the last interrupting cassette is detected at Step S1248 of FIG. 33, the cassette number n and the maximum value $W_n$ are updated (Step S1454) as shown in FIG. 34. Next, the transport robot starts one cycle of circulating transportation of the substrates of the second cassette (n=2) (Step S1432). It is then judged at Step S1434 whether the current circulating transportation is the first cycle of circulating transportation of the last substrate of the interrupting second cassette (n=2). If NO, the sequence returns to Step S1432. This is repeated to serially process the substrates of the interrupting second cassette (n=2). On the other hand, if the first cycle of circulating transportation of the last substrate of the interrupting second cassette (n=2) is detected at Step S1434, the loading wait cycle $W_n$ is determined which is necessary to end the interrupting processing for the second cassette (n=2) and release the suspension of the first cassette (n+1=3), or the interrupted lot (Step S1420). The loading wait cycle is determined in the manner as that shown in FIGS. 27 and 28. Following this, Steps S1435 and S1437 of FIG. 34 and Steps S1439 to S1445 of FIG. 35 are executed to successively process the substrates of the second and the first cassettes (n=2, n+1=3) with a minimum wait time. Corresponding to Steps S1235 and S1237 of FIG. 31 and Steps S1239 to S1245 of FIG. 32, Steps S1435 and S1437 of FIG. 34 and Steps S1439 to S1445 of FIG. 35 will not be described in detail here.

Figure 36:
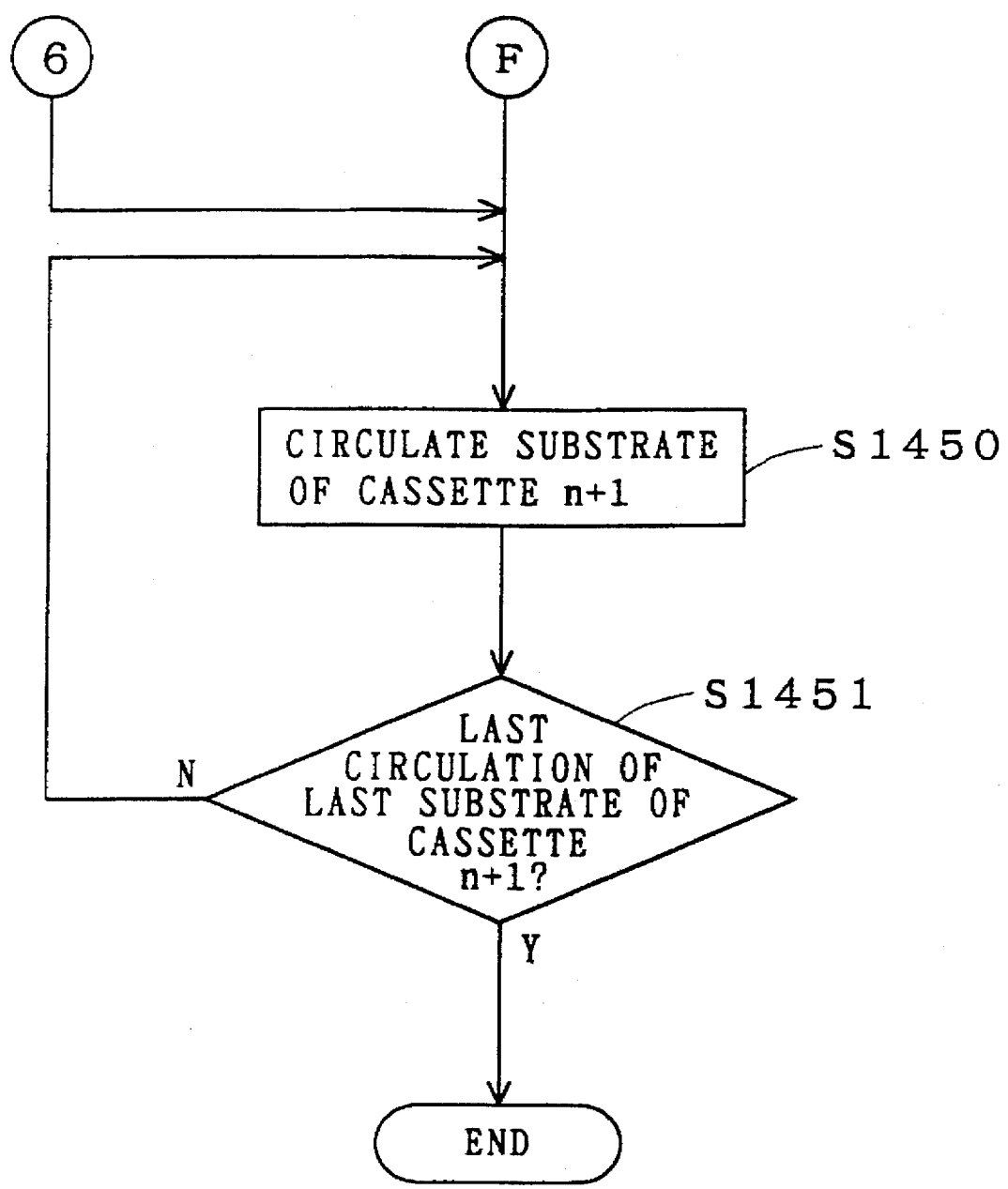

If the last cycle of circulating transportation of the last substrate of the second cassette (n), or the interrupting lot is detected at Step S1445 of FIG. 35, the transport robot starts one cycle of circulating transportation of the remaining substrates of the first cassette (n+1=3), or the interrupted lot as shown in FIG. 36 (Step S1450). Next, Step S1451 is executed to judge whether the current circulating transportation is the last cycle of circulating transportation of the last substrate of the first cassette (n+1=3). Since NO here, the sequence returns to Step S1450. This is repeated to serially process the remaining substrates of the first cassette (n+1=3). If the last cycle of circulating transportation of the last substrate is detected at Step S1451, the sequence ends the processing of the interrupted first cassette (n+1=3), or the interrupted lot.

The present invention, described above in relation to the third and the fourth preferred embodiments, is not restricted to these particular embodiments. For example, the loading wait cycle $W_n$ may not be equal to the maximum flow step difference $B_n$ or the processing position difference $A_n$. That is, one cassette of a certain lot never passes a precedent cassette of a different lot when the loading wait cycle $W_n$ is larger than the maximum flow step difference $B_n$ or the processing position difference $A_n$, which in turn never allows interference between substrates of these two cassettes. On the other hand, if the loading wait cycle $W_n$ is shorter than the standard wait cycle (the wait cycle in the conventional method), the through put is improved.

Further, although the third preferred embodiment uses the longer one of different tact times of interrupted and interrupting cassettes of different lots which are within the apparatus, this may not be necessary. For instance, if the tact time of the interrupted cassette is longer, the tact time of the interrupting cassette may be adjusted to the tact time of the interrupted cassette. In this case, however, substrates of the two cassettes must be processed such that the effect created by extending the tact time and setting the loading wait cycle shorter than the standard wait cycle is not offset. Meanwhile, if the two successive cassettes have the same tact time, it is possible to process substrates of the two cassettes both with a constant cycle time, or a tact time.

In addition, although the foregoing has described the third and the fourth preferred embodiments as both related only to interrupting processing of substrates having different flows (i.e., wafer flows), the present invention is also applicable to interrupting processing of different recipes in which various process data such as a processing temperature, a processing time, a rotation number and a processing fluid as well as through puts are different although the wafer flows are the same. Even in such interrupting processing, the through put is improved by appropriately delaying the loading timing of a subsequent lot in each cycle.

I. Structure of Substrate Processing Apparatus of Fifth Preferred Embodiment

A substrate processing apparatus according to a fifth preferred embodiment is modification of the substrate processing apparatus of the first preferred embodiment. The apparatus of the fifth preferred embodiment serially processes a plurality of substrates having different flows from each other by single substrate processing, whereas the apparatus of the first preferred embodiment links successive lots which have different flows from each other and successively processes substrates of these lots. The substrate processing apparatus of the fifth preferred embodiment is otherwise almost the same as the substrate processing apparatus of the first preferred embodiment. The structure of the substrate processing apparatus of the fifth preferred embodiment is virtually the same as that shown in FIGS. 7 and 8. The only difference is the structure of the controller 50. For this reason, a detailed description regarding the structure of the substrate processing apparatus will be given while describing an operation of the substrate processing apparatus.

J. Operation of Substrate Processing Apparatus of Fifth Preferred Embodiment

FIGS. 37 to 41 are flow charts showing an operation of the substrate processing apparatus of the fifth preferred embodiment. The apparatus of the fifth preferred embodiment processes substrates which have different flows from each other by single substrate processing while performing tact management. In the following, an operation of the substrate processing apparatus, and particularly procedures of transporting the substrates 30 will be described with reference to the flow charts. An operator enters the number of the cassettes 20 to be processed by single substrate processing, the number of the substrates 30 in each cassette 20, wafer flows, processing conditions and procedures of single substrate processing and etc. (Step S2001). As herein termed, "procedures of single substrate processing" refer to the contents defining which wafer flow and processing condition are to be selected to process the substrates 30 of each cassette 20. Different substrates 30 require different contents in single substrate processing. If necessary, the operator inputs information regarding the arrangement of the substrate processing parts in the apparatus and information regarding the transport robot 10 on the keyboard 52.

Next, in response to an instruction from the operator to start processing and based on the information entered at Step S2001, tact times $\{T_k\}$ are calculated which are necessary to process the substrates k having different flows by single substrate processing (Step S2002). In single substrate processing in general, tact management is possible only when the rates of wafer flows are to be controlled by a processing time and when factors which are not related to time such as processing temperatures are different between the wafer flows of the substrates. A detailed operation routine of the transport robot 10 and a detailed processing pattern at each substrate processing part (or unit) are determined in accordance with the transportation order of the substrate 30, the processing time and the other parameters, if needed. The subscript "k" of the tact times $T_k$ is an integer equal to or larger than 1 and serves as a serial number assigned to the substrates 30 which are to be processed by single substrate processing.

At the same time with this, as preparation prior to circulating transportation in single substrate processing, the substrate 30 which is to be processed first is retrieved from the cassette 20 and transported to the indexer IND to be ready for processing at a substrate processing part (k=1).

Next, the tact timer is started (Step S2031). The tact time T is chosen as the longest one of tact times $\{T_{k-r}(r=0, 1, 2, \ldots r_0)\}$ of substrates 30 which are to be circulated from now including those substrates which are to be loaded into the substrate processing part (The indexer IND immediately before starting the processing is not included; In tact management, the indexer IND is regarded as the last substrate processing part.) and those substrates which are already subjected to the single substrate processing at the substrate processing parts (The indexer IND immediately before the end of the processing is included; In tact management, the indexer IND is regarded as the last substrate processing part.). The subscript "k-r" of the tact times $\{T_{k-r}\}$ corresponds to the serial number assigned to the substrates 30 which are to be circulated from now. The symbol r is an integral variable not smaller than 1 but not larger than $r_0$ which corresponds to the number of the substrates 30 which are already subjected to the single substrate processing at the substrate processing parts (The indexer IND immediately before the end of the processing is not included.). Hence, in general, the longest one of tact times $T_k, T_{k-1}, T_{k-2}, \ldots T_{k-r}$ is selected as the tact time T. Since the current circulating transportation is the first cycle of circulating transportation here, $T=T_1$.

Next, the transport robot 10 starts one cycle of circulating transportation of substrates $\{k-r$ $(r=0, 1, 2, \ldots r_0)\}$ (Step S2032). The substrates $\{k-r\}$ to be transported this time include the substrate k which is to be loaded into the substrate processing parts from now and substrates $k-1$, $k-2, k-3, \ldots k-r_0$ which are already subjected to the single substrate processing at the substrate processing parts. Since the current circulating transportation is the first cycle of circulating transportation, one cycle of circulating transportation of the first substrate (k=1) alone is performed by the transport robot 10 (Step S2032). Following this, after waiting for the tact time $T=T_1$, loading wait cycles $\{W_{k+1,k-r}(r=0, 1, 2, \ldots r_0)\}$ are determined. It is then judged whether at least one of these loading wait cycles is equal to or larger than 1 (Step S2035).

The loading wait cycles $\{W_{k+1,k-r}(r=0, 1, 2, \ldots r_0)\}$ correspond to the number of wait cycles during which retrieving of the next substrates are restricted to prevent interference upon the substrates 30 which are already subjected to the single substrate processing. That is, in connecting processing of the substrates $\{k-r\}$ which correspond to already loaded precedent substrates 30 to processing of substrates $(k+1)$ which correspond to later loaded subsequent substrates 30, by delaying loading of the subsequent substrates $(k+1)$ for the loading wait cycles $\{W_{k+1,k-r}(r=0, 1, 2, \ldots r_0)\}$, it is possible to prevent interference between the substrates $(k+1)$ and the precedent substrates $\{k-r\}$. As described specifically below, the loading wait cycles $\{W_{k+1,k-r}(r=0, 1, 2, \ldots r_0)\}$ are the larger ones of (a) processing position differences $A_{k-r}$ between the wafer flows of the precedent substrates {k–r} and those of the subsequent substrates (k+1) and (b) maximum flow step differences $B_{k-r}$ between the precedent substrates {k–r} and the subsequent substrates (k+1) (The definitions of the values $A_{k-r}$ and $B_{k-r}$ will be given later.).

Figure 40:
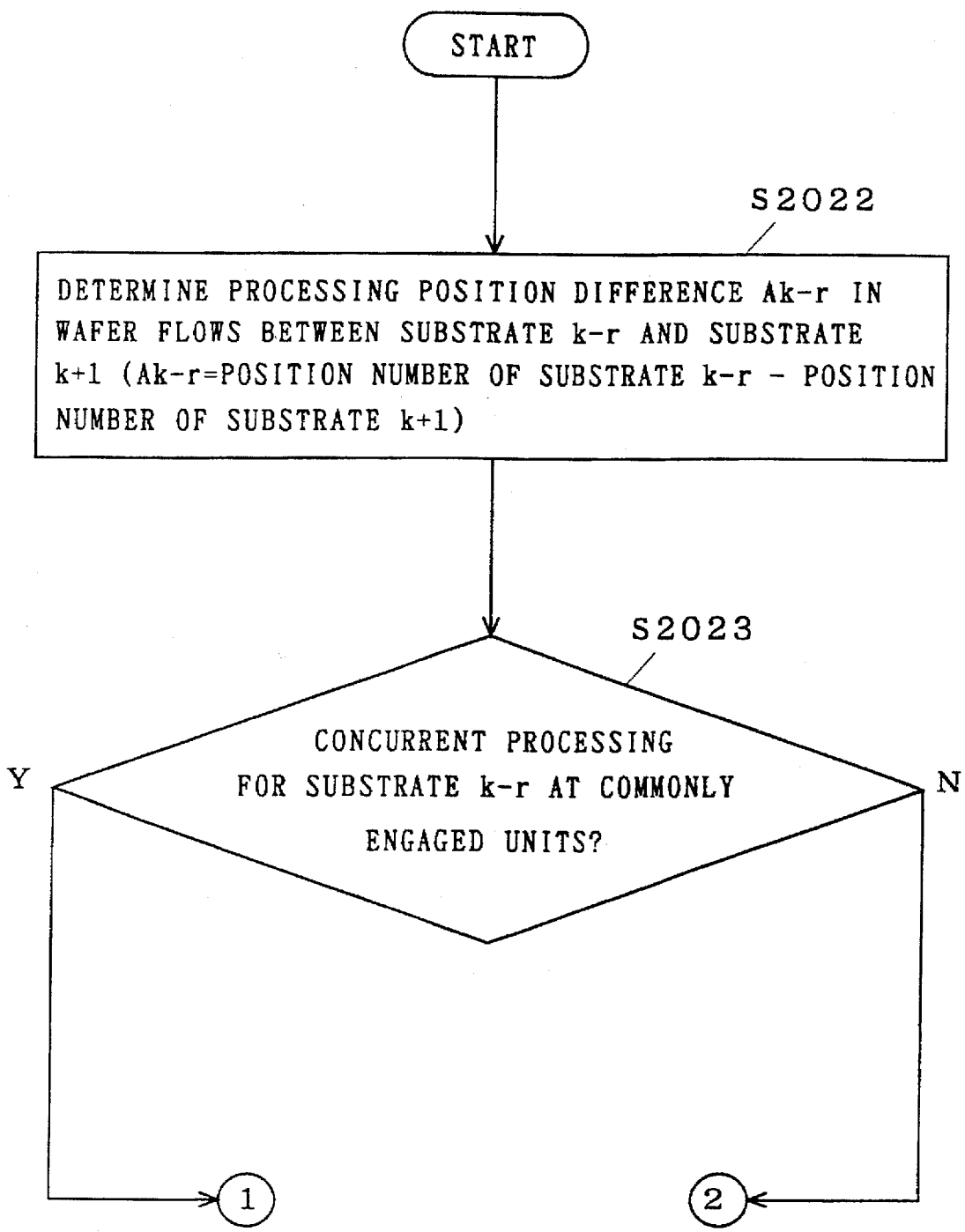
FIGS. 40 and 41 are flow chaffs showing calculation of a loading wait cycle.
Figure 41:
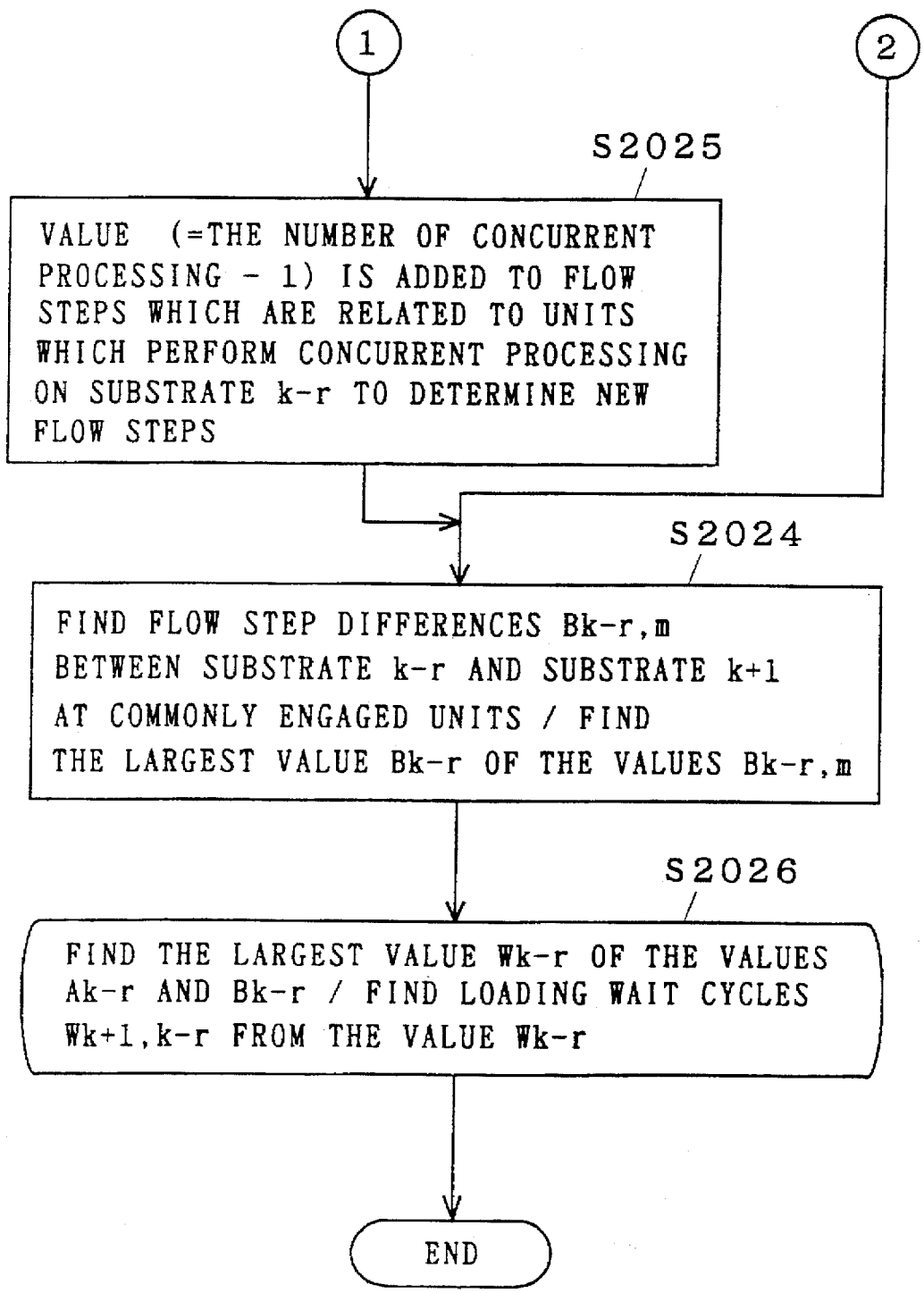

FIGS. 40 and 41 are flow charts showing calculation of the loading wait cycles $\{W_{k+1,k-r}\}$ at Step S2035 in detail.

First, Step S2022 is executed to calculate the processing position differences $\{A_{k-r}(r=0, 1, 2, \ldots r_0)\}$; The subscript "k–r" is for distinguishing precedent substrates {k–r} regarding which the processing position difference needs be calculated.} between the wafer flows of the precedent substrates {k–r} and the subsequent substrates (k+1). The processing position differences $\{A_{k-r}(r=0, 1, 2, \ldots r_0)\}$ are each a difference between the number (i.e., position number) of the substrate processing parts (or units) to be engaged with by the wafer flows between each precedent substrate {k–r} and each subsequent substrate (k+1) (There are as many as $r_{o+1}$ such differences in correspondence with the number of the precedent substrates {k–r}.). Interference never occurs if any of these differences $\{A_{k-r}\}$ has a negative value, and therefore, that particular processing position difference $\{A_{k-r}\}$ is determined as 0. Instead of including an operation of the indexer IND in the position number as here, an operation of the indexer IND may not be included in the position number. The differences $\{A_{k-r}\}$ are calculated in order to prevent the subsequent substrates (k+1) from passing the precedent substrates {k–r}. That is, when the position number of any one of the subsequent substrates (k+1) is less than the position numbers of the precedent substrates {k–r}, this subsequent substrate (k+1) interferes with any one of the precedent substrates {k–r} when passing to thereby make tact management impossible or confuse the wafer flows of the substrates {k–r} and (k+1), unless the processing of this subsequent substrate (k+1) does not wait for a time which is expressed by the difference in the number of the cycles.

The processing position differences $\{A_{k-r}\}$ are calculated with respect to the wafer flows of the respective precedent substrates $\{k-r(r=0, 1, 2, \ldots r_0)\}$. Except for this, the processing position differences $\{A_{k-r}\}$ are calculated in a similar manner to Step S22 of the first preferred embodiment (FIG. 10, Tables 1 and 2), and therefore, will not be described in detail here. In substituting Tables 1 and 2 in relation to the fifth preferred embodiment, it is to be noted that the substrate of the precedent cassette (n) corresponds to the precedent substrates $\{k-r(r=0, 1, 2, \ldots r_0)\}$ while the substrate of the subsequent substrate (n+1) corresponds to the subsequent substrates (k+1).

Next, as shown in FIG. 40, Step S2023 is executed to judge whether at least one of the precedent substrates {k–r} is processed by concurrent processing at the substrate processing parts (or units) which are to be engaged with by the wafer flows of both the precedent substrates {k–r} which are already within the substrate processing parts and the subsequent substrates (k+1). As described in detail below, this is to prevent contention between the subsequent substrates (k+1) and the precedent substrates {k–r} at the substrate processing parts (or units) which perform concurrent processing.

When there is no concurrent processing performed, Step S2024 is executed to calculate the maximum flow step differences $\{B_{k-r}(r=0, 1, 2, \ldots r_0)\}$ between the precedent substrates {k–r} which are already within the substrate processing parts and the subsequent substrates (k+1) with respect to the precedent substrates {k–r} as shown in FIG. 41. The maximum flow step differences $\{B_{k-r}\}$ are each a maximum difference (flow step differences $\{B_{k-r,m}\}$) in the orders (i.e., flow steps) of the substrate processing parts (or units) which are engaged with by the precedent substrates {k–r} and the subsequent substrates (k+1) (where the subscript "k–r" distinguishes the precedent substrates {k–r} regarding which the differences need be calculated, and the subscript "m" distinguishes the commonly engaged substrate processing parts).

There are as many flow step differences $\{B_{k-r,m}\}$ as the number of substrate processing parts which are engaged with by processing of the early and subsequent substrates {k–r} and (k+1), for each precedent substrate {k–r}. Interference never occurs if any one of the differences $\{B_{k-r,m}\}$ has a negative value, and therefore, that particular flow step difference $\{B_{k-r,m}\}$ is determined as 0. The maximum flow step differences $\{B_{k-r}\}$ are calculated for each precedent substrate {k–r}. Instead of including an operation of the indexer IND in the flow steps as here, an operation of the indexer IND may not be included in the flow steps.

The maximum flow step differences $\{B_{k-r}\}$ are calculated mainly to prevent contention between the substrates {k–r} and (k+1), and hence, the processing of the subsequent substrates (k+1) from passing the processing of the precedent substrates {k–r}. That is, when there is a substrate processing part where the flow steps for the subsequent substrates (k+1) are less than those of the precedent substrates {k–r}, the subsequent substrates (k+1) interferes with any one of the precedent substrates {k–r} to thereby make tact management impossible, unless the processing of the subsequent substrates (k+1) does not wait for a time which is expressed by the maximum difference or longer.

When there is no concurrent processing performed as described above, specific methods of calculating the flow step differences $\{B_{k-r,m}\}$ and the maximum flow step differences $\{B_{k-r}\}$ are the same as that described in relation to Step S24 in the first preferred embodiment (FIG. 11) and Tables 3 to 6, and therefore, will not be described in detail here, except for a point that the differences $\{B_{k-r,m}\}$ and $\{B_{k-r}\}$ are calculated with respect to the wafer flow of each one of the precedent substrates $\{k-r(r=0, 1, 2, \ldots r_0)\}$. In reading Tables 3 to 6 in relation to the fifth preferred embodiment, it is to be noted that the precedent cassette (n) corresponds to the precedent substrates $\{k-r (r=0, 1, 2, \ldots r_0)\}$ while the subsequent cassette (n+1) corresponds to the subsequent substrates (k+1).

Conversely, when concurrent processing is performed, as shown in FIG. 41, of the flow steps of the precedent substrates $\{k-r(r=0, 1, 2, \ldots r_0)\}$ which are found in the same manner as in the case of where concurrent processing is not performed, a value (the number of concurrent processing–1) is added to those which are related to the substrate processing parts (or units) in which concurrent processing is performed, to thereby determine new flow steps (Step S2025). Following this, the flow step differences $\{B_{k-r,m}(r=0, 1, 2, \ldots r_0)\}$ are calculated as differences in the flow steps for each one of the precedent substrates {k–r}. Further, the maximum differences regarding the respective loaded substrates {k–r} are determined as the flow step differences $\{B_{k-r}(r=0, 1, 2, \ldots r_0)\}$ (Step S2024). The maximum flow step differences $\{B_{k-r}\}$ are calculated using the new flow steps which are defined by adding the value (the number of concurrent processing–1) with respect to the substrate processing parts (or units) which perform concurrent processing. This is to prevent contention between the subsequent substrates (k+1) and the precedent substrates {k−r} at the substrate processing parts (or units) in which concurrent processing is performed. The term "−1" aims at preventing possible interference between the early and subsequent substrates {k−r} and (k+1) even when it is unknown which substrate processing part (or unit) performing concurrent processing still contains the precedent substrates {k−r}.

When concurrent processing is performed as described above, specific methods of calculating the flow step differences $\{B_{k-r,m}\}$ and the maximum flow step differences $\{B_{k-r}\}$ are the same as those described in relation to Steps S24 and S25 in the first preferred embodiment (FIG. 11) and Tables 7 to 9, and therefore, will not be described in detail here, except for a point that the differences $\{B_{k-r,m}\}$ and $\{B_{k-r}\}$ are calculated with respect to the wafer flow of each one of the precedent substrates $\{k-r\ (r=0, 1, 2, \ldots r_0)\}$. In substituting Tables 7 to 9 in relation to the fifth preferred embodiment, it is to be noted that the substrate of the precedent cassette (n) corresponds to the precedent substrates $\{k-r(r=0, 1, 2, \ldots r_0)\}$ while the substrate of the subsequent cassette (n+1) corresponds to the subsequent substrates (k+1).

Lastly, Step S2026 is executed (FIG. 41). At Step S2026, relative wait cycles $\{w_{k-r}(r=0, 1, 2, \ldots r_0)\}$, or larger ones of the processing position differences $\{A_{k-r}(r=0, 1, 2, \ldots r_0)\}$ and the maximum flow step differences $\{B_{k-r}(r=0, 1, 2, \ldots r_0)\}$, are calculated for each one of the precedent substrates $\{k-r(r=0, 1, 2, \ldots r_0)\}$. The loading wait cycles $\{W_{k+1,k-r}(r=0, 1, 2, \ldots r_0)\}$ are then calculated from the relative wait cycles $\{w_{k-r}(r=0, 1, 2, \ldots r_0)\}$.

The relative wait cycles $\{w_{k+1,k-r}\}$ express the number of wait cycles during which loading of the subsequent substrates (k+1) must be restricted to prevent contention between the subsequent substrates (k+1) and the precedent substrates $\{k-r\ (r=0, 1, 2, \ldots r_0)\}$. The relative wait cycles $\{w_{k-r}\}$ are counted with reference to the respective precedent substrates $\{k-r\}$. The loading wait cycles $\{W_{k+1,k-r}\}$ also express the number of wait cycles during which retrieving of the subsequent substrates (k+1) must be restricted to prevent contention between the subsequent substrates (k+1) and the precedent substrates $\{k-r\}$, however, the loading wait cycles $\{W_{k+1,k-r}\}$ are counted with reference to the last substrate (k) of the precedent substrates.

When the loading wait cycles $\{W_{k+1,k-r}(r=0, 1, 2, \ldots r_0)\}$ are calculated, relative correction is performed on the relative wait cycles $\{w_{k-r}(r=0, 1, 2, \ldots r_0)\}$. As herein termed, "relative correction" is to convert the relative wait cycles $\{w_{k-r}\}$ into the number of cycles (i.e., loading wait cycles $\{W_{k+1,k-r}\}$) during which retrieving of the subsequent substrates (k+1) is actually restricted in relation to the last precedent substrates (k) considering a few cycles of circulating transportation were already repeated to process the precedent substrates $\{k-r(r=0, 1, 2, \ldots r_0)\}$. In other words, although the loading wait cycles $(W_{k+1,k})$ of the substrate (k) are equal to the relative wait cycles $(w_k)$, the loading wait cycles $(W_{k+1,k-1})$ of a substrate (k−1) are one cycle less than the relative wait cycles $(w_{k-1})$. Similarly, the loading wait cycles $(W_{k+1,k-2})$ of a substrate (k−2) are two cycles less than the relative wait cycles $(w_{k-2})$, and the loading wait cycles $(W_{k+1,k-r_0})$ of a substrate $(k-r_0)$ are $r_0$ cycles less than the relative wait cycles $(w_{k-r_0})$. That is, in general, the relative wait cycles and the loading wait cycles are in a relation $W_{k+1,k-r_0}=w_{k-r_0}-r_0$. The term "−$r_0$" indicates that the correlation becomes weaker as the number of already repeated circulations increases.

Figure 37:
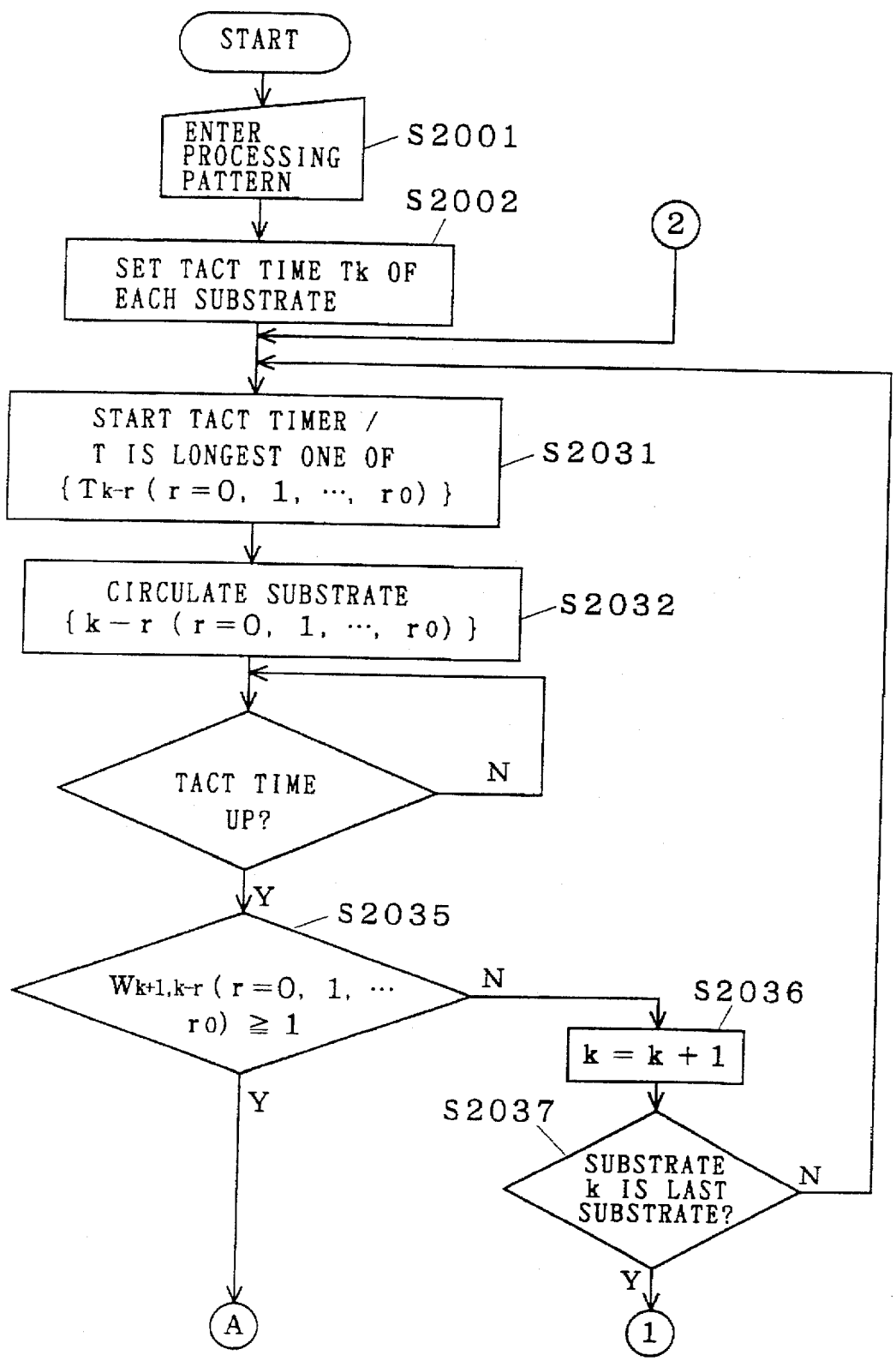
FIGS. 37 to 39 are flow charts of an operation of a substrate processing apparatus according to a fifth preferred embodiment of the present invention.
Figure 38:
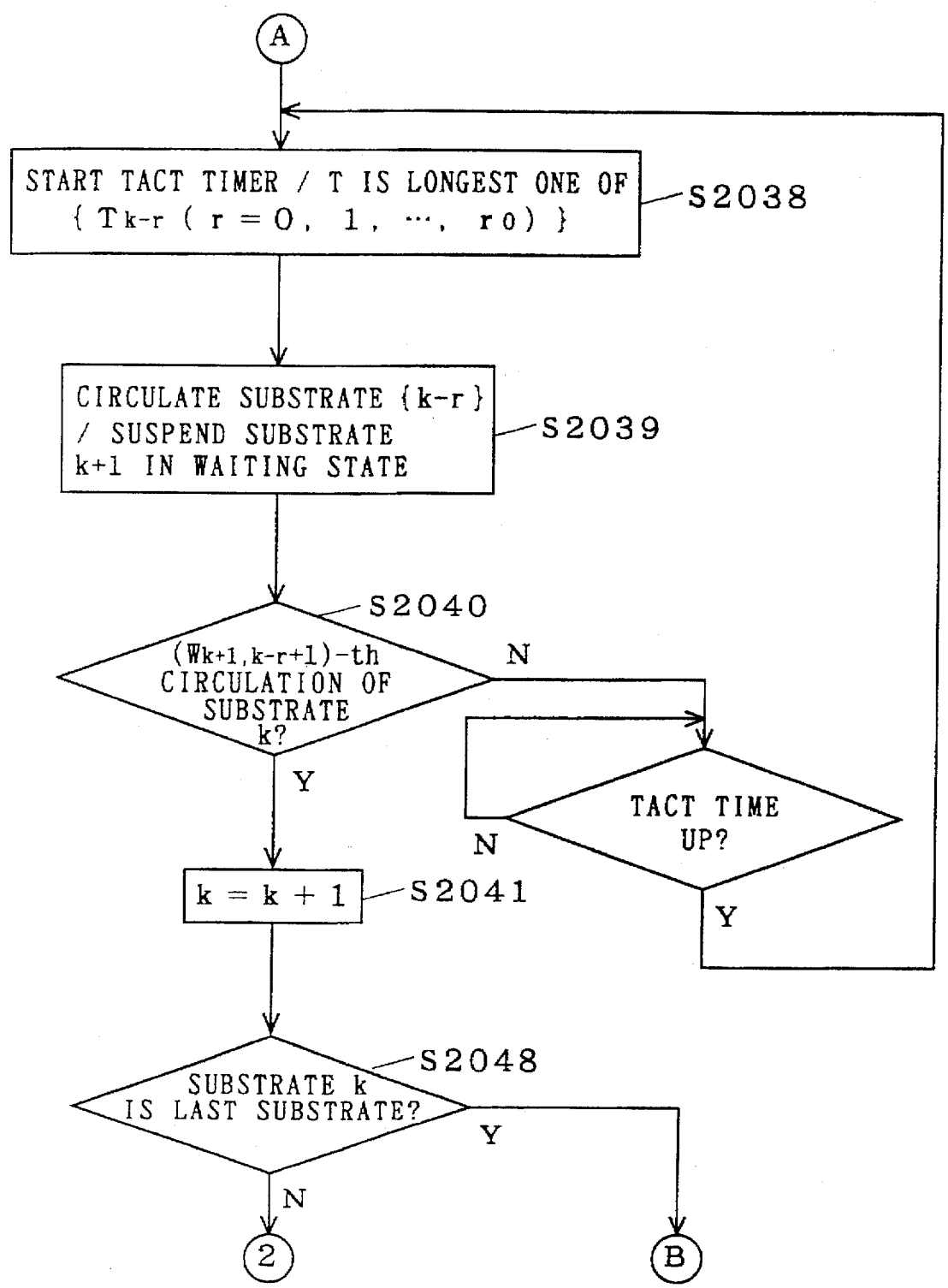

If it is judged at Step S2035 of FIG. 37 that at least one of the loading wait cycles $\{W_{k+1,k-r}\}$ is equal to or larger than 1 and retrieving of the second substrate (k+1=2) is to be restricted (At this point, the first cycle of circulating transportation of the first substrate (k=1) is already complete and $\{W_{k+1,k-r}\}=\{W2,1\}$.), the tact timer is started as shown in FIG. 38 (Step S2038). The tact time T is determined as at Step S2031 of FIG. 37. That is, the tact time T is chosen as the longest one of tact times $\{T_{k-r}(r=0, 1, 2, \ldots r_0)\}$ of substrates which are to be transported from now and substrates which are already subjected to processing within the substrate processing parts (The indexer IND before ending the processing is included.).

Next, one cycle of circulating transportation of the first substrate (k=1) is executed (Step S2039) while the second substrate (k+1=2) is in a waiting state. It is then judged at Step S2040 whether the current circulating transportation is a $\{W_{k+1,k-r+1}\}$-th cycle of circulating transportation of the first substrate (k=1). More precisely, whether the current circulating transportation is a $\{W2,1+1\}$-th cycle of circulating transportation of the first substrate (k=1) is judged here since only the first substrate (k=1) is circulated and a relation $\{W_{k+1,k-r}\}=\{W2,1+1\}$ holds. If judged NO here, the sequence waits for the tact time T and returns to Step S2038. This is repeated to process the first substrate (k=1).

If the $\{W_{k+1,k-r+1}\}$-th, that is, the $\{W2,1+1\}$-th cycle of circulating transportation of the first substrate (k=1) is detected at Step S2040, the second substrate (k+1=2) is released from the waiting state and the serial number k assigned to the substrates is updated (Step S2041). Steps S2038 to S2040 are repeated and only the first substrate (k=1) is repeatedly circulated $\{W2,1\}$ times before the second substrate (k+1=2) is released from the waiting state. As a result, retrieving of the second substrate (k+1=2) is delayed for the loading wait cycles $\{W_{k+1,k-r}\}$=W2,1+1.

Next, Step S2048 is executed to judge whether the second substrate (k=2) is the last substrate to be processed. If NO, deciding that retrieving of the second substrate (k=2) is allowed, the sequence returns to Step S2031 of FIG. 37 to start the tact timer. Assuming here that the processing of the first substrate (k−1=1) is not complete yet and the first substrate (k−1=1) is still in one of the substrate processing parts, a relation $r_0=1$ holds. Hence, the tact time T is the longer one of the tact time $T_{k-1}=T_1$ for processing the first substrate (k−1=1) and the tact time $T^k=T_2$ for processing the second substrate (k=2).

The transport robot 10 then performs one cycle of circulating transportation of the substrates $\{k-r(r=0, 1, 2, \ldots r_0)\}$ (Step S2032). Since the assumption here is that the processing of the first substrate (k−1=1) is not complete yet and the first substrate (k−1=1) is still in one of the substrate processing parts, one cycle of circulating transportation of the substrates of the first and the second substrates {k−1,k} is performed. The transport robot 10 operates in such a manner that the first and the second substrates are circulated. More particularly, transport robot 10 accesses all substrate processing parts (or units) which are to be engaged with in the wafer flows of both of the substrates {k−1,k+1}.

After waiting for the tact time T, Step S2035 is executed to judge whether at least one of the loading wait cycles $\{W_{k+1,k-r}(r=0, 1, 2, \ldots r_0)\}$ is equal to or larger than 1. The loading wait cycles $\{W_{k+1,k-r}\}$ are calculated in the manner as that shown in FIGS. 40 and 41. Since the assumption here is that the processing of the first substrate (k−1=1) is not complete yet and the first substrate (k−1=1) is still in one of the substrate processing parts, if it is judged that at least one of the loading wait cycles $\{W_{k+1,k-r}\}=\{W3,2\ W3,1\}$ is equal to or larger than 1 so that retrieving of the next, that is, the third substrate (k+1=3) is to be restricted, the tact timer is started as shown in FIG. 38 (Step S2038). Following this, Steps S2038 to S2040 are repeated until it is judged that this retrieving restriction period is not needed anymore, thereby repeating circulations of the first and the second substrates {k–1, k} for the largest number of the loading wait cycles $\{W_{k+1,k-r}\}=\{W3,2\ W3,1\}$. Depending on the contents of the wafer flows of the first and the second substrates {k–1, k}, it is possible that processing of one of the two substrates {k–1, k} completes during the retrieving restriction period to leave the other remaining substrate alone in the substrate processing parts.

If it is judged at Step S2035 that at least one of the loading wait cycles $\{W_{k+1,k-r}(r=0, 1, 2, \ldots r_0)\}$ is smaller than 1 (that is, equal to 0) so that retrieving of the next, that is, the third substrate (k+1=3) needs not be restricted, the serial number k assigned to the substrates is updated (Step S2036).

Next, Step S2037 is executed to judge whether the third substrate (k+1=3) is the last substrate to be processed. If NO, deciding that retrieving of the third substrate (k=3) is allowed, the sequence returns to Step S2031 to start the tact timer. Assuming here that the processing of the first and the second substrates {k–1, k} is not complete yet and the first and the second substrates are still in the substrate processing parts, a relation $r_0=2$ holds. Hence, the tact time T is the longer one of the tact time $\{T_{k-2}, T_{k-1}, T_k=T_1, T_2, T_3\}$ for processing the first, the second and the third substrates {k–2, k–1,k}.

The transport robot 10 then performs one cycle of circulating transportation of the substrates $\{k-r(r=0, 1, 2, \ldots r_0)\}$ (Step S2032). Since the assumption here is that the processing of the first and the second substrates {k–1, k} is not complete yet and the first and the second substrates are still in the substrate processing parts, one cycle of circulating transportation of the first, the second and the third substrates {k–2, k–1, k} is performed. The transport robot 10 operates in such a manner that the substrates of the first, the second and the third substrates {k–2, k–1, k} are circulated. More particularly, transport robot 10 accesses all substrate processing parts (or units) which are to be engaged with in the wafer flows of the first, the second and the third substrates {k–2, k–1, k}.

After waiting for the tact time T, Step S2035 is executed to judge whether at least one of the loading wait cycles $\{W_{k+1,k-r}(r=0, 1, 2, \ldots r_0)\}$ is equal to or larger than 1. If it is judged that at least one of the loading wait cycles $\{W_{k+1,k-r}\}=\{W3,2\ W3,1\}$ is smaller than 1 and retrieving of the next substrate (k+1) is not to be restricted, the serial number k assigned to the substrates is updated (Step S2036). Steps S2031 to S2036 are repeated until it is judged that the next substrate (k; The number k was already updated and therefore not k+1 anymore.) is the last substrate to be processed.

Figure 39:
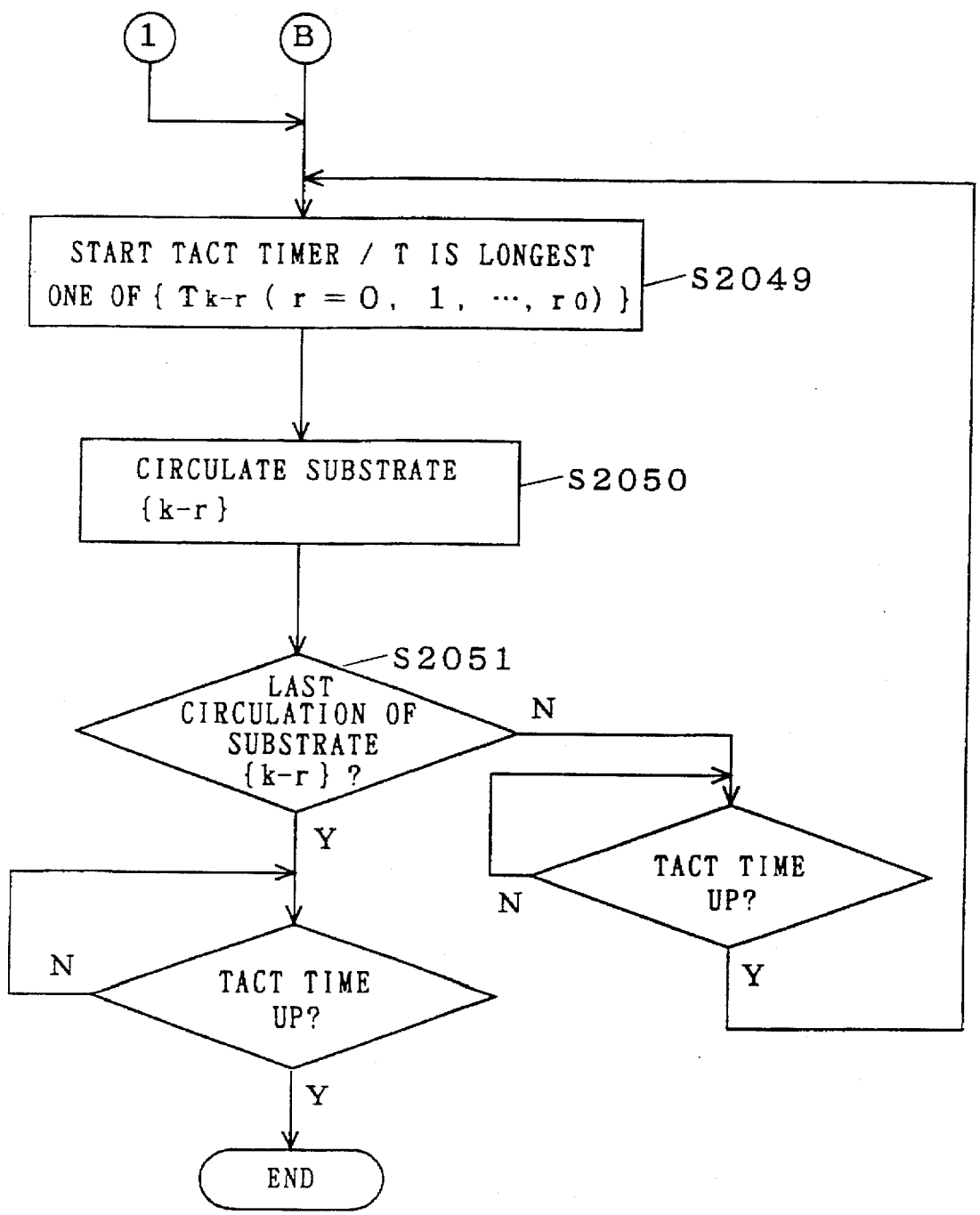

If it is judged at Step S2037 that the next substrate (k=3) is the last substrate to be processed, the sequence proceeds to Step S2049 of FIG. 39 to start the tact timer. Assuming here that the processing of the first and the second substrates {k–1, k} is not complete yet and the first and the second substrates are still in the substrate processing parts, a relation $r_0=2$ holds. Hence, the tact time T is the longer one of the tact time $\{T_{k-2}, T_{k-1}, T_k=T_1, T_2, T_3\}$ for processing the first, the second and the third substrates {k–2, k–1, k}.

The transport robot 10 then performs one cycle of circulating transportation of the substrates $\{k-r(r=0, 1, 2, \ldots r_0)\}$ (Step S2050). Since the assumption here is that the processing of the first and the second substrates {k–1, k} is not complete yet and the first and the second substrates are still in the substrate processing parts, one cycle of circulating transportation of the first, the second and the third substrates {k–2, k–1, k} is performed. The transport robot 10 operates in such a manner that the substrates of the first, the second and the third substrates {k–2, k–1, k} are circulated.

Next, Step S2051 is executed to judge whether the current circulating transportation is the last cycle of circulating transportation of the substrates $\{k-r(r=0, 1, 2, \ldots r_0)\}$. That is, it is judged whether the current circulation is the last circulation to complete processing of all of the first, the second and the third substrates {k–2, k–1, k}. If NO, the sequence waits for the tact time T and returns to Step S2049. Steps S2049 to S2051 are repeated until the last transportation is detected, thereby repeating circulations of the first, the second and the third substrates {k–2, k–1, k}. All transportation is ended upon detection of the last circulation. Depending on the wafer flows of the first, the second and the third substrates {k–2, k–1, k}, processing of one or more of the three substrates may complete early or processing of the three substrates may complete at the same time.

If it is judged at Step S2035 of FIG. 37 that at least one of the loading wait cycles $\{W_{k+1,k-r}\}$ is equal to or larger than 1 so that retrieving of the next substrate (k+1) is to be restricted, and if it is further judged at Step S2048 of FIG. 38 that the next substrate (k; The number k was already updated and therefore not k+1 anymore.) is the last substrate to be processed, the sequence proceeds to Step S2049 of FIG. 39 to start the tact timer. Next, transport robot 10 performs one cycle of circulating transportation of the substrates {k–r} (step S2050). Step S2051 is then executed to judge whether the current circulation is the last circulation of the substrates {k–r}. If NO, the sequence waits for the tact time T and returns to Step S2049. Steps S2049 to S2051 are repeated until the last circulation is detected.

Now, an operation of the substrate processing apparatus of the fifth preferred embodiment will be described with reference to a specific example.

Table 32 shows wafer processing cycles in the substrate processing apparatus of the fifth preferred embodiment where three substrates (k0, k0+1, k0+2) having different flows similar to those of the first preferred embodiment shown in Table 1 are processed by single substrate processing. Table 32 shows whether the substrates 30 are present in the substrate processing parts (or units) after one unprocessed substrate 30 retrieved from a wafer transfer position of the indexer IND by the transport robot 10 returns to the indexer IND as a processed substrate.

TABLE 32

Example of Offset Processing Cycle in Combining Flex Flow

| | IND | HP1 | CP | SC | HP2 | HP3 | HP4 | IND |
|---|---|---|---|---|---|---|---|---|
| Wafer $k_0$ (A) | (1) | (2) | (3) | (4) | (5) | | | (6) |
| Wafer $k_0$ + 1 (B) | (1) | (2) | (3) | (4) | | (5) | | (6) |
| Wafer $k_0$ + 2 (C) | (1) | (2) | (3) | (4) | | | (5) | (6) |
| Processing Cycle | | | | | | | | |
| : | : | : | : | : | : | : | : | : |
| m | A | : | : | : | : | : | : | : |
| m + 1 | B | A | : | : | : | : | : | : |
| m + 2 | C | B | A | : | : | : | : | : |
| m + 3 | : | C | B | A | : | : | : | : |
| m + 4 | : | : | C | B | A | : | : | : |
| m + 5 | : | : | : | C | : | B | : | A |

TABLE 32-continued

| Example of Offset Processing Cycle in Combining Flex Flow | | | | | | | |
|---|---|---|---|---|---|---|---|
| m + 6 | : | : | : | : | : | C | B |
| m + 7 | : | : | : | : | : | : | C |
| : | : | : | : | : | : | : | : |

In Table 32, the symbol HP4 expresses a treatment at a hot plate where the third substrate (k0+2) is processed. The letter A expresses that the first substrate (k0) is present, the letter B expresses that the second substrate (k0+1) is present, and the letter C expresses that the third substrate (k0+2) is present.

As clearly seen in Table 32, the three substrates (k0, k0+1, k0+2) having different flows are processed successively without a break. Hence, time losses are eliminated which are created when retrieving of the later substrates (k0+1, k0+2) is temporarily suspended.

Table 33 shows wafer processing cycles in the conventional substrate processing apparatus where three substrates (k0, k0+1, k0+2) having different flows similar to those of Table 32 are processed by single substrate processing.

TABLE 33

| Example of Conventional Offset Processing Cycle | | | | | | | |
|---|---|---|---|---|---|---|---|
| | IND | HP1 | CP | SC | HP2 | HP3 | HP4 | IND |
| Wafer k₀ (A) | (1) | (2) | (3) | (4) | (5) | | | (6) |
| Wafer k₀ + 1 (B) | (1) | (2) | (3) | (4) | | (5) | | (6) |
| Wafer k₀ + 2 (C) | (1) | (2) | (3) | (4) | | | (5) | (6) |
| Processing Cycle | | | | | | | | |
| : | : | : | : | : | : | : | : | |
| m | A | X | X | X | X | X | X | X |
| m + 1 | X | A | X | X | X | X | X | X |
| m + 2 | X | X | A | X | X | X | X | X |
| m + 3 | X | X | X | A | X | X | X | X |
| m + 4 | X | X | X | X | A | X | X | X |
| m + 5 | X | X | X | X | X | X | X | A |
| m + 6 | B | X | X | X | X | X | X | X |
| m + 7 | X | B | X | X | X | X | X | X |
| m + 8 | X | X | B | X | X | X | X | X |
| m + 9 | X | X | X | B | X | X | X | X |
| m + 10 | X | X | X | X | X | B | X | X |
| m + 11 | X | X | X | X | X | X | X | B |
| m + 12 | C | X | X | X | X | X | X | X |
| m + 13 | X | C | X | X | X | X | X | X |
| m + 14 | X | X | C | X | X | X | X | X |
| m + 15 | X | X | X | C | X | X | X | X |
| m + 16 | X | X | X | X | X | X | C | X |
| m + 17 | X | X | X | X | X | X | X | C |
| : | : | : | : | : | : | : | : | : |

As clearly seen in Table 33, retrieving of the substrate (k0+1) is suspended for five cycles after retrieving of the substrate (k0). Further, loading of the substrate (k0+2) is suspended for five cycles after loading of the substrate (k0+1). Hence, a wait time is ten cycles longer than in the fifth preferred embodiment shown in Table 32. A time loss due to the wait time increases approximately in proportion to an increase in the number of substrates which are processed by single substrate processing.

Table 34 shows wafer processing cycles in the substrate processing apparatus of the fifth preferred embodiment where three substrates (k0, k0+1, k0+2) having different flows similar to those of the first preferred embodiment shown in Table 8 are processed by single substrate processing. In Table 34, the wafer flow of the substrate (k0) includes concurrent processing. Concurrent processing in single substrate processing corresponds to processing in which wafer flows which are different from each other except for a treatment at a hot plate, for example, are successively processed. During successive processing of such wafer flows, a plurality of substrates are processed concurrently at a plurality of hot plates since heating at the hot plates takes a long time.

TABLE 34

| Example 2 of Offset Processing Cycle in Combining Flex Flow | | | | | | | | | |
|---|---|---|---|---|---|---|---|---|---|
| | IND | a | b | c | d | e | f | g | IND |
| Wafer k₀ (A) | (1) | (2) | (2) | (2) | (3) | (4) | (5) | (6) | (7) |
| Wafer k₀ + 1 (B) | (1) | (5) | | | | (4) | (2) | (3) | (6) |
| Wafer k₀ + 2 (C) | (1) | | (2) | (3) | | (4) | (5) | | (6) |
| Processing Cycle | | | | | | | | | |
| : | : | : | : | : | : | : | : | : | |
| m | A | : | : | : | : | : | : | : | |
| m + 1 | X | A | : | : | : | : | : | : | |
| m + 2 | X | A | : | : | : | : | : | : | |
| m + 3 | X | A | : | : | : | : | : | : | |
| m + 4 | X | X | : | : | A | : | : | : | |
| m + 5 | X | X | : | : | X | A | : | : | |
| m + 6 | B | X | : | : | X | X | A | : | |
| m + 7 | C | X | : | : | X | X | B | A | : |
| m + 8 | : | X | C | : | X | X | X | B | A |
| m + 9 | : | X | : | C | : | B | X | : | X |
| m + 10 | : | B | : | : | : | C | X | : | X |
| m + 11 | : | : | : | : | : | : | C | : | B |
| m + 12 | : | : | : | : | : | : | : | : | C |
| : | : | : | : | : | : | : | : | : | : |

As clearly seen in Table 34, the three substrates (k0, k0+1, k0+2) having different flows are processed successively almost without a break. Hence, time losses are eliminated which are created when retrieving of the later substrates (k0+1, k0+2) is temporarily suspended.

Table 35 shows wafer processing cycles in the conventional substrate processing apparatus where three substrates (k0, k0+1, k0+2) having different flows similar to those of Table 34 are processed by single substrate processing.

TABLE 35

Example 2 of Conventional Offset Processing Cycle

|  | IND | a | b | b | d | e | f | g | IND |
|---|---|---|---|---|---|---|---|---|---|
| Wafer $k_0$ (A) | (1) | (2) | (2) | (2) | (3) | (4) | (5) | (6) | (7) |
| Wafer $k_0$ + 1 (B) | (1) | (5) |  |  |  | (4) | (2) | (3) | (6) |
| Wafer $k_0$ + 2 (C) | (1) |  | (2) | (3) |  | (4) | (5) |  | (6) |

Processing Cycle

| . | . | . | . | . | . | . | . | . | . |
|---|---|---|---|---|---|---|---|---|---|
| . | . | . | . | . | . | . | . | . | . |
| . | . | . | . | . | . | . | . | . | . |
| m | A | X | X | X | X | X | X | X | X |
| m + 1 | X | A | X | X | X | X | X | X | X |
| m + 2 | X | A | X | X | X | X | X | X | X |
| m + 3 | X | A | X | X | X | X | X | X | X |
| m + 4 | X | X | X | X | A | X | X | X | X |
| m + 5 | X | X | X | X | X | A | X | X | X |
| m + 6 | X | X | X | X | X | X | A | X | X |
| m + 7 | X | X | X | X | X | X | X | A | X |
| m + 8 | X | X | X | X | X | X | X | X | A |
| m + 9 | B | X | X | X | X | X | X | X | X |
| m + 10 | X | X | X | X | X | X | B | X | X |
| m + 11 | X | X | X | X | X | X | X | B | X |
| m + 12 | X | X | X | X | X | B | X | X | X |
| m + 13 | X | B | X | X | X | X | X | X | X |
| m + 14 | X | X | X | X | X | X | X | X | B |
| m + 15 | C | X | X | X | X | X | X | X | X |
| m + 16 | X | X | C | X | X | X | X | X | X |
| m + 17 | X | X | X | C | X | X | X | X | X |
| m + 18 | X | X | X | X | X | C | X | X | X |
| m + 19 | X | X | X | X | X | X | C | X | X |
| m + 20 | X | X | X | X | X | X | X | X | C |
| . | . | . | . | . | . | . | . | . | . |
| . | . | . | . | . | . | . | . | . | . |
| . | . | . | . | . | . | . | . | . | . |

As clearly seen in Table 35, retrieving of the substrate (k0+1) is suspended for eight cycles after retrieving of the substrate (k0). Further, loading of the substrate (k0+2) is suspended for five cycles after loading of the substrate (k0+1). Hence, a wait time is eight cycles longer than in the fifth preferred embodiment shown in Table 35 which creates a wait time of (5+0) cycles. A time loss due to the wait time increases approximately in proportion to an increase in the number of substrates which are processed by single substrate processing.

The fifth preferred embodiment is related to where the substrate processing parts (or units) do not include an interface buffer, or a device which serves as an interface with an external device such as a stepper which is externally connected to the substrate processing apparatus. In general, an external device such as a stepper operates with its own special cycle time which is different from the tact time of the substrate processing apparatus of the fifth preferred embodiment, and therefore, tact management is impossible. Hence, when a wafer flow which includes an interface buffer is to be followed by another wafer flow, tact management of the subsequent wafer flow is impossible. To deal with this, the loading wait cycles $\{W_{k+1,k-r}\}$ are calculated as in the fifth preferred embodiment with respect to both the wafer flow of the precedent substrate and that of the subsequent substrate after the interface buffer (See FIGS. 40 and 41) to make it possible to perform tact management of the wafer flow of the subsequent substrate. Calculation of the loading wait cycles $\{W_{k+1,k-r}\}$ is performed with the interface buffer replaced with the indexer IND. In this case, tact management is started when processing in the wafer flow of the precedent substrate up to the interface buffer completely ends and retrieving of the last substrate of the precedent substrate 20 from the interface buffer completes. The loading wait cycles $\{W_{k+1,k-r}\}$ are then calculated and the subsequent substrate 20 is processed after suspended.

Table 18 already explain in relation to the first preferred embodiment is again referred to. In substituting Table 18 in relation to the fifth preferred embodiment, it is to be noted that the substrate of the precedent cassette (n) corresponds to the precedent substrates $\{k-r(r=0, 1, 2, \ldots r_0)\}$ while the substrate of the subsequent cassette (n+1) corresponds to the subsequent substrates (k+1). The wafer flow of the precedent substrates $\{k-r\}$ includes the treatment at the interface buffer (IF-B) and the treatment at the spin developer SD (DEV). Assuming that there is only one precedent substrate $\{k-r\}$ which corresponds to that of the cassette (n) of Table 18 in the substrate processing parts (or units), a relation r=0 holds. Processing Position Difference $A_k=0$, Flow Step Difference $B_{k,m}=1$, Maximum Flow Step Difference $B_k=1$. Hence, the loading wait cycle at loading the subsequent substrates (k+1) is, $W_{k+1,k}=W_{k+1,k}=1$.

In the fifth preferred embodiment, when the precedent substrates $\{k-r\}$ are to be concurrently processed, new flow steps are defined by adding the value (the number of concurrent processing−1) with respect to the substrate processing parts (or units) performing concurrent processing, thereby preventing contention between the precedent substrates $\{k-r\}$ and the subsequent substrates (k+1) at the substrate processing parts (or units) in which concurrent processing is performed. It is to be noted that this is a countermeasure assuming the worst scenario. For instance, it is possible that the precedent substrates $\{k-r\}$ are not to be processed in a certain substrate processing part (or unit) in which the subsequent substrates (k+1) are processed. In this case, in terms of circulating transportation, the second last or the previous precedent substrate $\{k-r\}$ is virtually the last substrate 30. Hence, the flow step difference $\{B_{k-r,m}\}$ is calculated noting the nature of this substrate processing part (or unit) which is skipped (Specifically, values (the number of concurrent processing −2), (the number of concurrent processing−3), . . . are added to the flow steps.). As a result, the relative wait cycles $\{w_{k+1,k-r}\}$ and the loading wait cycles $\{W_{k+1,k-r}\}$ are shortened as a whole. Even when principally the earlier substrates of the subsequent substrates (k+1) are to be processed concurrently, it is possible to reduce the flow step difference $\{B_{k-r,m}\}$ and shorten the loading wait cycles $\{W_{k+1,k-r}\}$ as a whole in the same manner as above.

Table 19 already explained in relation to the first preferred embodiment is again referred to. In substituting Table 19 in relation to the fifth preferred embodiment, it is to be noted that the substrate of the precedent cassette (n) corresponds to the precedent substrates $\{k-r(r=0, 1, 2, \ldots r_0)\}$ while the substrate of the subsequent cassette (n+1) corresponds to the subsequent substrates (k+1). The wafer flow of the precedent substrates $\{k-r\}$ includes concurrent processing. In short, treatments a, b and c on the substrates $\{k-r\}$ are performed concurrently. Assuming that there is only one precedent substrate $\{k-r\}$ which corresponds to that of the cassette (n+1) of Table 19 in the substrate processing parts (or units), according to the calculation method of FIGS. 40 and 41, the loading wait cycle is calculated as $W_{k+1,k}=2$. On the other hand, when the precedent substrates (k) are to be processed at the substrate processing part (or unit) which is in charge of the treatment c, the loading wait cycle $W_k$ is shortened since contention for the substrate processing part never occurs during the treatment a. That is, loading of the subsequent substrates (k+1) is advanced one cycle.

K. Structure of Substrate Processing Apparatus of Sixth Preferred Embodiment A substrate processing apparatus according to a sixth preferred embodiment is almost the same as the apparatus of the fifth preferred embodiment except that the apparatus of the sixth preferred embodiment does not perform tact management. The structure of the apparatus of the sixth preferred embodiment is very similar to the structure shown in FIGS. 7 and 8. The only difference is the structure of the controller 50. For this reason, a detailed description regarding the structure of the substrate processing apparatus will be given while describing an operation of the substrate processing apparatus.

L. Operation of Substrate Processing Apparatus of Sixth Preferred Embodiment Except that tact management is not performed, an operation of the apparatus of the sixth preferred embodiment is the same as that of the apparatus of the fifth preferred embodiment.

Figure 42:
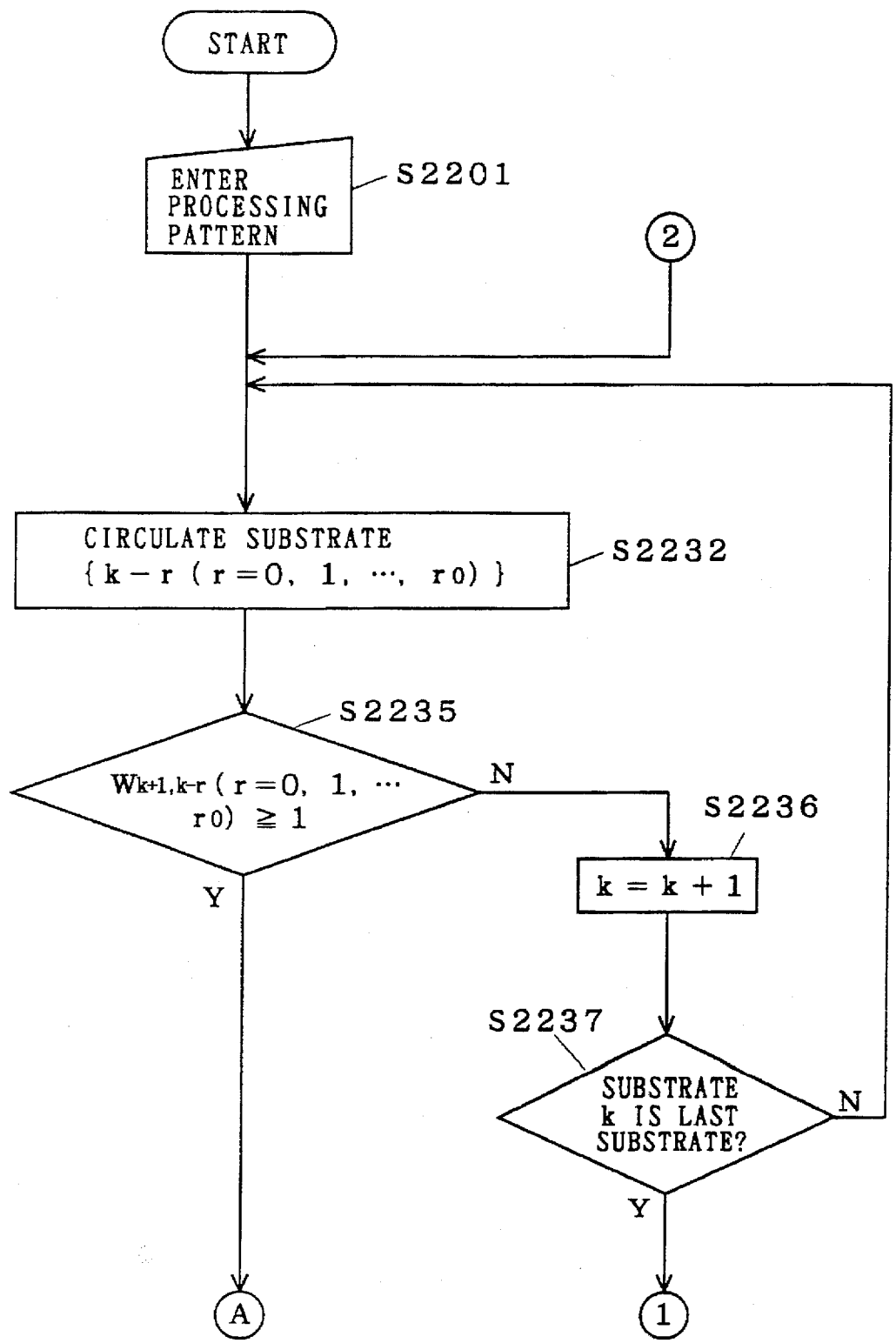
FIGS. 42 to 44 are flow charts of an operation of a substrate processing apparatus according to a sixth preferred embodiment of the present invention.
Figure 43:
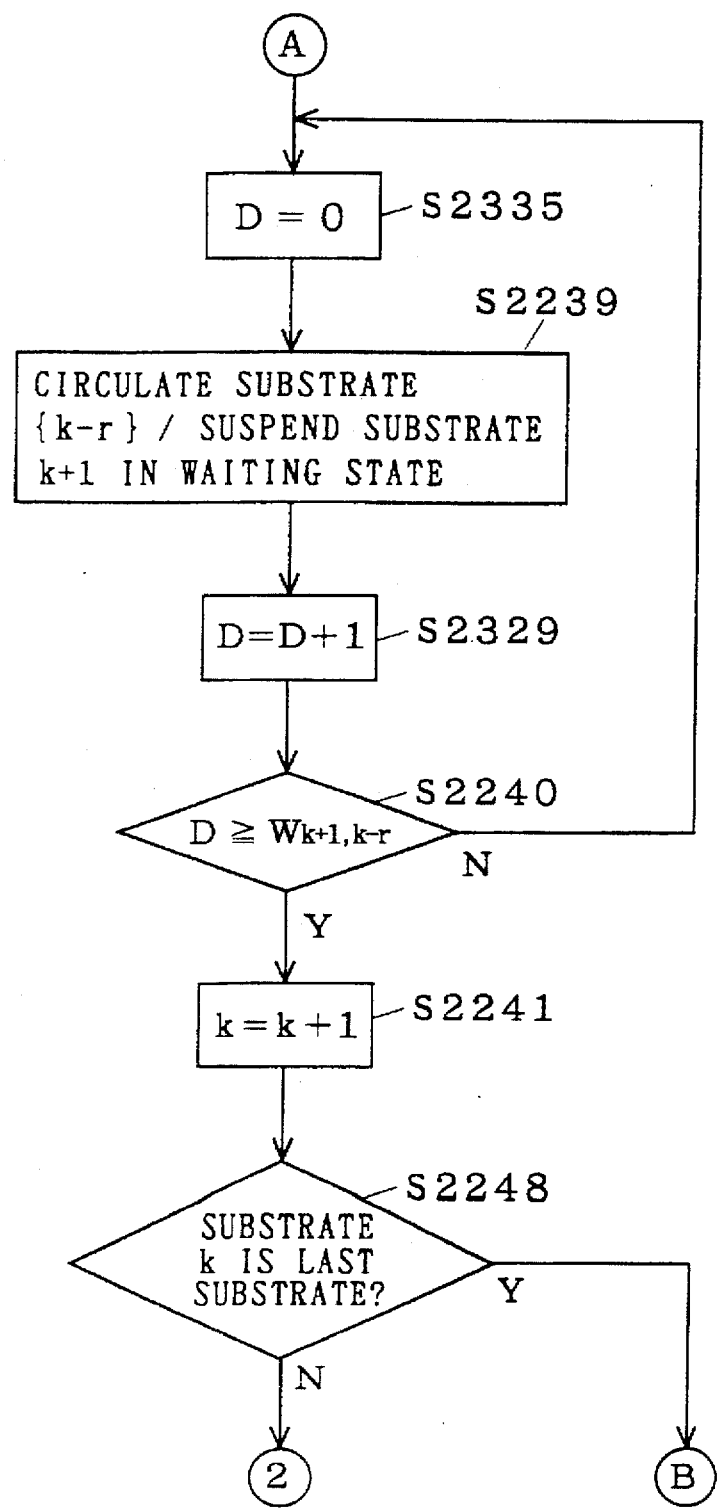
Figure 44:
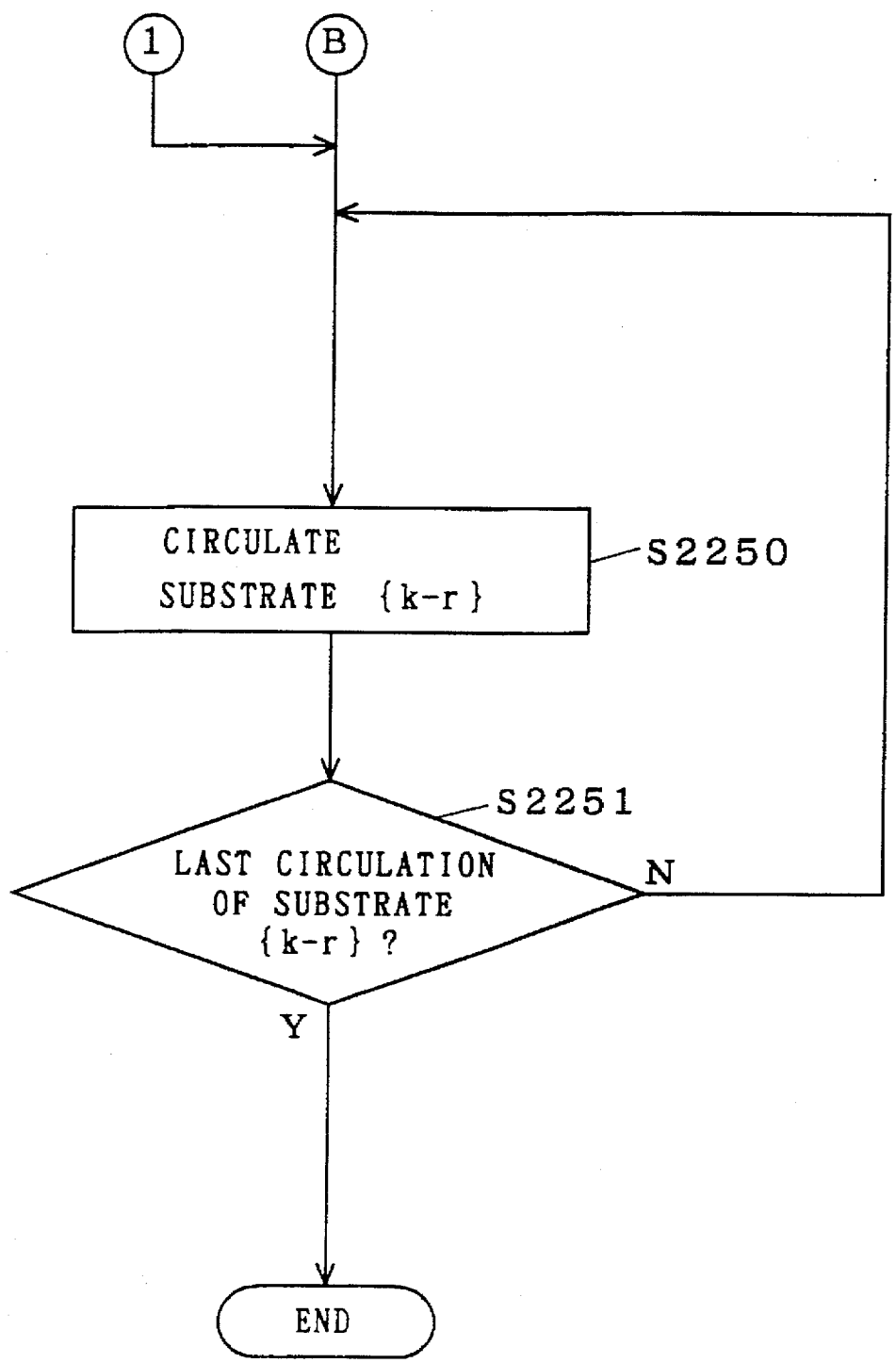

FIGS. 42 to 44 are flow charts showing an operation of the apparatus of the sixth preferred embodiment in detail.

First, as shown in FIG. 42, a processing condition and other information about substrates which are to be processed by single substrate processing from now are inputted (Step S2201). Next, the transport robot 10 performs one cycle of circulating transportation of the substrates $\{k-r(r=0, 1, 2, \ldots r_0)\}$ (Step S2032). The substrates $\{k-r\}$ transported here include substrates k which are to be loaded into the substrate processing parts and substrates k-1, k-2, k-3, ... k-$r_0$ which are already subjected to processing within the substrate processing parts. Since this is the first circulating transportation, the transport robot 10 performs one cycle of circulating transportation of only the first substrate (k=1) (Step S2232).

Next, the loading wait cycles $\{W_{k+1,k-r}(r=0, 1, 2, \ldots r_0)\}$ are determined and whether at least one of the loading wait cycles $\{W_{k+1,k-r}\}$ is equal to or larger than 1 is judged (Step S2235). The loading wait cycles $\{W_{k+1,k-r}(r=0, 1, 2, \ldots r_0)\}$ express the number of wait cycles during which retrieving of next substrates must be restricted to prevent interference upon the substrates 30 which are already subjected to the single substrate processing. The loading wait cycles $\{W_{k+1,k-r}\}$ are determined in the manner shown in FIGS. 40 and 41.

If it is judged at Step S2235 of FIG. 42 that at least one of the loading wait cycles $\{W_{k+1,k-r}\}$ is equal to or larger than 1 so that retrieving of the next, that is, the second substrate (k+1=2) is to be restricted (At this point, the first cycle of circulating transportation of the first substrate (k=1) is already complete and $\{W_{k+1,k-r}\}=W2,1.$), a count D registered by the counter is reset as D=0 to an initial state (Step S2335). Next, one cycle of circulating transportation of the first substrate (k=1) is started (Step S2239), thereby suspending the second substrate (k+1=2) in a waiting state. The registered count D is then incremented by 1 (Step S2240), and it is judged whether all loading wait cycles $\{W_{k+1,k-r}\}=W2,1$ are equal to or smaller than the count D (Step S2240). If NO, the sequence returns to Step S2235. This is repeated to process the first substrate (k=1).

If it is judged at Step S2240 that all loading wait cycles $\{W_{k+1,k-r}\}=W2,1$ are equal to or smaller than the count D, the second substrate (k+1=2) is released from the waiting state and the serial number k assigned to the substrates is updated (Step S2241). Steps S2235 to S2240 are repeated and only the first substrate (k=1) is repeatedly circulated $\{W2,1\}$ times before the second substrate (k+1=2) is released from the waiting state. As a result, retrieving of the second substrate (k+1=2) is delayed for the loading wait cycles $\{W_{k+1,k-r}\}=W2,1$.

Next, Step S2248 is executed to judge whether the second substrate (k=2) is the last substrate to be processed. If NO, deciding that loading the second substrate (k=2) is allowed, the sequence returns to Step S2232 of FIG. 42 so that one cycle of circulating transportation of the substrates $\{k-r(r=0, 1, 2, \ldots r_0)\}$ is performed. Assuming here that the processing of the first substrate (k-1=1) is not complete yet and the first substrate (k-1=1) is still in one of the substrate processing parts, one cycle of circulating transportation of the first and the second substrates (k-1, k) is executed. The transport robot 10 operates in such a manner that the first and the second substrates $\{k-1, k\}$ are circulated.

Step S2235 is executed to judge whether at least one of the loading wait cycles $\{W_{k+1,k-r}(r=0, 1, 2, \ldots r_0)\}$ is equal to or larger than 1. The loading wait cycles $\{W_{k+1,k-r}\}$ are calculated in the manner as that shown in FIGS. 40 and 41. Since the assumption here is that the processing of the first substrate (k-1=1) is not complete yet and the first substrate (k-1=1) is still in one of the substrate processing parts, if it is judged that at least one of the loading wait cycles $\{W_{k+1,k-r}\}=\{W3,2\ W3,1\}$ is equal to or larger than 1 so that retrieving of the next, that is, the third substrate (k+1=3) is to be restricted, Steps S2335 to S2240 are repeated until it is judged that this retrieving restriction period is not needed anymore as shown in FIG. 43. As a result, circulations of the first and the second substrates $\{k-1, k\}$ are repeated for the largest number of the loading wait cycles $\{W_{k+1,k-r}\}=\{W3,2\ W3,1\}$. Depending on the contents of the wafer flows of the two substrates $\{k-1, k\}$, it is possible that processing of one of the two substrates $\{k-1, k\}$ completes during the retrieving restriction period to leave the other remaining substrate alone in the substrate processing parts.

If it is judged at Step S2235 of FIG. 42 that at least one of the loading wait cycles $\{W_{+1,k-r}(r=0, 1, 2, \ldots r_0)\}$ is smaller than 1 (that is, equal to 0) so that retrieving of the next, that is, the third substrate (k+1=3) needs not be restricted, the serial number k assigned to the substrates is updated (Step S2236).

Next, Step S2237 is executed to judge whether the third substrate (k+1=3) is the last substrate to be processed. If NO, deciding that retrieving of the third substrate (k=3) is allowed, the sequence returns to Step S2232 to start one cycle of circulating transportation of the substrates $\{k-r(r=0, 1, 2, \ldots r_0)\}$. Assuming here that the processing of the first and the second substrates $\{k-1, k\}$ is not complete yet and the two substrates are still in the substrate processing parts, one cycle of circulating transportation of the first, the second and the third substrates $\{k-2, k-1, k\}$ is performed. The transport robot 10 operates in such a manner that the first, the second and the third substrates $\{k-2, k-1, k\}$ are circulated.

Next, Step S2235 is executed to judge whether at least one of the loading wait cycles $\{W_{k+1,k-r}(r=0, 1, 2, \ldots r_0)\}$ is equal to or larger than 1. If it is judged at Step S2235 that at least one of the loading wait cycles $\{W_{k+1,k-r}\}$ is smaller than 1 (that is, equal to 0) so that loading of the next substrate (k+1) is not to be restricted, the serial number k assigned to the substrates is updated (Step S2236). Steps S2232 to S2236 are repeated until it is judged that the next substrate (k; The number k was already updated and therefore not k+1 anymore.) is the last substrate to be processed.

If it is judged at Step S2237 that the next substrate (k=3) is the last substrate to be processed, the sequence proceeds to Step S2250 of FIG. 44 to start one cycle of circulating transportation of the substrates {k-r(r=0, 1, 2, ... r₀)}. Assuming here that the processing of the first and the second substrates {k-1, k} is not complete yet and the two substrates are still in the substrate processing parts, one cycle of circulating transportation of the first, the second and the third substrates {k-2, k-1, k} is performed. The transport robot 10 operates in such a manner that the first, the second and the third substrates {k-2, k-1, k} are circulated.

Next, Step S2251 is executed to judge whether the current circulating transportation is the last cycle of circulating transportation of the substrates {k-r(r=0, 1, 2, ... r₀)}. That is, it is judged whether the current circulating transportation is the last transportation to complete processing of all of the first, the second and the third substrates {k-2, k-1, k}. If NO, the sequence returns to Step S2250. Steps S2250 to S2251 are repeated until the last transportation is detected, thereby repeating circulations of the first, the second and the third substrates {k-2, k-1, k}. All circulations are ended upon detection of the last transportation. Depending on the wafer flows of the first, the second and the third substrates {k-2, k-1, k}, processing of one or more of the three substrates may complete early or processing of the three substrates may complete at the same time.

If it is judged at Step S2235 of FIG. 42 that at least one of the loading wait cycles $\{W_{k+1,k-r}\}$ is equal to or larger than 1 so that retrieving of the next substrate (k+1) is to be restricted, and if it is further judged at Step S2248 of FIG. 43 that the next substrate (k; The number k was already updated and therefore not k+1 anymore.) is the last substrate to be processed, the sequence proceeds to Step S2250 of FIG. 44 to start one cycle of circulating transportation of the substrates {k-r(r=0, 1, 2, ... r₀)}. Step S2251 is then executed to judge whether the current circulating transportation is the last transportation of the substrates {k-r}. If NO, the sequence returns to Step S2250. Steps S2250 to S2251 are repeated until the last transportation is detected.

The present invention, described above in relation to the fifth and the sixth preferred embodiments, is not restricted to these particular embodiments. For example, the loading wait cycles $\{W_{k+1,k-r}(r=0, 1, 2, ... r_0)\}$ may not be equal to the maximum flow step differences $\{B_{k-r}(r=0, 1, 2, ... r_0)\}$ or the processing position difference $A_n$. That is, as the loading wait cycles $\{W_{k+1,k-r}(r=0, 1, 2, ... r_0)\}$ become larger than the processing position differences $\{A_{k-r}\}$ and the maximum flow step difference differences $\{B_{k-r}\}$, a substrate of a certain lot never passes a precedent substrates of a different lot and interference between substrates is prevented likely although the through put is degraded.

In addition, although the foregoing has described the fifth and the sixth preferred embodiments as both related only to single substrate processing of different wafer flows, the present invention is also applicable to single substrate processing of different recipes in which various process data such as a processing temperature, a processing time, a rotation number and a processing fluid as well as through puts are different although the wafer flows are the same. Even in such single substrate processing, the through put is improved by appropriately delaying the retrieving timing of a substrate of a subsequent lot in each cycle.

Further, in the fifth and the sixth preferred embodiments, the loading wait cycles $\{W_{k+1,k-r}\}$ are calculated when Step S2035 of FIG. 37 and Step S2235 of FIG. 42 are executed to judge whether the loading wait cycles $\{W_{k+1,k-r}\}$ are equal to or larger than 1. Instead, the loading wait cycles $\{W_{k+1,k-r}\}$ may be calculated when the wafer flows and the order of the treatments are inputted to process the substrates by single substrate processing (i.e., at Step S2001 of FIG. 37 and Step S2201 of FIG. 38).

The foregoing has described the fifth and the sixth preferred embodiments as both related to single substrate processing of different wafer flows. However, the substrate processing apparatuses of the fifth and the sixth preferred embodiments are also applicable to successive processing of successive lots which have different flows from each other and to interrupting processing in which processing of an interrupting lot which has a certain flow interrupts processing of an interrupted lot which has a different flow. Since not only an immediately precedent lot but also further previous lots could cause interference particularly when the number of substrates held in successive lots which have different flows is small, it is necessary to judge a correlation between the current lot and such previous lots when loading wait cycles are calculated. In addition, when an instruction to suspend processing of an interrupted lot is released immediately after the processing of an interrupted lot was started, not only the interrupted lot but also a previous lot could cause interference. Hence, it is necessary to judge a correlation between the current lot and the previous lot when loading wait cycles are calculated.

While the invention has been described in detail, the foregoing description is in all aspects illustrative and not restrictive. It is understood that numerous other modifications and variations can be devised without departing from the scope of the invention.

We claim:

1. A substrate processing apparatus for processing first and second substrates, comprising:

a plurality of processing parts each of which processes at least one of said first and second substrates;

transport means for circulating among said processing parts while holding said first and second substrates, said transport means being capable of stopping at each of said plurality of processing parts to exchange processed and unprocessed substrates, and capable of carrying only a single substrate from one of said plurality of processing parts to another, and incapable of stopping more than once at the same one of said plurality of processing parts within one circulation, wherein each of said plurality of processing parts which receives a substrate in one circulation executes processing until a next circulation; and transporting control means for controlling transporting of said first and second substrates among said processing parts in different first and second orders by said transport means to process said first and second substrates by first and second processing, respectively, such that transportation of said second substrate is started after starting of transportation of said first substrate before completion of the first processing under a condition that interference between the first and second processing is prohibited.

2. The substrate processing apparatus of claim 1, wherein said first substrate is to be processed last in a precedent lot which is formed by a plurality of substrates to be subjected to said first processing, and wherein said second substrate is to be processed first in a lot subsequent to said precedent lot, which subsequent lot is formed by a plurality of substrates to be subjected to said second processing.

3. The substrate processing apparatus of claim 2, wherein said transporting control means includes:

computation means for calculating a minimum wait cycle which corresponds to a number of circulating transportation of substrates during a time from first circulating of substrates including said first substrate to first circulating of substrates including said second substrate under a condition that interference between said precedent and subsequent lots is prohibited; and control means for delaying the start of circulating transportation of substrates including said second substrate by said transport means in the range of the minimum wait cycle to a standard wait cycle when the minimum wait cycle is shorter than the standard wait cycle which corresponds to the number of circulating transportation of substrates for performing said first processing of said precedent lot.

4. The substrate processing apparatus of claim 3, wherein said computation means includes position difference computation means for determining a position difference by subtracting a number of the processing parts for said second processing from a number of the processing parts for said first processing;

placing difference computation means for calculating a placing difference of each processing part which is used to process both said precedent and subsequent lots by subtracting placing of each processing part during circulating transportation of said subsequent lot from placing of each processing part during circulating transportation of said precedent lot and placing of each processing part during circulating transportation of said subsequent lot; and maximum value computation means for obtaining a maximum value among the placing differences and determining the minimum wait cycle on the basis of the position difference and the maximum value.

5. The substrate processing apparatus of claim 1, wherein said first substrate is part of an interrupted lot and to be processed last before interrupting processing where said first processing of said interrupted lot is temporarily suspended and said second processing of an interrupting lot is performed, said interrupted lot being formed by a plurality of substrates to be subjected to said first processing while said interrupting lot is formed by a plurality of substrates to be subjected to said second processing, and wherein said second substrate is part of an interrupting lot and to be processed first in said interrupting lot.

6. The substrate processing apparatus of claim 5, wherein said transporting control means includes computation means for calculating a minimum wait cycle which corresponds to a number of circulating transportation of substrates during a time from first circulating of substrates including said first substrate to first circulating of substrates including said second substrate under the condition that interference between said interrupting and interrupted lots is prohibited; and control means for delaying the start of circulating transportation of substrates including said second substrate by said transport means in the range of the minimum wait cycle to a standard wait cycle when the minimum wait cycle is shorter than the standard wait cycle which corresponds to the number of circulating transportation of substrates for performing said first processing of said interrupted lot.

7. The substrate processing apparatus of claim 6, wherein said computation means includes:

position difference computation means for determining a position difference by subtracting a number of the processing parts for said second processing from a number of the processing parts for said first processing;

placing difference computation means for calculating a placing difference of each processing part which is used to process both said interrupted and interrupting lots by subtracting placing of each processing part during circulating transportation of said interrupting lot from placing of each processing part during circulating transportation of said interrupted lot; and maximum value computation means for obtaining a maximum value among the placing differences and determining the minimum wait cycle on the basis of the position difference and the maximum value.

8. The substrate processing apparatus of claim 1, wherein said first substrate is part of an interrupting lot and to be processed last before releasing interrupting processing where said second processing of said interrupted lot is temporarily suspended and said first processing of an interrupting lot is performed, said interrupting lot being formed by a plurality of substrates to be subjected to said first processing while said interrupted lot is formed by a plurality of substrates to be subjected to said second processing, and wherein said second substrate is part of said interrupted lot and to be processed first after releasing said interrupting processing.

9. The substrate processing apparatus of claim 8, wherein said transporting control means includes computation means for calculating a minimum wait cycle which corresponds to a number of circulating transportation of substrates during a time from first circulating of substrates including said first substrate to first circulating of substrates including said second substrate under the condition that interference between said interrupting and interrupted lots is prohibited; and control means for delaying the start of circulating transportation of substrates including said second substrate by said transport means in the range of the minimum wait cycle to a standard wait cycle when the minimum wait cycle is shorter than the standard wait cycle which corresponds to the number of circulating transportation of substrates for performing said first processing of said interrupting lot.

10. The substrate processing apparatus of claim 9, wherein said computation means includes:

position difference computation means for determining a position difference by subtracting a number of the processing parts for said second processing from a number of the processing parts for said first processing;

placing difference computation means for calculating a placing difference of each processing part which is used to process both said interrupted and interrupting lots by subtracting placing of each processing part during circulating transportation of said interrupted lot from placing of each processing part during circulating transportation of said interrupting lot; and maximum value computation means for obtaining a maximum value among the placing differences and determining the minimum wait cycle on the basis of the position difference and the maximum value.

11. The substrate processing apparatus of claim 1, wherein a plurality of substrates including said first and second substrates are serially processed one by one.

12. A substrate processing apparatus for processing precedent substrates and subsequent substrates which are subjected to different processing, respectively, said substrate processing apparatus comprising:

a plurality of processing parts for processing said precedent and subsequent substrates;

transport means for circulating among said processing parts while holding said precedent and subsequent substrates, said transport means being capable of stopping at each of said plurality of processing parts to exchange processed and unprocessed substrates, and capable of carrying only a single substrate from one of said plurality of processing parts to another, and incapable of stopping more than once at the same one of said plurality of processing parts within one circulation, wherein each of said plurality of processing parts which receives a substrate in one circulation executes processing until a next circulation; and transporting control means for controlling transporting of said precedent and subsequent substrates among said processing parts in different orders by said transport means to process said precedent and subsequent substrates by different processing, respectively, said transporting control means including computation means for calculating a minimum wait cycle which corresponds to a number of circulating transportation of substrates during a time from first circulating of a substrate to be processed last within said precedent substrates to first circulating of a substrate to be processed first within said subsequent substrates under the condition that interference between said precedent and subsequent substrates is prohibited; and control means for delaying the start of circulating transportation of said substrate to be processed first within said subsequent substrates after starting of transportation of said substrate to be processed last within said precedent substrates and after passing the minimum wait cycle.

13. The substrate processing apparatus of claim 12, wherein said computation means includes:

position difference computation means for determining a position difference with respect to each precedent substrate by subtracting a number of the processing parts for the processing of said subsequent substrate from a number of the processing parts for the processing of said precedent substrate;

placing difference computation means for calculating a placing difference of each processing part which is used to process both said precedent and subsequent substrates, said placing difference being a difference between placing of each processing part during circulating transportation of said precedent substrate and placing of each processing part during circulating transportation of said subsequent substrate;

maximum value computation means for determining a relative wait cycle with respect to each precedent substrate on the basis of both the position differences and a maximum value of the placing differences; and relative correction means for determining the minimum wait cycle by subtracting the number of circulating transportation of substrates of said precedent substrates which has been circulated from the minimum wait cycle.

14. A method of processing first and second substrates, comprising the steps of:

preparing a plurality of processing parts each of which processes at least one of said first and second substrates;

transporting said first substrate among said processing parts in a first order and processing said first substrate by said processing part which receives said first substrate, thereby to process said first substrate by first processing; and transporting said second substrate among said processing parts in a second order add processing said second substrate by said processing part which receives said second substrate, thereby to process said second substrate by second processing, transportation of said second substrate being started after starting of transportation of said first substrate before completion of the first processing under a condition that interference between the first and second processing is prohibited, said second order being different from said first order, wherein each of said step of transporting said first substrate and said step of transporting said second substrate is carried out by circulating among said plurality of processing parts a transporter holding only a single substrate at a time, and by stopping at most once at each of said plurality of processing parts to exchange processed and unprocessed substrates within one circulation, and each of said plurality of processing parts which receives a substrate in one circulation executes processing until a next circulation.

* * * * *